US012792290B2

(12) United States Patent
Mu et al.

(10) Patent No.: US 12,792,290 B2
(45) Date of Patent: Nov. 10, 2026

(54) MULTI-TERMINAL FOOD INFORMATION PROCESSING METHOD, DISPLAY APPARATUS AND FOOD STORAGE APPARATUS

(71) Applicant: HISENSE VISUAL TECHNOLOGY CO., LTD., Qingdao (CN)

(72) Inventors: Congcong Mu, Qingdao (CN); Kejing Lu, Qingdao (CN); Youping Fu, Qingdao (CN); Jin Cheng, Qingdao (CN); Xiangjian Kong, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 233 days.

(21) Appl. No.: 18/663,761

(22) Filed: May 14, 2024

(65) Prior Publication Data

US 2024/0296008 A1 Sep. 5, 2024

Related U.S. Application Data

(63) Continuation of application No. PCT/CN2022/108229, filed on Jul. 27, 2022.

(30) Foreign Application Priority Data

Nov. 30, 2021 (CN) ......................... 202111440454.7
Nov. 30, 2021 (CN) ......................... 202111442106.3
Nov. 30, 2021 (CN) ......................... 202111445608.1

(51) Int. Cl.
*G06F 3/01* (2006.01)
*G06F 3/04817* (2022.01)
(Continued)

(52) U.S. Cl.
CPC ........ *G06F 3/1454* (2013.01); *G06F 3/04817* (2013.01); *G06F 3/0482* (2013.01);
(Continued)

(58) Field of Classification Search
None
See application file for complete search history.

(56) References Cited

U.S. PATENT DOCUMENTS 12,309,532 B1 * 5/2025 Ponnuswamy ........ H04N 7/181
2006/0239125 A1 10/2006 Chung
(Continued)

FOREIGN PATENT DOCUMENTS

CN 103322767 A 9/2013
CN 103984725 A 8/2014
(Continued)

OTHER PUBLICATIONS

Chinese Office Action, Application No. 202111445608.1 dated Oct. 19, 2024.
(Continued)

*Primary Examiner* — Toan H Vu
(74) *Attorney, Agent, or Firm* — Meunier Carlin & Curfman LLC

(57) ABSTRACT

Disclosed are a display apparatus and a method for the display apparatus. The method can include: receiving food change information based on the display apparatus for updating food information of existing foods in a target food storage apparatus; sending the food change information to the target food storage apparatus; where the target food storage apparatus is a food storage apparatus which is bound with the display apparatus via account; and in response to a completion notification sent from the target food storage apparatus after updating the food information based on the food change information, updating food information stored in the display apparatus. Here, updated food information stored in the display apparatus is the same as updated food information stored in the target food storage apparatus.

18 Claims, 33 Drawing Sheets

(51) Int. Cl.

| | |
|---|---|
| ***G06F 3/0482*** | (2013.01) |
| ***G06F 3/0484*** | (2022.01) |
| ***G06F 3/14*** | (2006.01) |
| ***G06F 3/16*** | (2006.01) |
| ***G06F 16/9535*** | (2019.01) |
| *G06F 3/00* | (2006.01) |

(52) U.S. Cl.

CPC ............ *G06F 3/0484* (2013.01); *G06F 3/167* (2013.01); *G06F 16/9535* (2019.01)

(56) References Cited

U.S. PATENT DOCUMENTS

2013/0104077 A1 4/2013 Felt
2014/0052573 A1* 2/2014 Oh .......................... G06Q 10/10 705/26.8
2014/0173082 A1* 6/2014 Shin ........................ G16H 40/67 709/223
2014/0304126 A1 10/2014 Kim et al.
2016/0138858 A1 5/2016 Lu et al.
2017/0103677 A1* 4/2017 Bhattacharjee ......... G16H 20/70
2018/0053440 A1* 2/2018 Staveley ............ G09B 19/0092
2018/0187969 A1* 7/2018 Kim .................... G06F 3/04883
2019/0348044 A1* 11/2019 Chun ................. G06Q 30/0601
2019/0384990 A1* 12/2019 Kim ................... G06Q 30/0641
2020/0088463 A1* 3/2020 Jeong ....................... G06F 3/167
2020/0097776 A1* 3/2020 Kim ..................... G06N 3/0464
2020/0134291 A1* 4/2020 Kim ....................... G06V 20/64
2020/0327601 A1* 10/2020 Kim ......................... F25D 29/00
2021/0190416 A1* 6/2021 Ge ........................... F25D 29/00
2023/0076984 A1* 3/2023 Schroeder .............. G06V 20/52
2023/0097905 A1* 3/2023 Schroeder ............... F25D 29/00 382/156
2023/0221066 A1* 7/2023 Kong ...................... G06F 3/167

FOREIGN PATENT DOCUMENTS

CN 105654270 A 6/2016
CN 106303607 A 1/2017
CN 107341350 A 11/2017
CN 108829723 A 11/2018
CN 109297244 A 2/2019
CN 111486656 A 8/2020
CN 111860718 A 10/2020
CN 112242940 A 1/2021
CN 112329509 A 2/2021
CN 114115626 A 3/2022
CN 114116752 A 3/2022
CN 114143578 A 3/2022
KR 20170053248 A 5/2017
WO 2018023280 A1 2/2018
WO 2021052155 A1 3/2021

OTHER PUBLICATIONS

English translation of Chinese Office Action issed in CN202111442106.3, mailed Feb. 28, 2024.

* cited by examiner

MULTI-TERMINAL FOOD INFORMATION PROCESSING METHOD, DISPLAY APPARATUS AND FOOD STORAGE APPARATUS

The application is a continuation application of International Application No. PCT/CN2022/108229 filed Jul. 27, 2022, which claims priorities to Chinese Patent Application No. 202111440454.7 filed on Nov. 30, 2021, Chinese Patent Application No. 202111445608.1 filed on Nov. 30, 2021, and Chinese Patent Application No. 202111442106.3 filed on Nov. 30, 2021, which are incorporated in their entireties herein by reference.

TECHNICAL FIELD

The disclosure relates to the technical field of information processing, and particularly to a multi-terminal based method for managing food information, a display apparatus, and a food storage apparatus.

BACKGROUND

With the rapid development of display apparatuses, their functions are becoming increasingly rich and their performance is also becoming more powerful. Currently, display apparatuses include televisions, mobile phones, food storage apparatus, and other products with display screens. Food storage apparatus with a display can provide users with various functions such as intelligent food information processing, intelligent storage, and multifunctional reminders.

Information processing methods for food stored in food storage apparatus can include adding food information, modifying food information, and deleting food information. Food stored in food storage apparatus can be shown in a user interface on the display in the form of food icons. These icons can be generated based on the food information corresponding to the existing food stored in the food storage apparatus. The food information can include food name, food shelf life, adding time, and quantity of food.

In current food storage apparatus products, when users need to manage food information, they can only do so on the food storage apparatus side. If the user in the living room or other room wants to manage the food information of food in the food storage apparatus, he/she needs to go to the location of the food storage apparatus to view them. The processing and operation of food information is only implemented from the ingredient storage apparatus, which may cause inconvenience for users.

SUMMARY

Embodiments of the disclosure provide a multi-terminal based method for food information processing, a display apparatus and a food storage apparatus.

Some embodiments of the disclosure provide a display apparatus, including a display configured to present an image and/or a user interface and at least one processor in connection with the display. The at least one processor is configured to execute instructions to cause the display apparatus to perform: receiving food change information based on the display apparatus for updating food information of existing foods in a target food storage apparatus, and sending the food change information to the target food storage apparatus; where the target food storage apparatus is a storage apparatus which is bound with the display apparatus via account; in response to a completion notification sent from the target food storage apparatus after updating the food information based on the food change information, updating food information stored in the display apparatus. Here, updated food information stored in the display apparatus is same as updated food information stored in the target food storage apparatus.

Some embodiments of the disclosure further provide a food storage apparatus, including a body with a storage compartment, a door at an opening of the storage compartment, a display arranged on the door and configured to display an interface for food information processing presenting food icons generated based on food information of existing foods in the food storage apparatus, and at least one processor in connection with the display. The at least one processor is configured to execute instructions to cause the food storage apparatus to perform: receiving food change information based on the food storage apparatus to update the food information of the existing foods, updating the food information stored in the food storage apparatus; sending the food change information to a target display apparatus which is bound with the food storage apparatus via account, where the food change information is used to update food information stored in the target display apparatus. Further, updated food information stored in the target display apparatus is same as updated food information stored in the food storage apparatus.

Some embodiments of the disclosure provide a smart terminal, including a display configured to display an image and/or a user interface and at least one processor in connection with the display. The at least one processor is configured to execute instructions to cause the smart terminal to perform: receiving food change information based on the smart terminal for updating food information of existing foods in a target food storage apparatus, and sending the food change information to the target food storage apparatus; where the target food storage apparatus is a storage apparatus which is bound with the smart terminal via account; in response to a completion notification sent from the target food storage apparatus after updating the food information based on the food change information, updating food information stored in the smart terminal. Here, updated food information stored in the smart terminal is same as updated food information stored in the target food storage apparatus.

Some embodiments of the disclosure provide a multi-terminal based method for food information processing, applied to a display apparatus. The method can include: receiving food change information based on the display apparatus to update food information of existing foods in a target food storage apparatus, and sending the food change information to the target food storage apparatus, where the target food storage apparatus is a food storage apparatus which is bound with the display apparatus via account; in response to a completion notification sent from the target food storage apparatus after updating the food information based on the food change information, updating food information stored in the display apparatus. Here, updated food information stored in the display apparatus is same as updated food information stored in the target food storage apparatus.

Some embodiments of the disclosure provide a multi-terminal based method for food information processing, applied to a food storage apparatus. The method can include: receiving food change information based on the food storage apparatus to update the food information of the existing foods, updating the food information stored in the food storage apparatus; sending the food change information to a target display apparatus which is bound with the food storage apparatus via account, where the food change information is used to update food information stored in the target display apparatus. Here, updated food information stored in the target display apparatus is same as updated food information stored in the food storage apparatus.

Some embodiments of the disclosure provide a multi-terminal based method for food information processing, applied to a smart terminal. The method can include: receiving food change information based on the smart terminal for updating food information of existing foods in a target food storage apparatus, and sending the food change information to the target food storage apparatus; where the target food storage apparatus is a storage apparatus which is bound with the smart terminal via account; in response to a completion notification sent from the target food storage apparatus after updating the food information based on the food change information, updating food information stored in the smart terminal. Here, updated food information stored in the smart terminal is same as updated food information stored in the target food storage apparatus.

DETAILED DESCRIPTION

Some embodiments of the disclosure will be described below in conjunction with the accompanying drawings. Obviously, the embodiments described are only some embodiments of the present application, not all of them.

Figure 1:
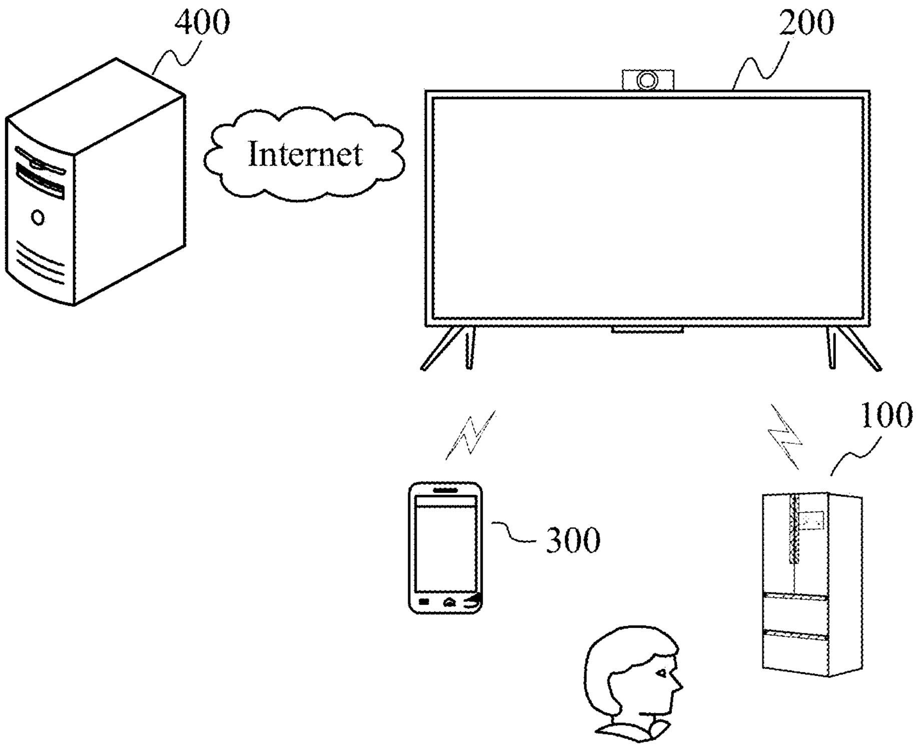
FIG. 1 shows an operating scenario between a smart control apparatus and a control device according to some embodiments of the disclosure.

FIG. 1 shows a schematic diagram of an operating scenario between a smart control apparatus and a control device according to some embodiments. As shown in FIG. 1, the smart control apparatus 200 may be a display apparatus, and can communicate with the server 400. Users can operate the smart control apparatus 200 or the food storage apparatus 100 through a smart device 300 or the control device.

In some embodiments, the control device 100 can be a remote control, and can communicate with the smart control apparatus 200 through at least one of infrared protocol communication, Bluetooth protocol communication or other short-range communication methods, to control the smart control apparatus 200 through wireless or other wired methods. The user may input user commands through keys, voice input and control panel input on the remote control, to control the smart control apparatus 200.

In some embodiments, the smart device 300 may include any one of a mobile terminal, tablet computer, computer, laptop, AR/VR device, etc. In some embodiments, the smart control apparatus 200 can be controlled using the smart device 300. For example, the smart control apparatus 200 may be controlled by an application running on the smart device. In some embodiments, data communication may be performed between the smart device 300 and the smart control apparatus.

In some embodiments, the smart control apparatus 200 can be controlled in a manner other than the control device and the smart device 300. For example, the smart control apparatus can be controlled by directly receiving a voice command from the user through a voice command module configured inside the smart control apparatus 200, or by receiving a voice command from the user through a voice control device arranged outside the smart control apparatus 200.

In some embodiments, the smart control apparatus 200 can communicate with the server 400. The smart control apparatus 200 may communicate through a local area network (LAN), a wireless local area network (WLAN), and other networks. The server 400 can provide various content and interactions to the smart control apparatus 200.

Figure 2:
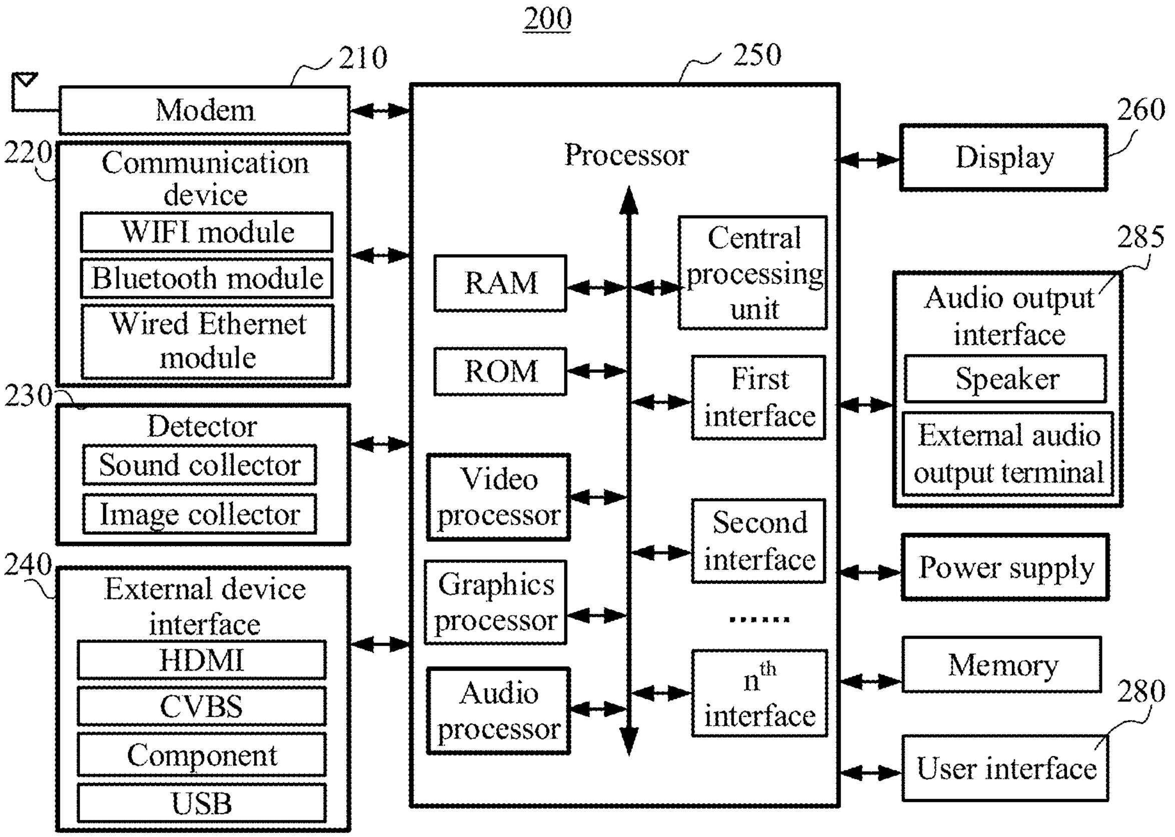
FIG. 2 shows a hardware configuration block diagram of a smart control apparatus 200 according to some embodiments of the disclosure.

FIG. 2 shows a hardware configuration block diagram of the smart control apparatus 200 according to some embodiments of the disclosure. As can be seen in FIG. 2, the smart control apparatus 200 may include at least one of a modem 210, a communication device 220, a detector 230, an external device interface 240, a processor 250, a display 260, an audio output interface 285, a memory, a power supply, and a user input interface 280. In some embodiments, the processor may include at least one processor, such as a Central Processing Unit (CPU), a video processor, an audio processor, a Graphics Processing Unit (GPU), an RAM (Random Access Memory), an ROM (Read-Only Memory), first to $n^{th}$ interfaces for input/output, etc.

In some embodiments, the display 260 can include: a panel component for displaying an image, a driver component for driving the image display, a component for receiving an image signal from the processor to display video content and image content as well as a menu interface, and a UI interface for user interaction. In some embodiments, the display 260 may be at least one of a liquid crystal display, an OLED display or a projection display, or may be a projection device and a projection screen.

In some embodiments, the user input interface 280 may be an interface for receiving a control input (for example, on a key or other of the smart control apparatus).

Figure 3:
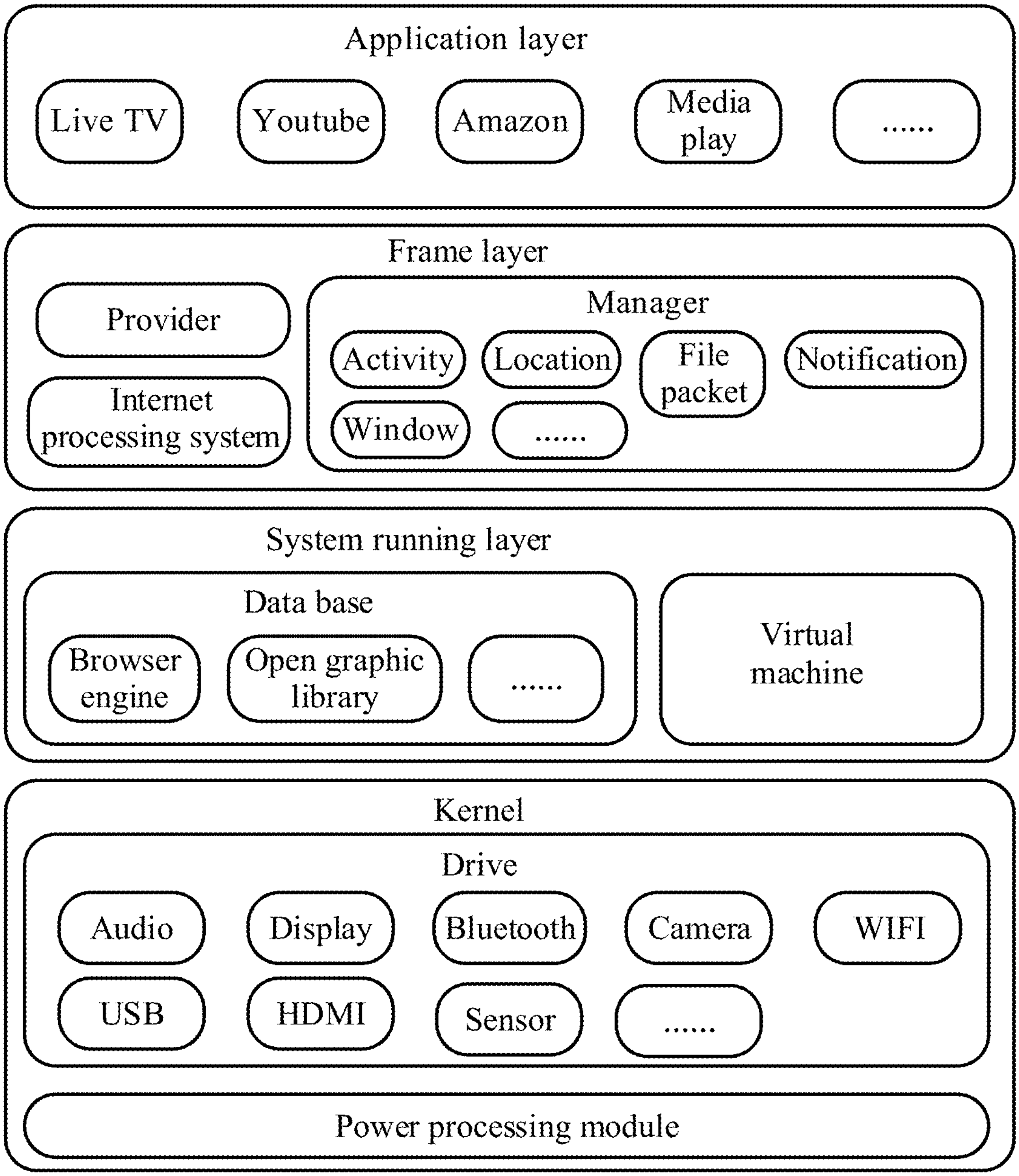
FIG. 3 shows a software configuration block diagram of a smart control apparatus 200 according to some embodiments of the disclosure.

FIG. 3 shows a software configuration block diagram of a smart control apparatus 200 according to some embodiments of the disclosure. As shown in FIG. 3, in some embodiments, the system can be divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer.

Figure 4:
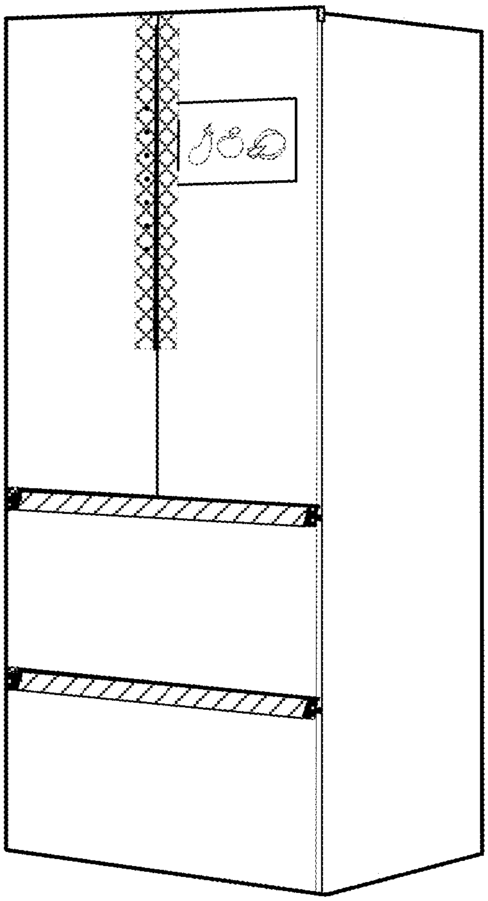
FIG. 4 shows a schematic view of a food storage apparatus according to some embodiments of the disclosure.

FIG. 4 shows a schematic view of the food storage apparatus according to some embodiments. As shown in FIG. 4, a display screen can be provided on a door of a refrigerator compartment, and the display screen can be embedded in the door body. In some embodiments, a plane where the display screen is located can be flush with an outer surface of the door.

In some embodiments, the food storage apparatus may further include a processor, which is connected with the display screen and used to execute instructions to cause the apparatus to interact with the server to obtain information and data, draw user interfaces, and output display signals to the display screen. The display screen can receive display signals from the processor to display corresponding image information, for example user interfaces.

In some embodiments, the food storage apparatus with a display can provide users with various functions such as intelligent processing, intelligent storage, and multifunctional reminders of food. The information processing methods for food stored in the food storage apparatus can include adding food information, modifying food information, and deleting food information. Each time a process operation is executed, any item in the food can be processed, and food change information can be generated correspondingly, which is used to update the food information for the food stored in the food storage apparatus.

When processing the information of food stored in the food storage apparatus by adding information, after placing the food in the food storage apparatus, the user can add corresponding food information to the food storage apparatus through some operations. The food stored in the food storage apparatus is presented in the user interface on the display screen in the form of food icons, and the user can know what existing food is stored in the food storage apparatus according to the food icon(s) presented in the user interface. Here, the food icons can be generated based on the food information corresponding to the existing food in the food storage apparatus, and the food information can include food name, food shelf life, adding time, and quantity of food.

In current food storage apparatus products, after the user adds food to the food storage apparatus, the corresponding food information can only be added and displayed at the food storage apparatus side. If the user in the living room or other rooms wants to view the information of the food in the food storage apparatus, they need to come to the location of the food storage apparatus (such as the kitchen) to view it. Or, after the user puts the food into the food storage apparatus, they enter the living room or other rooms, but because they forget to add food information to the food storage apparatus, they need to return to the location of the food storage apparatus (such as the kitchen) to add it again.

In some embodiments, when processing the information of food stored in the food storage apparatus by modifying the information, for example, if there are five ice creams stored in the food storage apparatus, if the user takes out one ice cream from the food storage apparatus and comes to the living room, in this case, the number of ice creams in the food storage apparatus becomes 4, and the user forgets to modify the food quantity in the food information corresponding to the ice cream at the food storage apparatus side, then when the user wants to modify it, they need to return to the location of the food storage apparatus again. Here, if the user takes out the last ice cream from the food storage apparatus, in this case, there is no ice cream in the food storage apparatus, and the corresponding food information needs to be deleted, which is to process the information of food in the food storage apparatus by deleting information.

The process operations of adding, modifying, deleting, and viewing food information from the food storage apparatus side causes great inconvenience for users.

In view of this, in order to facilitate users to process the information of food stored in the food storage apparatus anywhere, this disclosure provides a multi-terminal based method for processing food information, which can realize the information processing for the food stored in the food storage apparatus through multiple terminals. The multiple terminals can include but are not limited to a display apparatus, a smart terminal, a second screen, etc. The display apparatus can be a television, and the food storage apparatus can be a refrigerator, freezer, wine cabinet, etc., with a display screen. The smart terminal can be a mobile phone, PAD, etc., and the second screen can be a portable smart device with a display screen and a Bluetooth module. The implementation of information processing of food in the food storage apparatus by the second screen can refer to the implementation of information processing of food in the food storage apparatus by the display apparatus, and will be omitted here.

In some embodiments, when implementing multi-terminal based food information processing, the food storage apparatus, display apparatus (or second screen), smart terminal, and server can be involved. The server can include a server configured with Artificial Intelligence & Internet of Things (AIOT) function, which can realize information synchronization between various terminals and realize multi-terminal based food information processing. In this case, the user needs to log into a same account on terminals such as food storage apparatus, display apparatus, and smart terminal for account binding.

The multi-terminal based method for food information processing can enable users to process information of food stored in the food storage apparatus on any terminal. The generated food change information can be synchronized to other terminals, making the food information stored in each terminal consistent. Multi-terminal based food information processing is interconnected with food information, and users can manage information of food stored in the food storage apparatus in real-time and on-site, making food information processing more efficient and greatly improving the quality of life.

Figure 5:
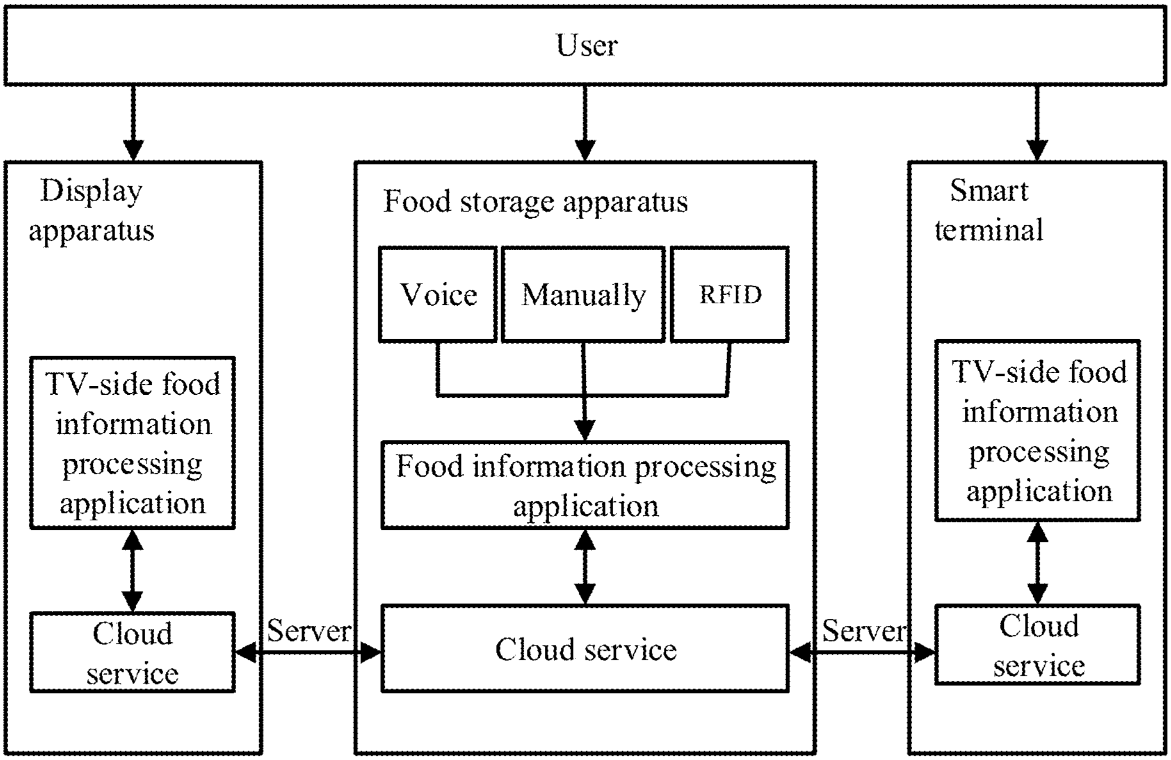
FIG. 5 shows an architecture diagram of a system for multi-terminal based food information processing according to some embodiments of the disclosure.

FIG. 5 shows an architecture diagram of a system for multi-terminal based food information processing according to some embodiments. Referring to FIG. 5, communication connections can be established between the display apparatus, food storage apparatus, and smart terminal through the server. The display apparatus can be configured with a TV-side food information processing application and a cloud service. The cloud service can communicate with the food storage apparatus and smart terminal through the server. The TV-side food information processing application can be used to update food information, for example, to synchronize food change information generated at this end to the food storage apparatus and smart terminal respectively through cloud service and the server, and to receive food change information generated by the food storage apparatus or smart terminal to update the food information stored in the display apparatus, making the food information stored in the three terminals consistent.

The food storage apparatus can be configured with an information adding module, a food information processing application on the food storage apparatus side, and a cloud service. The information adding module can be used to implement process operations such as adding, modifying, and deleting food information, and can include a voice adding module, a manual adding module, and an RFID (radio frequency identification) adding module. The voice adding module can be used to process food information through voice, the manual adding module can be used to manage food information by manually operating the interface for food information processing, and the RFID adding module can be used for adding food information by scanning RFID tags attached to the food.

The cloud service on the food storage apparatus side can communicate with the display apparatus and the smart terminal through the server. The food information processing application on the food storage apparatus side can be used to update the food information stored on the food storage apparatus side based on the food information generated by the information adding module, for example, to synchronize food change information generated by this end to the display apparatus and the smart terminal respectively through the cloud service on the food storage apparatus side and the server, and to receive food change information generated by the display apparatus or smart terminal to update the food information stored in the food storage apparatus, synchronizing the food information stored in the three terminals.

The smart terminal can be configured with a mobile-side food information processing application and a cloud service. The cloud service can communicate with the food storage apparatus and display apparatus through the server. The mobile-side food information processing application can be used to update food information, for example, to synchronize food change information generated by this end to the food storage apparatus and the display apparatus respectively through cloud service and the server, and to receive food change information generated by the food storage apparatus or display apparatus to update the food information stored in the smart terminal, synchronizing the food information stored in the three terminals. The multi-terminal based method for food information processing according to the disclosure facilitates users to manage food information on the food storage apparatus, smart terminal, and display apparatus, realizing multi-terminal based food information processing and food information interconnection, realizing information interaction between multiple terminals through the server, and greatly improving the quality of user life.

Figure 6:
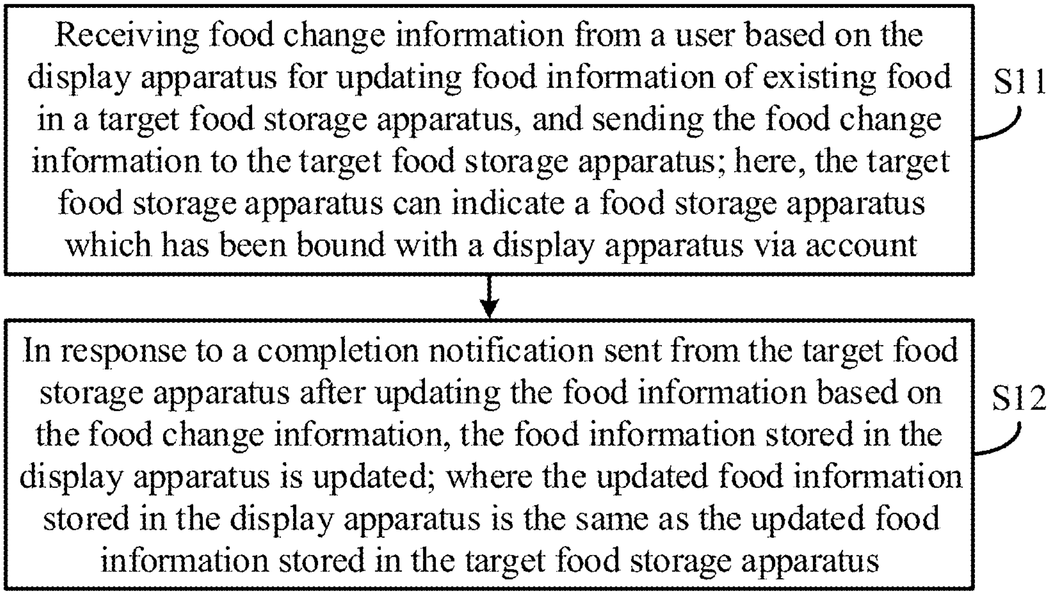
FIG. 6 shows a flowchart of a multi-terminal based method for managing food information in a display apparatus according to some embodiments of the disclosure.
Figure 7:
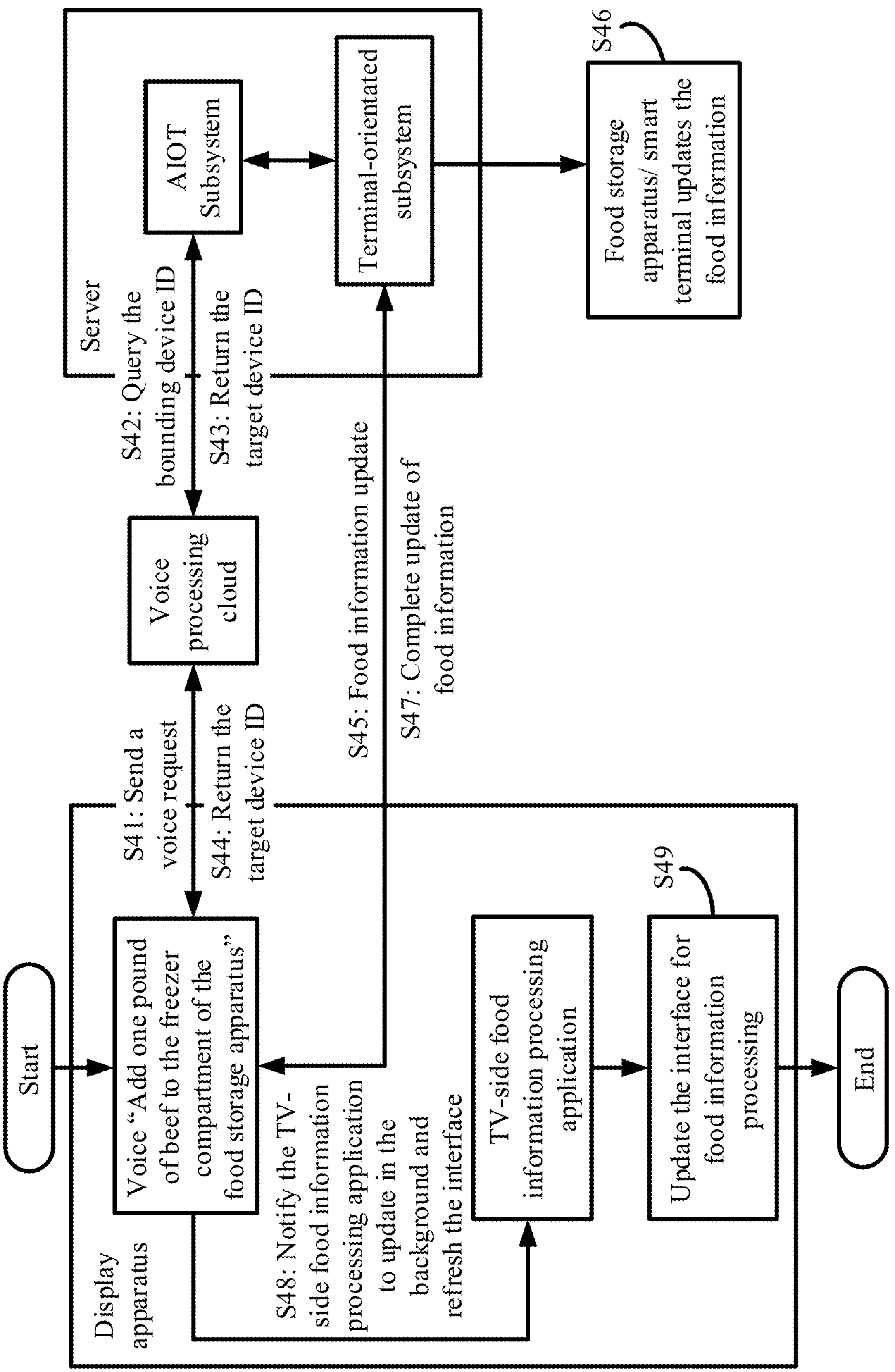
FIG. 7 shows a data flow diagram of a multi-terminal based method for managing food information in a display apparatus according to some embodiments of the disclosure.

FIG. 6 shows a flowchart of a multi-terminal based method for food information processing in a display apparatus according to some embodiments. FIG. 7 shows a flow diagram of a multi-terminal based method for food information processing in a display apparatus according to some embodiments. A display apparatus according to embodiments of the disclosure can include: a display configured for displaying a user interface and at least one processor connected with the display. When executing the multi-terminal based method for food information processing shown in FIGS. 6 and 7, the at least one processor is configured to execute instructions to cause the display apparatus to perform the following steps.

S11: receiving food change information from a user based on the display apparatus for updating food information of existing food in a target food storage apparatus, and sending the food change information to the target food storage apparatus; here, the target food storage apparatus can indicate a food storage apparatus which has been bound with a display apparatus via account.

When processing food information stored on the food storage apparatus based on the display apparatus, the user operates the display apparatus to manage food information, synchronously generating food change information. The food storage apparatus with the food information processing that can be operated by the user on the display apparatus is the target food storage apparatus which is bound with the display apparatus via account. After being associated with the same account, the display apparatus and the target food storage apparatus can synchronize information. The methods for inputting food change information from the user based on the display apparatus can include voice input and manual input.

In some embodiments, when the food change information is input via voice, a voice application needs to be configured in the display apparatus, and the voice application is used to recognize user's voice commands. The display apparatus needs to be in a non-off state, at which point the voice application is in an active state to detect user voice commands in real time.

Figure 8:
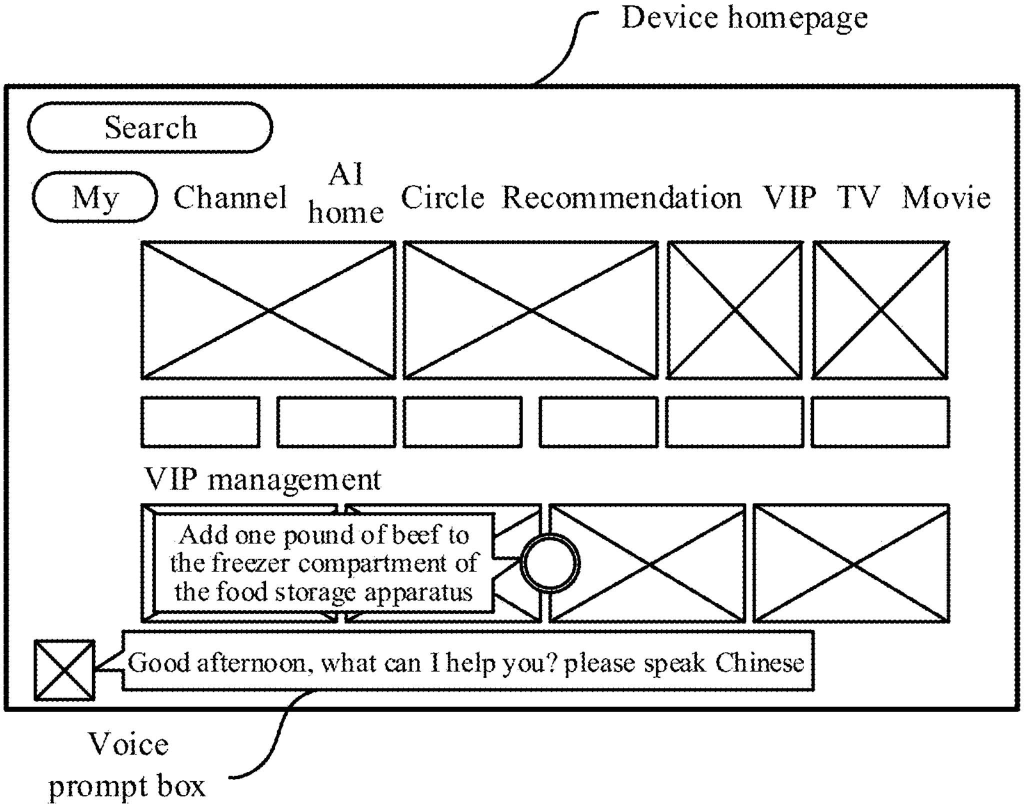
FIG. 8 shows a schematic diagram of a homepage of a display apparatus according to some embodiments of the disclosure.

FIG. 8 shows a schematic diagram of a device homepage of the display apparatus according to some embodiments. Referring to FIG. 8, after the display apparatus is started, a voice prompt box can be presented in the homepage of the display apparatus, and the voice prompt box can be used to prompt the user to interact with the display apparatus via voice.

When the user needs to manage food information in the food storage apparatus, taking adding food information as an example, the user can say a voice command to add food information, such as "Add one pound of beef to the freezer compartment of the food storage apparatus." In this case, the voice application in the display apparatus can recognize the voice command and synchronously generates a voice request to a voice processing cloud. The voice processing cloud can parse the voice command carried in the voice request and extract the food information.

The food information can include food name "beef", food weight unit "pound", food quantity "1", storage apparatus "food storage apparatus", storage compartment "freezer", processing type "addition", and adding time "time of generating voice, such as 9:00", etc. At the same time, the voice processing cloud can query the food shelf life of "beef" from the server, and add the queried food shelf life "90 days" to the food information parsed from the voice to return the above food information to the display apparatus's voice application.

When processing the food information, food change information is synchronously generated. Food change information indicates information that is different from food information stored in the food storage apparatus and generated during the current processing of food information. If the processing operation is addition, the food change information is the newly added food information including all item data; if the processing operation is modification, the food change information is at least one item of data in the food information, such as data about modification of food quantity, food name, etc.; if the processing operation is deletion, the food change information is the deleted food information including all item data.

In some embodiments, when food change information is input manually, a food information processing application needs to be configured in the display apparatus and displayed on the homepage. The user can select the food information processing application via the remote control to enable an interface for food information processing to be shown on the display.

Figure 9:
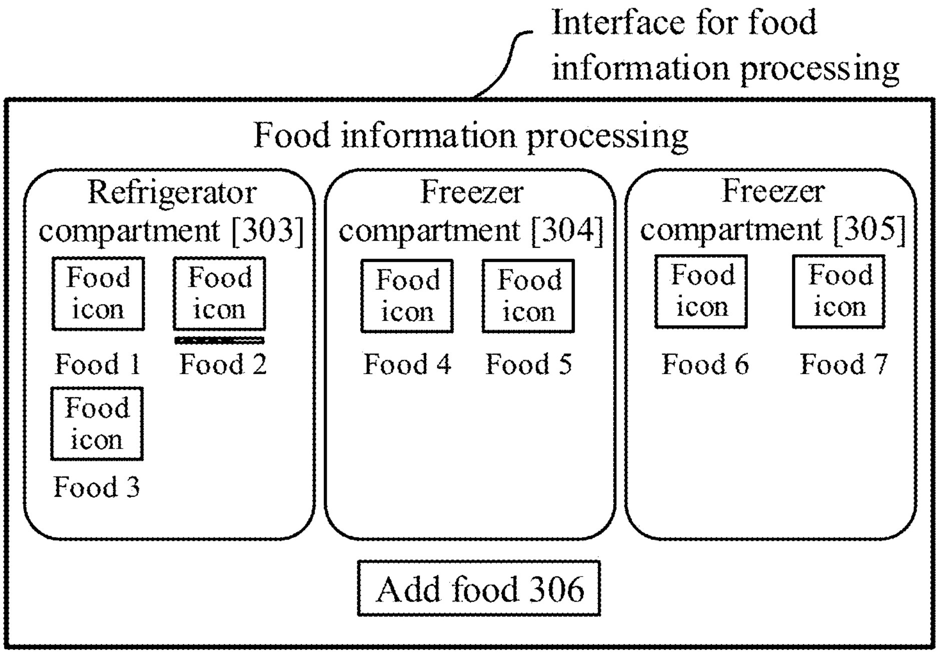
FIG. 9 shows a schematic diagram of an interface for food information processing shown on a display apparatus according to some embodiments of the disclosure.

FIG. 9 shows a schematic diagram of an interface for food information processing shown on a display apparatus according to some embodiments. Referring to FIG. 9, after the user selects the food information processing application via the remote control or voice, the interface for food information processing can be activated, and the content displayed on the display apparatus's display can switch from the homepage to the interface for food information processing. The interface for food information processing can show the food information of all existing foods stored in the food storage apparatus, and the food information corresponding to each existing food can be displayed in the form of food icon. After selecting the target food for which the food information needs to be managed, the user can operate the remote control to move the cursor to the target food icon (such as food 6), and select an edit button on the remote control. An interface for editing food information can pop up and appear above the interface for food information processing.

Figure 10:
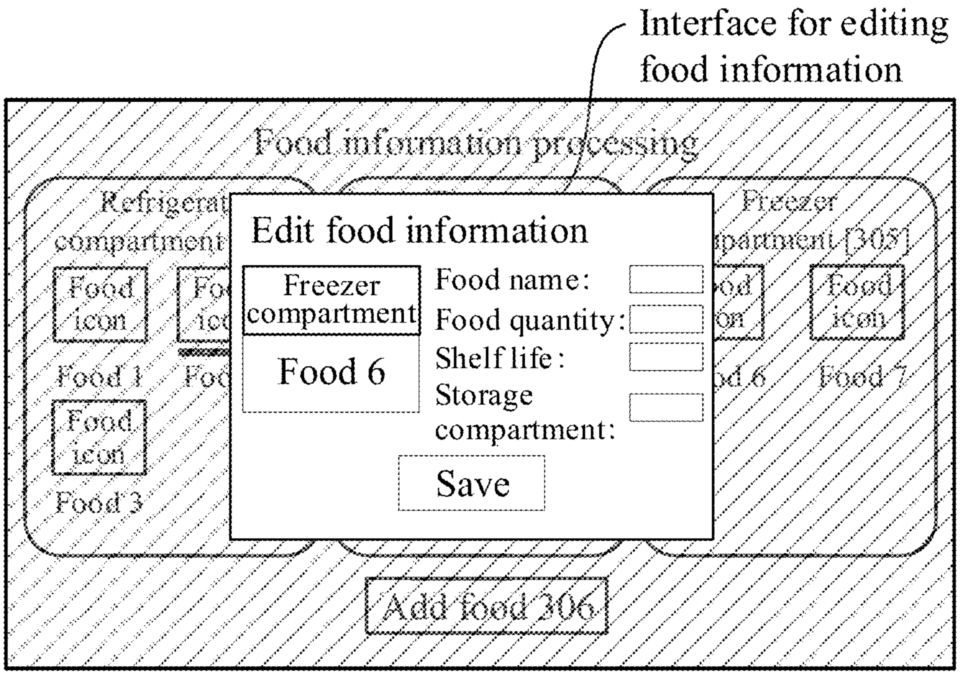
FIG. 10 shows a schematic diagram of an interface for editing food information presenting on a display apparatus according to some embodiments of the disclosure.

FIG. 10 shows a schematic diagram of an interface for editing food information presenting on a display apparatus according to some embodiments. Referring to FIG. 10, the interface for editing food information is displayed as a pop-up window above the interface for food information processing, and the interface for editing food information shows various existing data that can be modified corresponding to the target food (such as food 6), such as food name, food quantity, shelf life, storage compartment, etc.

After completing the processing of the corresponding item data of the target food, a "save" control on the interface for editing food information can be selected to generate the corresponding food change information. When the target food is beef, if the user modifies the food name from "beef" to "Australian beef", the food change information can be the modified food name "Australian beef"; if the user modifies the food quantity from "one pound" to "500 grams", the food change information can be the modified food quantity "500 grams"; if the user modifies the storage compartment from "freezer" to "refrigerator", the food change can be the modified storage compartment "refrigerator". If the user modifies data of multiple items at the same time, the food change information is a collection of the modified data of multiple items.

In some embodiments, the user can view the food information of each item in the interface for food information processing. In this case, the user can operate the remote control to display the cursor on the target food, and press a confirmation button on the remote control. An interface for food detail information can pop up on the interface for food information processing.

Figure 11:
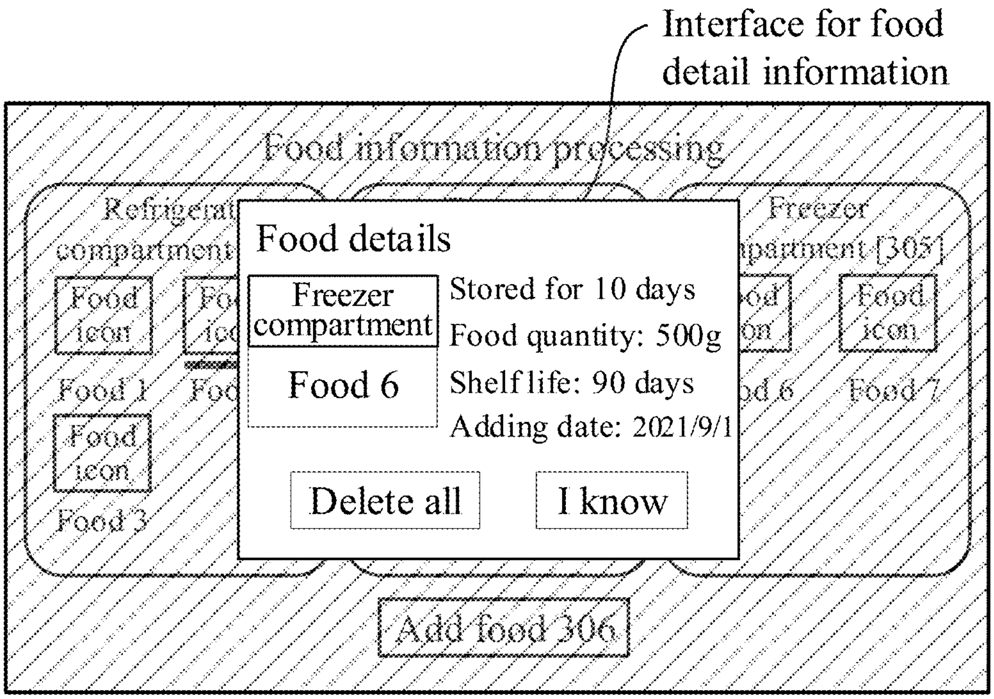
FIG. 11 shows a schematic diagram of an interface for food detail information presenting on a display apparatus according to some embodiments of the disclosure.

FIG. 11 is a schematic diagram of an interface for food detail information presenting on a display apparatus according to some embodiments. Referring to FIG. 11, the interface for food detail information is displayed as a floating window in the interface for food information processing, and the content displayed in the interface for food detail information can include food icon, storage compartment, storage time, food quantity, shelf life, date of placement, and food freshness, etc. After viewing the food information, the user clicks the "OK" control in the interface for food detail information to exit the interface for food detail information and return to the interface for food information processing.

In some embodiments, if the user takes out all of a certain food from the food storage apparatus, all food information of the target food needs to be deleted. In this case, when the user wants to delete the food information of the target food stored in the food storage apparatus from the display apparatus, the user can select the interface for food detail information after selecting the target food in the interface for food information processing, and select the "delete all" control on the interface for food detail information to realize the deletion of all food information of the target food. After performing the deletion process operation, the interface for food detail information disappears automatically, and the interface for food information processing appears. The food icon of the target food disappears from the interface for food information processing, and the subsequent food icons are displayed to fill the vacancy. In this case, the food change information generated by the deletion operation is the deletion of all food information of the target food, and the processing status is being deleted.

In some embodiments, there is further an automatic deletion method for deleting food information of the target food. For example, if the user takes out a certain food from the food storage apparatus, the food can be automatically identified as being taken out by detecting the RFID tag. After the food storage apparatus detects information changes (food information decrease), it notifies the display apparatus to automatically delete the food information of the taken-out food. If the display apparatus is in a shutdown state at this time, the food information of the taken-out food can be saved to the cloud. After a next power-up, the display apparatus can automatically update the food information from the cloud, that is, the food information of the taken-out food can be deleted.

In some embodiments, if the user puts a target food into the food storage apparatus, the corresponding food information needs to be added to ensure consistency between the food and the food information. In this case, when the user wants to add the food information of the target food stored in the food storage apparatus from the display apparatus, the user can select an "add food" control on the interface for food information processing (such as 306 shown in FIG. 9), and an interface for adding food information can pop up and be displayed above the interface for food information processing to allow the food information to be added.

Figure 12:
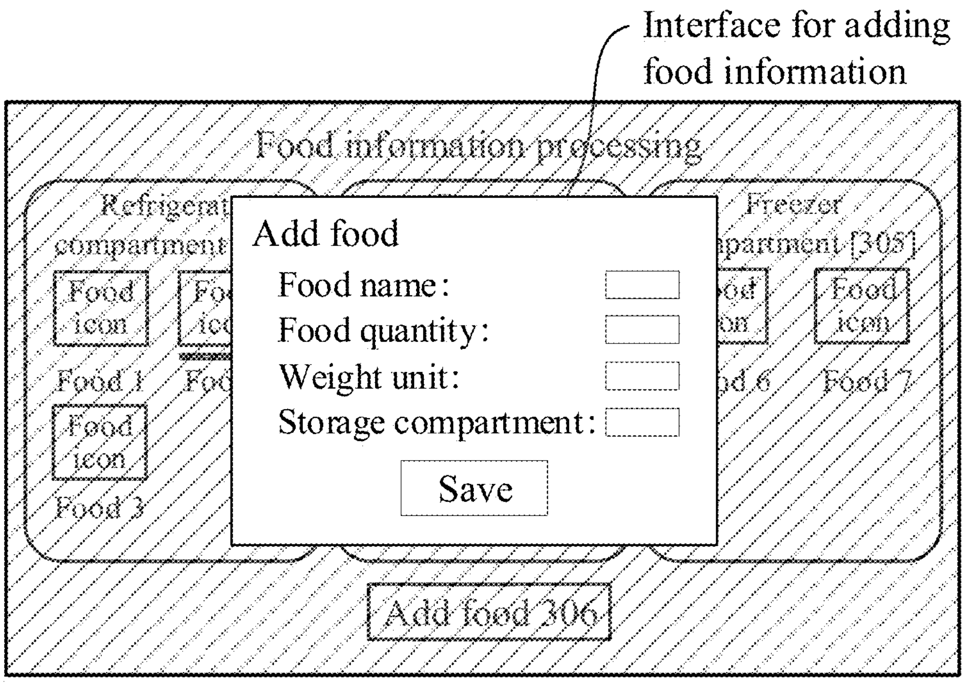
FIG. 12 shows a schematic diagram of an interface for adding food information presenting on a display apparatus according to some embodiments of the disclosure.

FIG. 12 shows a schematic diagram of an interface for adding food information presenting on a display apparatus according to some embodiments. Referring to FIG. 12, the interface for adding food information shows various data that need to be manually added by the user, such as food name, food quantity, food weight unit, storage compartment, etc. The data such as adding time, shelf life, etc., can be automatically generated by the server.

After completing the addition of the corresponding item data of the target food, the "save" control on the interface for adding food information can be selected to generate the corresponding food change information. In this case, the food change information generated by the addition operation is all food information of the target food that has been added.

After the user operates the display apparatus using any of the aforementioned input methods to generate food change information, in order to synchronize with the existing food information in the food storage apparatus, the food change information needs to be sent to the target food storage apparatus. The food change information is used to update the existing food information of the target food storage apparatus. After the update, the food information stored in the target food storage apparatus is consistent or same with the food information stored in the display apparatus.

In some embodiments, the at least one processor is further configured to execute instructions to cause the display apparatus to perform:

- obtaining a specified account which the display apparatus is logged into, sending a device query request carrying the specified account to a server, where the device query request is used to instruct the server to query a target device ID corresponding to the specified account, and the target device ID indicates a target food storage apparatus logged into the same specified account as the display apparatus;
- receiving the target device ID corresponding to the specified account returned from the server in response to the device query request, and sending the food change information via the server to the target food storage apparatus corresponding to the target device ID.

When the user operates the display apparatus to manage food information in the food storage apparatus, the generated food change information needs to be synchronized to the food storage apparatus. To determine the target food storage apparatus that the display apparatus needs to synchronize information with, the target food storage apparatus bound with the display apparatus can be determined through the account.

For this purpose, based on the specified account under which the display apparatus is logged into, the device query request is generated and sent to the server to query the target apparatus corresponding to the display apparatus associated via account.

In some embodiments, when the user operates the display apparatus to generate food change information via voice, referring again to FIG. 7, the method can include the following.

- S41: recognizing the voice command and sending a voice request to a voice processing cloud. For example, this processing can be done by a voice application in the display apparatus. In addition to the voice command that needs semantic parsing, the voice request also can include the specified account under which the display apparatus is logged into.
- S42: generating a device query request based on the specified account and sending the device query request to the server. For example, the device query request can be generated by a terminal device.

In some embodiments, the server can include an AIOT subsystem and a terminal-oriented subsystem. The AIOT subsystem can receive a device query request sent from a terminal, and query the device ID (such as device ID) corresponding to the specified account. Based on that the target device ID queried indicates that an apparatus logged into the specified account is a food storage apparatus, the apparatus corresponding to the target device ID is the target food storage apparatus logged into the same specified account as the display apparatus.

Because there may be multiple devices logged into the same specified account in the same household, such as two food storage apparatuses both logged into the specified account. In this case, to facilitate the display apparatus to synchronize information with the food storage apparatus where the food is actually stored, the user needs to determine the target food storage apparatus that needs information synchronization.

In some embodiments, the at least one processor is further configured to execute instructions to cause the display apparatus to perform the following steps:

- based on that a plurality of device IDs corresponding to the specified account are queried from the server, receiving an inquiry instruction generated based on the plurality of device IDs and including a plurality of selection options from the server;
- receiving a target selection option based on the inquiry instruction, determining the device ID corresponding to the target selection option as the target device ID.

When multiple device IDs logged into the same specified account as the display apparatus are found in the server (AIOT subsystem), it is necessary to ask the user which apparatus actually needs to update the food information. In this case, the server can generate multiple selection options based on the queried multiple device IDs, generate an inquiry instruction and return the inquiry instruction to the display apparatus.

In some embodiments, the display apparatus can display the inquiry instruction via voice. It outputs each selection option in the inquiry instruction by voice. For example, the broadcast content may be "There are multiple apparatuses, please choose the food storage apparatus A or food storage apparatus B that needs to be managed." After hearing the voice output content, the user can interact via voice, such as saying "Select food storage apparatus A", then the target selection option is determined as food storage apparatus A, and the server can then determine the target device ID as the device ID corresponding to food storage apparatus A.

In some embodiments, the display apparatus can display the inquiry instruction via a graphical user interface. In this case, the display apparatus can receive the inquiry instruction returned from the server and generate an interface for device selection based on the selection options carried in the inquiry instruction, which is shown on the display. For example, the interface for device selection shows options such as "Food storage apparatus A" and "Food storage apparatus B". When the user selects one of the selection options, the device ID corresponding to that selection option is determined as the target device ID.

- S43~S44: the AIOT subsystem returning the queried target device ID to the voice application on the display apparatus via the voice processing cloud, and meanwhile, the terminal returning the food change information parsed from the voice command to the voice application.
- S45: in order to synchronize the food change information to the target food storage apparatus, the voice application calls the terminal-orientated subsystem in the server to send the food change information to the target food storage apparatus corresponding to the target device ID via the terminal-orientated subsystem.
- S46: the target food storage apparatus updates the food information stored in the target food storage apparatus based on the food change information generated by the display apparatus.

In some embodiments, to ensure that the terminal-orientated subsystem can send the food change information generated by the display apparatus to the target food storage apparatus, the AIOT subsystem synchronizes the target device ID to the terminal-orientated subsystem after querying the target device ID based on the specified account in the device query request sent from the voice processing cloud. After the voice application on the display apparatus sends the food change information and the target device ID to the terminal-orientated subsystem, the terminal-orientated subsystem determines whether the target device ID sent from the AIOT subsystem matches the target device ID sent from the voice application.

If the two target device IDs match, it indicates that the target apparatus that needs to synchronize the food change information generated by the display apparatus is the target apparatus queried by the AIOT subsystem. Therefore, the terminal-orientated subsystem can send the food change information generated by the display apparatus to the corresponding target food storage apparatus based on the target device ID.

If the two target device IDs do not match, it indicates that the target apparatus that needs to synchronize the food change information generated by the display apparatus is not the target apparatus queried by the AIOT subsystem. In this case, the display apparatus fails to synchronize the information to the target food storage apparatus and may prompt the user to check the status of the food storage apparatus before retrying.

In some embodiments, if the user manually operates the display apparatus to generate food change information, the food change notification generated by the TV-side food information processing application can be directly sent to the AIOT subsystem via the cloud service. The AIOT subsystem can query the target device ID based on the change notification and return it to the television-side food information processing application. The TV-side food information processing application can send the food change information to the target food storage apparatus corresponding to the target device ID via the terminal-orientated subsystem. The processes executed by the AIOT subsystem and the terminal-orientated subsystem can refer to the contents of the previous embodiments.

- S12: in response to a completion notification sent from the target food storage apparatus after updating the food information based on the food change information, the food information stored in the display apparatus is updated; where the updated food information stored in the display apparatus is the same as the updated food information stored in the target food storage apparatus.

After the target food storage apparatus receives the food change information generated by the display apparatus and sent from the terminal-orientated subsystem, it can update the food information stored in the target food storage apparatus based on this food change information.

- S47: after completing the update of the food information in the target food storage apparatus, the target food storage apparatus returns a completion notification to the display apparatus.

Although the user issues a food change command first on the display apparatus, the information related to the food change command is not directly synchronized to the food storage apparatus on the display apparatus. The food information processing on the display apparatus must be consistent or same with the status of the food storage apparatus, so after issuing the food change command on the display apparatus, the status of the display apparatus will be updated only after the food storage apparatus has completed the information update.

S48~S49: if the display apparatus receives a completion notification returned from the target food storage apparatus within a preset interval, it indicates that the update of the food information on the target food storage apparatus was successful. In this case, the display apparatus can update the food information stored in the display apparatus based on the food change information. After both terminals have completed the information update, the updated food information stored in the display apparatus is the same as the updated food information stored in the target food storage apparatus.

In some embodiments, the network problem may cause the food storage apparatus to fail to receive the food change information sent from the display apparatus, resulting in the inability to update the food information in the food storage apparatus. Therefore, to ensure the synchronization of the food information in the food storage apparatus with that in the display apparatus, the update process at the display apparatus side can be executed only after the update process at the food storage apparatus side is successful.

A time limit for the completion of the update process at the food storage apparatus side is set, such as 3 seconds, that is, the preset interval is 3 seconds. If the display apparatus receives a completion notification returned from the food storage apparatus within 3 seconds, the display apparatus can execute the update process. If the display apparatus does not receive a completion notification returned by the food storage apparatus within 3 seconds, the display apparatus does not execute the update process.

When the display apparatus does not receive a completion notification returned from the target food storage apparatus within the preset interval, the at least one processor is further configured to execute instructions to cause the display apparatus to perform: based on that the completion notification returned from the target food storage apparatus is not received within the preset duration, deleting the food change information, and generating an update failure prompt, where the update failure prompt is used to prompt the user that the target food storage apparatus has not completed the update process of the food information.

If the display apparatus does not receive a completion notification returned from the target food storage apparatus through the terminal-orientated subsystem within the preset interval from when the food change information is sent to the target food storage apparatus by the terminal-orientated subsystem, it indicates that the target food storage apparatus is abnormal and unable to update the food information. Therefore, to ensure the consistency of the food information stored in the display apparatus and the food storage apparatus, the display apparatus side does not perform the food information update. In this case, the display apparatus side can delete the food change information generated this time.

To remind the user that the update of the target food storage apparatus failed and to remind the user to check the abnormality of the target food storage apparatus, a failure prompt is generated when the completion notification returned from the target food storage apparatus is not received. The failure prompt can be presented via voice and output through the player of the display apparatus. The failure prompt can be presented on the interface by displaying the prompt content on the display of the display apparatus to prompt the user that the target food storage apparatus has not completed the update process of the food information and needs to be checked for abnormalities.

If the user attempts to send food change information to the target food storage apparatus again after receiving the failure prompt, the user can select the “save” control on the interface for adding food information, select the “save” control on the interface for editing food information, or utter the previous voice command again to start the next information synchronization process. In this case, the display apparatus can resend the food change information to the target food storage apparatus via the terminal-orientated subsystem. In the subsequent attempts, the process of obtaining food change information, determining the target food storage apparatus, and sending food change information can refer to the above embodiments.

In some embodiments, when the user manually operates the display apparatus to process the information of food in the food storage apparatus, if there is a food change information generated in the display apparatus, since the interface for food information processing is in the activated state at this time, the interface for food information processing can directly update the displayed content based on the food change information. The displayed content is the food information of all food after update.

In some embodiments, when the user operates the display apparatus to process the food information in the food storage apparatus via voice, if there is one piece of food change information generated in the display apparatus, the food change information is first stored in the display apparatus, and the food information stored in the display apparatus is updated in the background. When it is necessary to display the interface for food information processing to view the updated food information, the food information processing application configured in the display apparatus needs to be selected to start.

In some embodiments, if the user selects the food information processing application on the display apparatus, the interface for food information processing is displayed on the screen. The interface for food information processing shows all updated food information. Therefore, when the food information in the target food storage apparatus is checked via the display apparatus, the at least one processor is further configured to execute the instructions to cause the display apparatus to perform: in response to a start command based on a selection of the food information processing application on the display apparatus, generating the interface for food information processing based on the updated food information stored in the display apparatus, displaying the interface for food information processing in the user interface, where the interface for food information processing can include food icons generated based on the food information of existing food in the target food storage apparatus.

After the information synchronization between the display apparatus and the food storage apparatus, the display apparatus can view the food information of all existing foods stored in the current food storage apparatus on the display apparatus, and the displayed food information on the display apparatus is consistent with all the food information currently stored in the food storage apparatus.

When the user needs to view the food information of existing food in the target food storage apparatus via the display apparatus, the user can select the control of the food information processing application displayed on the homepage of the display apparatus using the remote control to generate a start command. The display apparatus can respond to the start command, generate the interface for food information processing based on the updated food information currently stored in the display apparatus, and displays it on the display.

Figure 13:
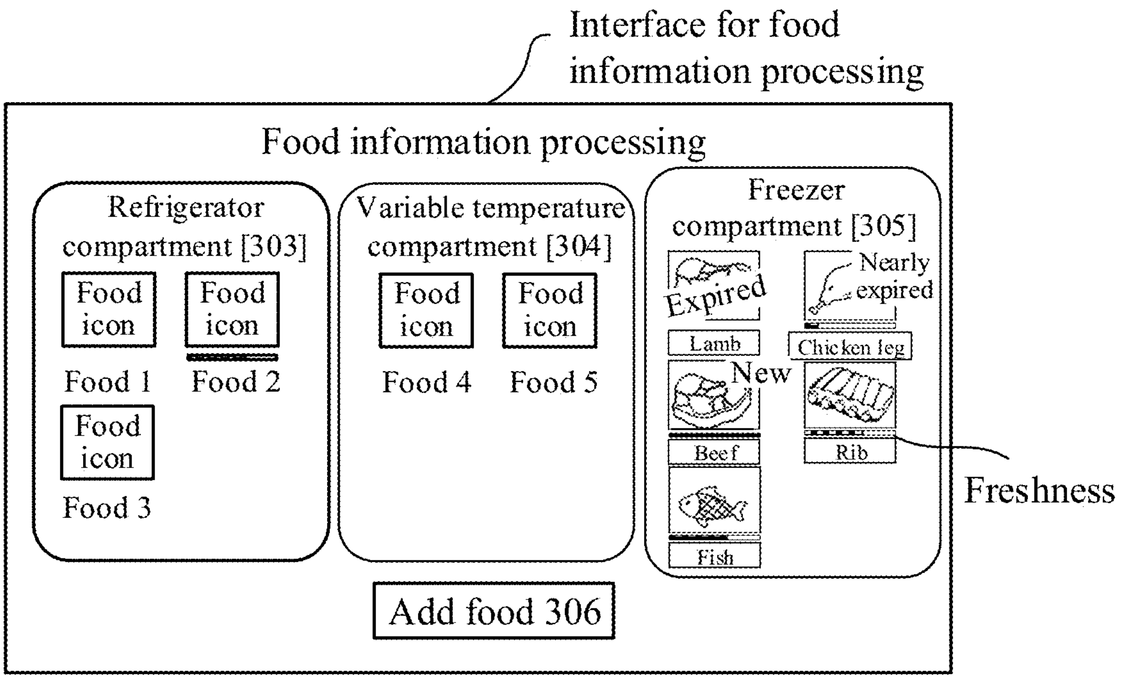
FIG. 13 shows a schematic diagram of an updated interface for food information processing shown on a display apparatus according to some embodiments of the disclosure.

FIG. 13 shows a schematic diagram of an updated interface for food information processing shown on a display apparatus according to some embodiments. Regardless of whether the content of the interface for food information processing is manually selected to be displayed or automatically updated while in the display state, the way the content is displayed in the interface for food information processing is the same. Referring to FIG. 13, according to the actual compartment configuration of the food storage apparatus, the display area for each compartment can be generated on the interface for food information processing, such as a display area 303 for refrigerator compartment and a display area 305 for freezer compartment. If the food storage apparatus is configured with a variable temperature compartment, the interface for food information processing further shows a display area 304 for variable temperature compartment.

The food information of the food stored in the refrigerator compartment of the food storage apparatus is displayed in the display area for the refrigerator compartment, the food information of the food stored in the freezer compartment of the food storage apparatus is displayed in the display area for the freezer compartment, and the food information of the food stored in the variable temperature compartment of the food storage apparatus is displayed in the display area for the variable temperature compartment.

In a same display area, the display order of the food information of each item is first sorted according to the shelf life. The food information of expired food is displayed first, followed by the food information of nearly expired food; then the food information of the latest added food is displayed after the expired ones; the remaining food information is sorted according to the time of addition, with the relatively recently added food information displayed after the information of the most recently added items, and the information of the earliest added food displayed at the end. The food information of each item is displayed in the form of a food icon.

For example, after the user puts "beef" in the freezer compartment of the food storage apparatus, the operation of adding the corresponding food information is performed on the display apparatus. When displaying the interface for food information processing, the newly added "beef" icon is displayed at the beginning of the display area for the freezer compartment. To indicate which food is the most recently added, a tag can be displayed on the corresponding side of the food icon, such as displaying the "new" tag in the upper right corner of the "beef" icon.

In the refrigerator compartment of the food storage apparatus, when there are ribs (added on October 10th, shelf life of 90 days), fish (added on September 5th, shelf life of 60 days), chicken legs (added on September 1st, shelf life of 45 days), and lamb (added on July 1st, shelf life of 60 days), if the current date is October 12th, it can be determined that the expired food is lamb, the nearly expired food is chicken legs, and the remaining food are ribs and fish, arranged in descending order of adding time.

Therefore, the expired lamb icon is displayed at the beginning of the display area 305 for the refrigerator compartment, followed by the nearly expired chicken leg icon, then the newly added beef icon, and finally the ribs and fish icons. In order to allow users to know the freshness of each item, an "expired" tag can be displayed on the expired food icon, and a "nearly expired" tag can be displayed in the upper right corner of the icon of nearly expired food. The display order of the food icons in the display areas for the refrigerator compartment and the variable temperature compartment can refer to the display order in the display area for the refrigerator compartment.

In some embodiments, to allow users to timely know the food freshness of each item without having to click into the interface for food detail information for each item, the display apparatus can calculate the food freshness based on the adding date and shelf life of the food, and display it in the form of a progress bar. The progress bar can be displayed below the food icon.

Food freshness indicates the remaining days before the expiration date of the food. The calculation method of food freshness can be: freshness time (freshTime)=shelf life (expTime)−adding time (addTime). Food freshness (%)=freshness time (freshTime)/Shelf life (expTime).

When the freshness time is converted into a progress bar for display, if the progress bar is fully filled with 1 (100%), then the food freshness (%)=freshTime/expTime falls within the interval of 66.7%-100%, and the corresponding progress bar is filled between [⅔, 1] for display, meaning that the food freshness indicates that the food is fresh. If the food freshness (%)=freshTime/expTime falls within the interval of 33.3%-66.7%, the corresponding progress bar is filled between [⅓, ⅔] for display, meaning that the food freshness indicates that the food is relatively fresh. If the food freshness (%)=freshTime/expTime falls within the interval of 0%-33.3%, the corresponding progress bar is filled with [0, ⅓] for display, meaning that the food freshness indicates that the food is nearly expired. If the food freshness time (freshTime)<0, then the progress bar is not filled for display, meaning that the food freshness indicates that the food is expired.

In some embodiments, when the user manages the food information in the food storage apparatus based on the display apparatus to generate food change information, the generated food change information is synchronized to the food storage apparatus which is bound with the display apparatus via account. Therefore, when the user manages the food information in the food storage apparatus based on the food storage apparatus to generate food change information, the food storage apparatus needs to synchronize the food change information to the display apparatus, so that the food information on both sides is synchronized.

In view of this, when the user operates the food storage apparatus to manage food information and synchronize information to the display apparatus, the at least one processor is further configured to execute instructions to cause the display apparatus to perform:

receiving the food change information from the user while updating the food information of existing food sent from the target food storage apparatus;

based on the food change information generated by the target food storage apparatus, updating the food information stored in the display apparatus.

If the user adds corresponding food information on the interface for food information processing shown on the display apparatus immediately after adding the food into the food storage apparatus, or if the user manages the food information of existing food on the food storage apparatus, the food storage apparatus can generate corresponding food change information. In this case, the food storage apparatus can send the food change information to the display apparatus whose account is bounded with the food storage apparatus.

After the display apparatus receives the food change information sent from the target food storage apparatus, the food information stored in the display apparatus can be updated. After the food information is updated on both the food storage apparatus side and the display apparatus side, the updated food information stored in the display apparatus is the same as the updated food information stored in the food storage apparatus. The process of the food storage apparatus generating food change information and synchronizing it to the display apparatus can refer to subsequent embodiments at the food storage apparatus side.

In some embodiments, in the same household, the terminal that can be used for managing the food information in the food storage apparatus, in addition to the display apparatus mentioned above, can further be a smart terminal. In this case, the smart terminal, display apparatus, and food storage apparatus need to log into the same specified account.

Among the device IDs queried by the AIOT subsystem based on the device query request sent from the display apparatus, if there is a smart terminal logged into the same specified account as the display apparatus, when the display apparatus generates food change information, the display apparatus needs to synchronize the food information to the smart terminal.

Therefore, when the display apparatus needs to synchronize food change information to the mobile terminal, the at least one processor is further configured to execute instructions to cause the display apparatus to perform: if there is a smart terminal logged into the same specified account as the display apparatus, after responding to the completion notification sent from the target food storage apparatus, sending the food change information to the smart terminal-bound with the display apparatus, where the food change information is used to update the food information stored in the smart terminal. The updated food information stored in the smart terminal, the updated food information stored in the display apparatus, and the updated food information stored in the target food storage apparatus are the same.

If the device ID queried by the AIOT subsystem indicates that there is a smart terminal logged into the same specified account as the display apparatus, when the display apparatus generates food change information, the display apparatus needs to synchronize the food change information to the target food storage apparatus and the smart terminal.

Since the food storage apparatus may be prone to fail to receive the food change information sent from the display apparatus and fail to update due to network problems, the processes of updating food information in the display apparatus and the smart terminal are both performed after the food storage apparatus is successfully updated. Therefore, after the display apparatus receives the completion notification returned from the target food storage apparatus, the display apparatus updates its own food information, and then synchronizes the food change information to the smart terminal.

After the smart terminal receives the food change information sent from the display apparatus, the food information stored in the smart terminal can be updated. After all three terminals have completed the information update, the updated food information stored in the smart terminal, the updated food information stored in the display apparatus, and the updated food information stored in the target food storage apparatus are the same.

In some embodiments, users can operate the smart terminal to manage the food information in the food storage apparatus and synchronize the generated food change information to the display apparatus and the food storage apparatus, to allow the food information on the three terminals to be consistent.

In this case, when the user operates the smart terminal to process food information and synchronize the food information to the display apparatus, the at least one processor is further configured to execute instructions to cause the display apparatus to perform:

- receiving food change information from the user while updating the food information of existing food in the target food storage apparatus sent from the smart terminal;
- based on the food change information generated by the smart terminal, updating the food information stored in the display apparatus.

If the user adds corresponding food information on the interface for food information processing displayed on the smart terminal immediately after adding the food into the food storage apparatus, or if the user manages the food information of existing food on the smart terminal, the smart terminal will generate corresponding food change information. In this case, the smart terminal will send the food change information to the display apparatus and the food storage apparatus which are bound with the smart terminal via account.

After the display apparatus receives the food change information sent from the smart terminal, the food information stored in the display apparatus can be updated. After the smart terminal, the food storage apparatus, and the display apparatus update the food information, the updated food information stored in the smart terminal, the updated food information stored in the display apparatus, and the updated food information stored in the target food storage apparatus are the same.

The process of the smart terminal receiving the food change information sent from the display apparatus for updating the food information in the smart terminal, the process of the smart terminal generating food change information and synchronizing it to the display apparatus and the food storage apparatus can refer to the subsequent embodiments at the smart terminal side.

The display apparatus according to the embodiments of the disclosure allows for managing food information in the food storage apparatus. After the user operates the display apparatus to generate food change information, the food change information can be synchronized to the food storage apparatus and the smart terminal bound with the display apparatus via account to update the food information stored in the food storage apparatus and the smart terminal. After each terminal updates food information based on the food change information sent from the display apparatus, the updated food information stored in the smart terminal, the updated food information stored in the display apparatus, and the updated food information stored in the target food storage apparatus are the same. Therefore, users can manage and view food information in the food storage apparatus on different terminals, and food information can be interlinked and communicated among terminals, allowing the user to manage the food information of the food in the food storage apparatus in real time and on site, making food information processing more efficient and greatly improving the quality of life for users.

Figure 14:
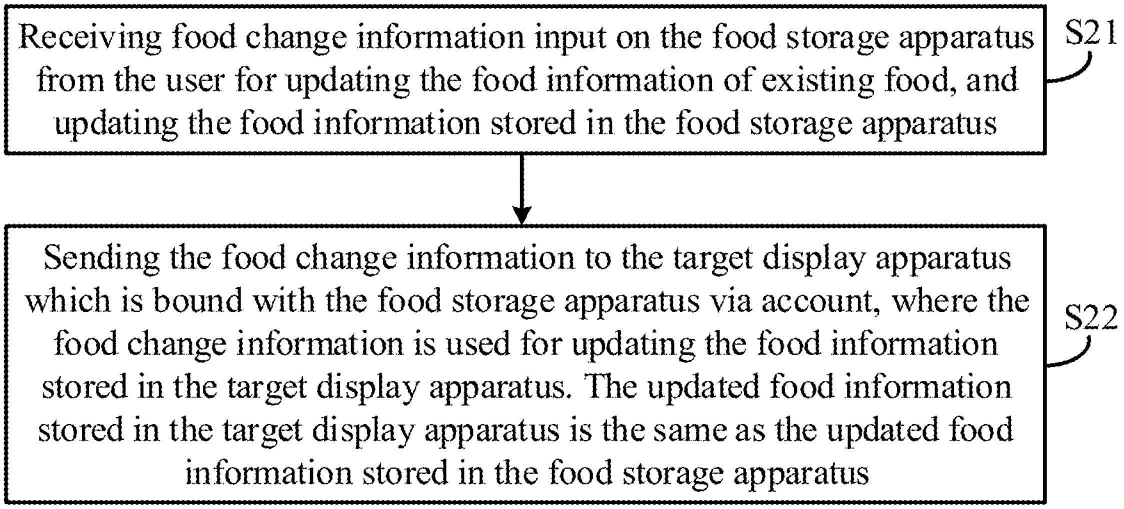
FIG. 14 shows a flowchart of a multi-terminal based method for managing food information in a food storage apparatus according to some embodiments of the disclosure.
Figure 15:
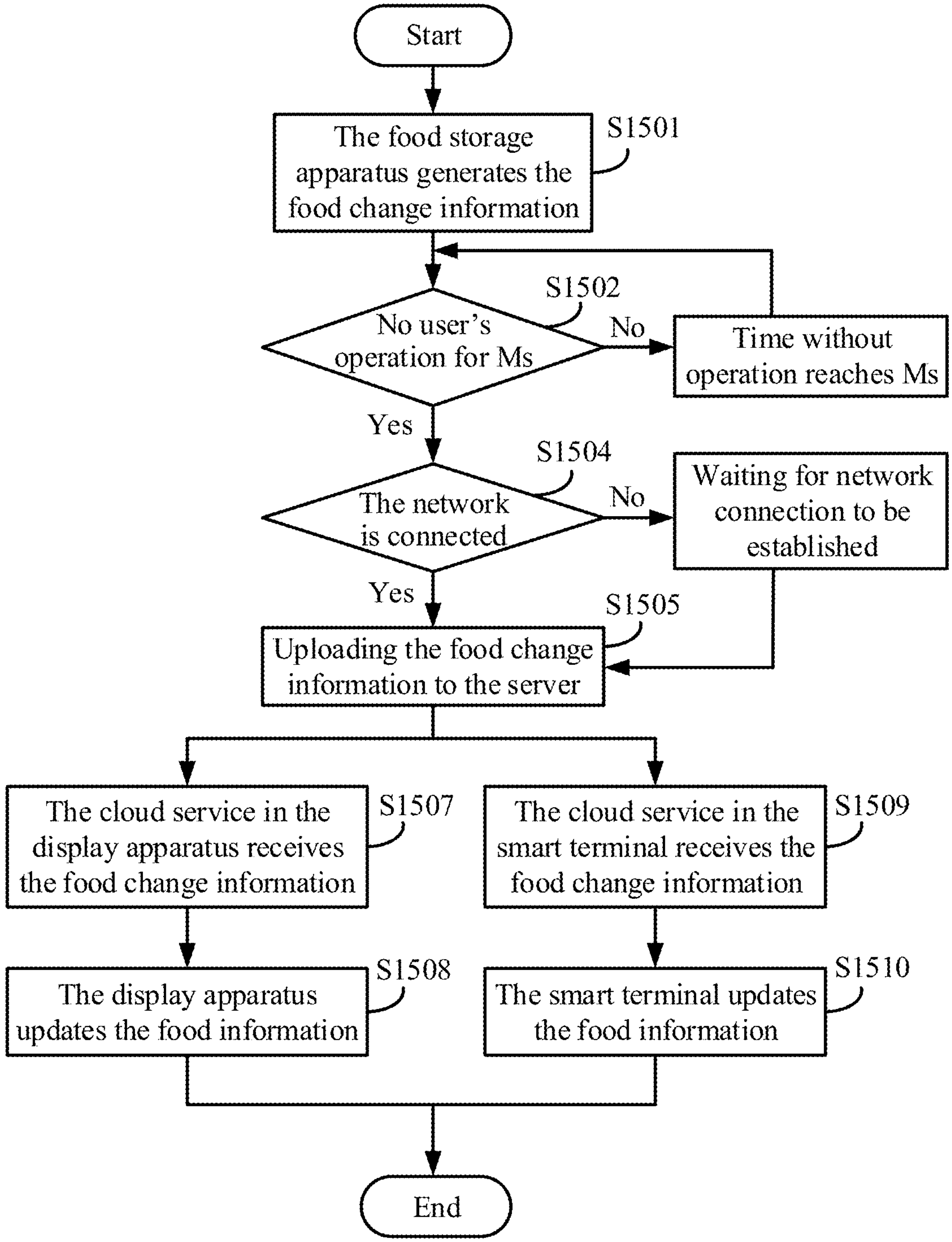
FIG. 15 shows a data flow diagram of a multi-terminal based method for managing food information in a food storage apparatus according to some embodiments of the disclosure.

FIG. 14 shows a flowchart of a multi-terminal based method for food information processing in the food storage apparatus according to some embodiments. FIG. 15 is a flow diagram of a multi-terminal based method for food information processing in the food storage apparatus according to some embodiments. The food storage apparatus according to the embodiments of the disclosure can include: a body including a storage compartment; a door at an opening of the storage compartment; a display arranged on the door for displaying an interface for food information processing, where food icons generated based on food information of existing food stored in the food storage apparatus are presented in the interface for food information processing; and at least one processor connected with the display. When running the multi-terminal based method for food information processing shown in FIGS. 14 and 15, the at least one processor is configured to execute instructions to cause the food storage apparatus to perform the following steps.

S21: receiving food change information input on the food storage apparatus from the user for updating the food information of existing food, and updating the food information stored in the food storage apparatus.

S1501: when the user manages the food information of the existing food stored in the food storage apparatus based on the food storage apparatus, the user operates the food storage apparatus to manage the food information, generating food change information synchronously. The methods for inputting the food change information from the user based on the food storage apparatus can include voice input method and manual input method.

When the user manages the food information in the food storage apparatus via voice, a voice application can be installed in the food storage apparatus to recognize a user's voice command in real-time. The voice application can send the voice command to a voice processing cloud for parsing to obtain the food change information. The interaction process between the food storage apparatus and the voice processing cloud can refer to the interaction process between the display apparatus and the voice processing cloud in the aforementioned embodiments.

When the user manages the food information in the food storage apparatus manually, it can be done via the interface for food information processing shown on the display on the door of the food storage apparatus.

Figure 16:
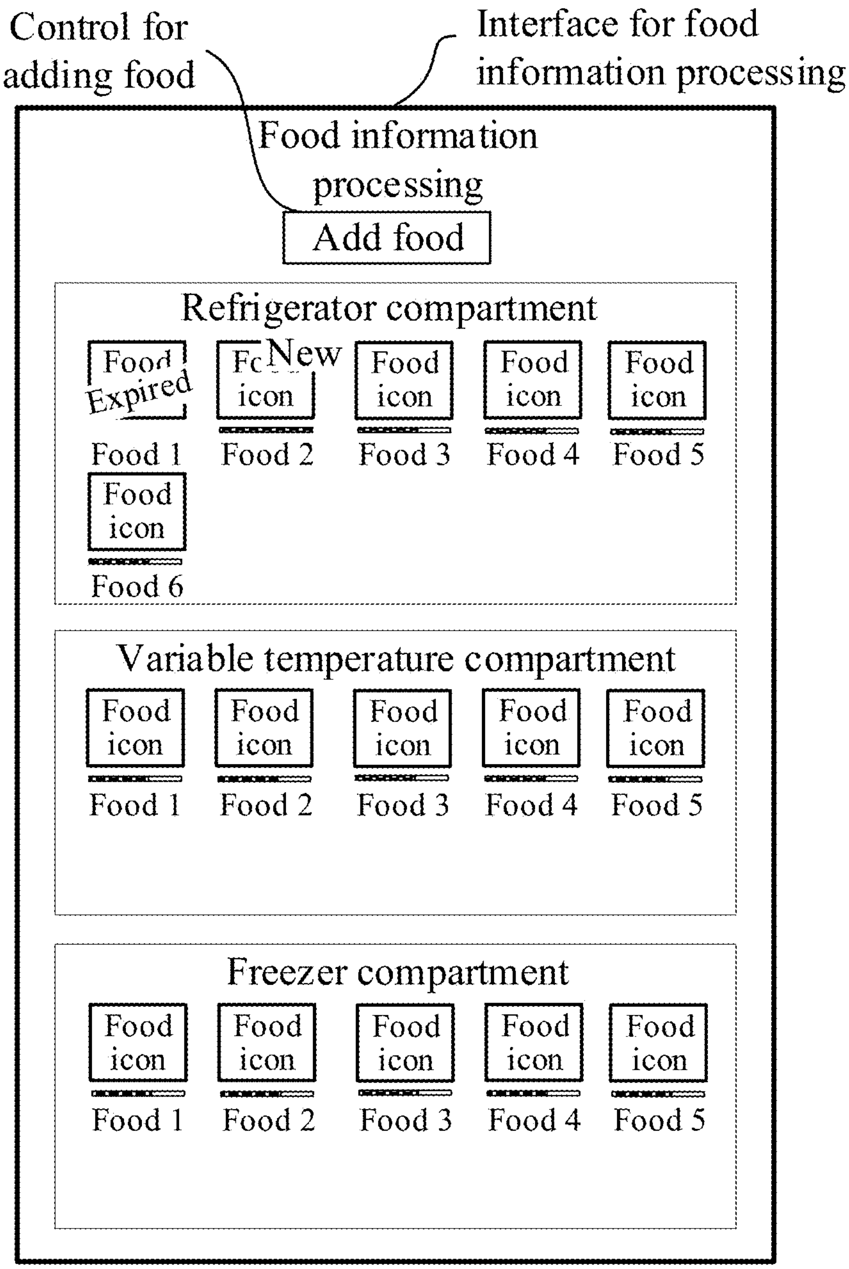
FIG. 16 shows a schematic diagram of an interface for food information processing shown on a food storage apparatus according to some embodiments of the disclosure.

FIG. 16 shows a schematic diagram of an interface for food information processing displayed on the food storage apparatus according to some embodiments. Referring to FIG. 16, according to the actual compartment configuration of the food storage apparatus, a display area for each compartment can be generated on the interface for food information processing, such as a display area for a refrigerator compartment and display area for a freezer compartment. If the food storage apparatus is further equipped with a variable temperature compartment, then the interface for food information processing further shows a display area for the variable temperature compartment.

The food information of the food stored in the refrigerator compartment of the food storage apparatus is displayed in the display area for the refrigerator compartment, the food information of the food stored in the freezer compartment of the food storage apparatus is presented in the display area for the freezer compartment, and the food information of the food stored in the variable temperature compartment of the food storage apparatus is displayed in the display area for the variable temperature compartment. The display order of the food icons presented in each display area can refer to the methods used in the display apparatus in the aforementioned embodiments.

In some embodiments, the interface for food information processing shows a control for adding food information. If the user needs to store food information of newly added food into the food storage apparatus, the control for adding food information can be selected. In the pop-up interface for adding food information, food information can be input to generate food change information.

Figure 17:
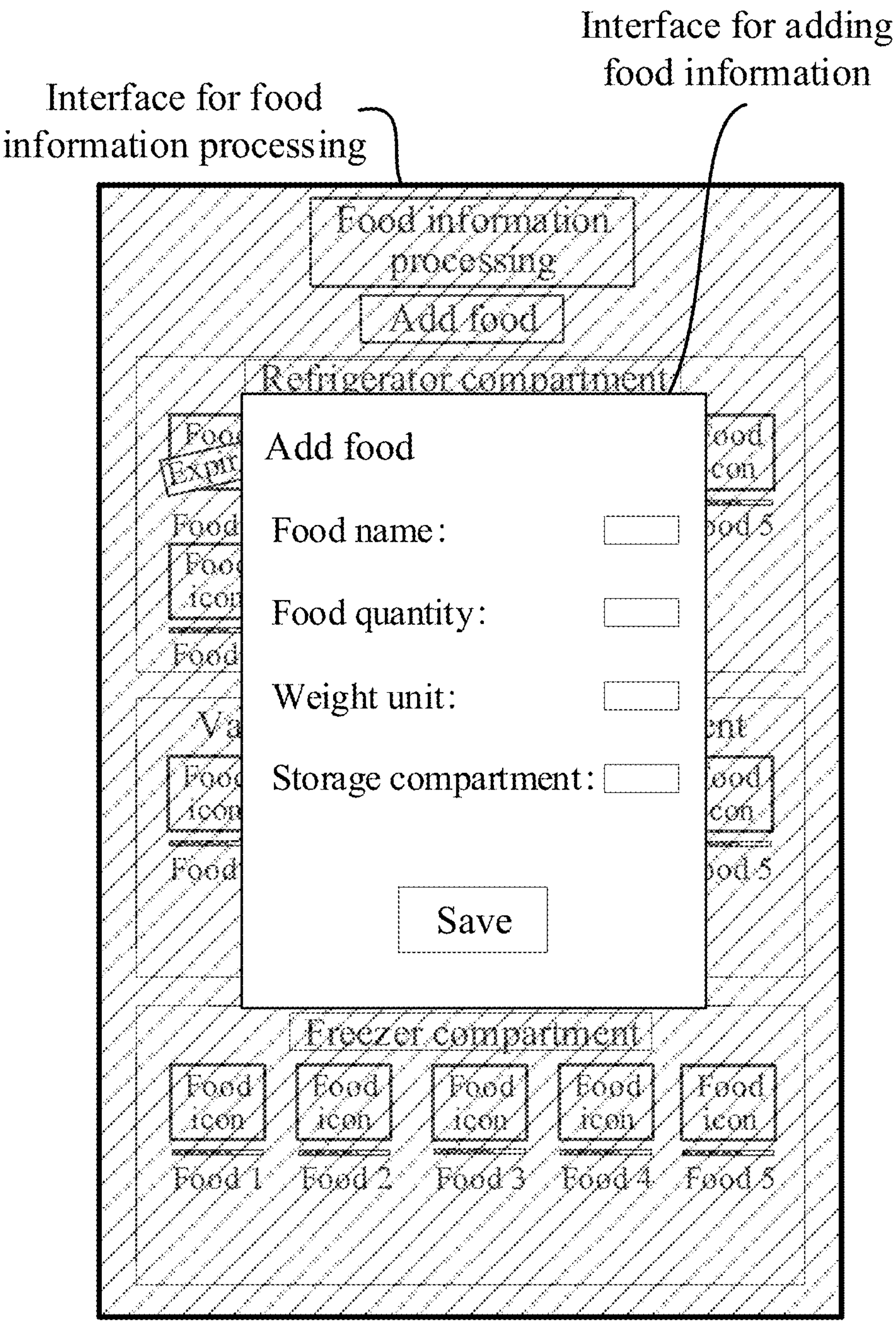
FIG. 17 shows a schematic diagram of an interface for adding food information presenting on a food storage apparatus according to some embodiments of the disclosure.

FIG. 17 shows a schematic diagram of the interface for adding food information on the food storage apparatus according to some embodiments. The interface for adding food information overlays above the interface for food information processing. Referring to FIG. 17, the interface for adding food information shows various items of data that need to be manually added by the user, such as food name, quantity, unit, storage compartment, etc. For items such as adding time and shelf life, the data can be generated automatically by the server.

After completing the addition of the data corresponding to target food, the "save" control in the interface for adding food information can be selected to generate corresponding food change information. In this case, the food change information generated by the addition operation is all the food information of the added target food.

In some embodiments, when the user needs to modify or delete the food information of a certain kind of food, the user can select the food icon of the target food to pop up an interface for food detail information from the interface for food information processing.

Figure 18:
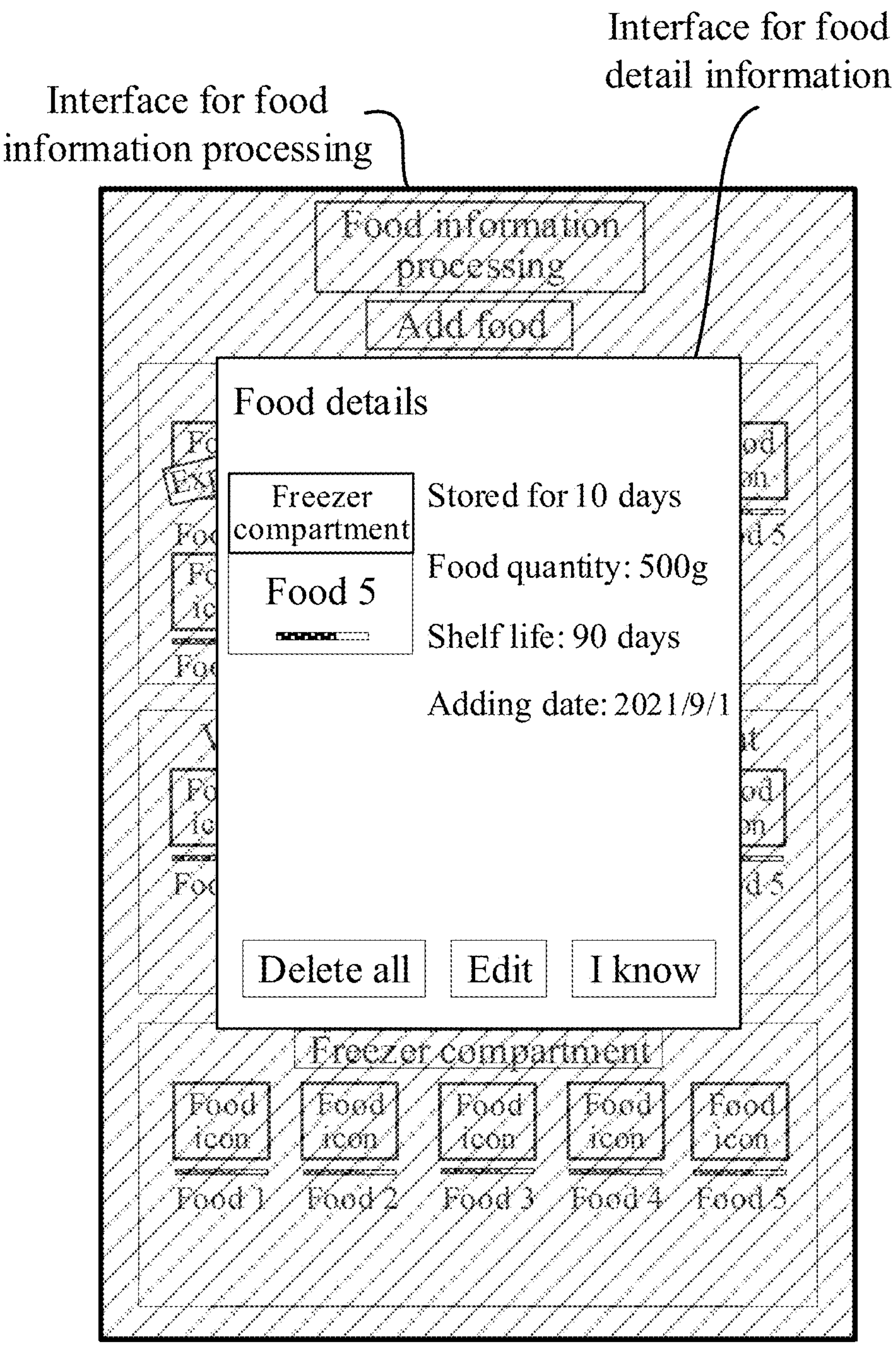
FIG. 18 shows a schematic diagram of an interface for food detail information presenting on a food storage apparatus according to some embodiments of the disclosure.

FIG. 18 shows a schematic diagram of the interface for food detail information on the food storage apparatus according to some embodiments. The interface for food detail information overlays above the interface for food information processing. Referring to FIG. 18, the content presented in the interface for food detail information can include food icon, storage compartment, adding time, food quantity, shelf life, adding date, and food freshness, etc. After viewing the food information, click an "I know" control in the interface for food detail information to exit the interface for food detail information and return to the interface for food information processing.

The interface for food detail information further shows an edit control, such as the "edit" control in FIG. 18. When the user needs to modify the food information of a certain item, the user can select the edit control to pop up the interface for editing food information, which is displayed above the interface for food information processing.

Figure 19:
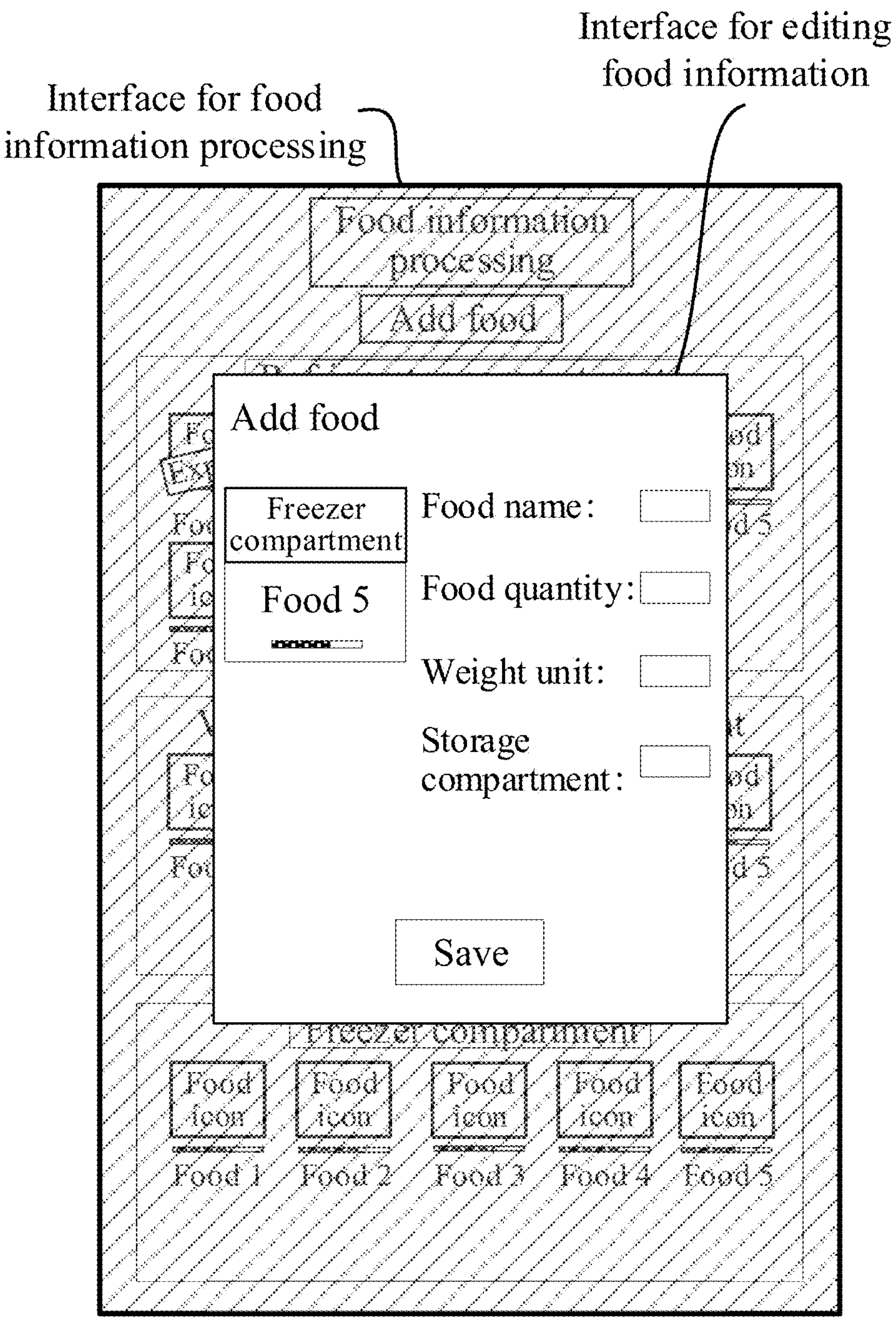
FIG. 19 shows a schematic diagram of an interface for editing food information presenting on a food storage apparatus according to some embodiments of the disclosure.

FIG. 19 shows a schematic diagram of the interface for editing food information in the food storage apparatus according to some embodiments. Referring to FIG. 19, the interface for editing food information is displayed as a floating layer above the interface for food information processing, presenting various items of existing data that can be modified for the target food, such as food name, quantity, shelf life, storage compartment, etc. After modifying the data presented in the interface for editing food information, click the "save" control to obtain food change information. In this case, the modified data is the food change information generated by this processing.

In some embodiments, if the user removes all of a certain kind of food from the food storage apparatus, it is necessary to delete all the food information of the target food. The interface for food detail information further shows a delete control, such as the "delete all" control in FIG. 18. Selecting the delete control can achieve the deletion of all food information of the target food. After the deletion operation, the interface for editing food information automatically disappears, the food icon of the target food disappears on the display, and the subsequent food icons are displayed to fill the position. In this case, the food change information generated by the deletion operation is all the food information deleted for the target food, and the processing status is deletion.

Food change information generated by user operations on the food storage apparatus can include food addition information, food modification information, and food deletion information, etc. After the food change information is generated on the food storage apparatus, the food information stored in the food storage apparatus can be updated. The interface for food information processing can directly update the display content based on the food change information, and the displayed content is the food information of all food after update.

Referring to FIG. 16 again, if the newly added food is food 2, then the newly added food information is shown with a "new" tag in the upper right corner of the food icon to remind the user that "food 2" is the newly added food.

In some embodiments, in order for users to know the freshness of each food without having to click into the interface for food detail information to view each item, the display apparatus can calculate the freshness of the food based on the adding date and shelf life of the food, and show it in the form of a progress bar. The calculation method of food freshness and the presentation method of the progress bar can refer to the content of the aforementioned embodiments.

- S22: sending the food change information to the target display apparatus which is bound with the food storage apparatus via account, where the food change information is used for updating the food information stored in the target display apparatus. The updated food information stored in the target display apparatus is the same as the updated food information stored in the food storage apparatus.

After the user operates on the food storage apparatus to manage food information, the food information can be updated based on the generated food change information. Meanwhile, in order for users to view and manage the food information stored in the food storage apparatus on other terminals, the food storage apparatus needs to synchronize the food information with other terminals.

Therefore, after the food storage apparatus generates food change information, it needs to synchronize the food change information to the target display apparatus which is bound with the food storage apparatus via account. The food change information can be used to update the food information stored in the target display apparatus, and the updated food information stored in the target display apparatus is the same as the updated food information stored in the food storage apparatus.

In some embodiments, since the user may perform multiple process operations simultaneously when operating on the food storage apparatus to process food information, in order to improve the efficiency of food information processing, after all processing operations on the food storage apparatus are completed, the generated food change information can be synchronously sent to other terminals.

Therefore, when the food storage apparatus determines the time of synchronizing information to other terminals, the processor is further configured to execute instructions to cause the food storage apparatus to perform the following.

- S1502~S1503: before sending the food change information to the target display apparatus, determining whether new food change information has been received within a preset duration.

Based on that no new food change information is received within the preset duration, the food change information is sent to the target display apparatus which is bound with the food storage apparatus via account.

After the food storage apparatus generates one piece of food change information, the food storage apparatus can detect whether there is a second piece of food change information, that is, whether a next operation is performed by the user within the preset time period. If no new food change information is received within the preset duration, it means that the user has not performed any operation within the preset M seconds (Ms), in this case, the generated food change information can be sent to the target display apparatus which is bound with the food storage apparatus via account.

In some embodiments, the preset time period can be set to 30 seconds or other values according to actual implementation conditions. The threshold value of the preset time period should not be too small, as a too small value may cause frequent uploading of food information, consuming cloud resources. The user may not immediately view on other terminals after food change information being generated on a certain terminal. Therefore, food change information does not need to be synchronized to other terminals immediately.

In some embodiments, when synchronizing information to other terminals by the food storage apparatus, the food storage apparatus needs to be connected with the network.

- S1504: based on that there is no operation from the user within the preset time period, the food storage apparatus further determines whether the network is connected.
- S1505: based on that the network is connected, sending the food change information to the target display apparatus which is bound with the food storage apparatus based on account via the server.
- S1506: based on that the network is not connected, prompting the user of a network failure, and sending the food change information after the network is connected.

When synchronizing information to other terminals by the food storage apparatus, it is necessary to first determine the display apparatus that is logged into the same specified account as the food storage apparatus. In this case, the food storage apparatus can send a device query request carrying the specified account to the AIOT subsystem, and the AIOT subsystem can query the corresponding target device ID and return it to the food storage apparatus, and synchronize it to the terminal-orientated subsystem. The food storage apparatus can synchronize the food change information to the target display apparatus corresponding to the target device ID via the terminal-orientated subsystem. The process performed by the server (AIOT subsystem and terminal-orientated subsystem) can refer to the process performed by the server in the aforementioned embodiments.

- S1507~S1508: a cloud service of the display apparatus receives the food change information, and the display apparatus updates the food information.

In some embodiments, after the cloud service of the display apparatus receives the food change information sent from the terminal-orientated subsystem, it can notify the TV-side food information processing application, and the food information processing application can update the food information stored in the display apparatus based on the food change information. This food change information can be first stored in the display apparatus and then be used to update the food information stored in the display apparatus in the background. If the user selects the food information processing application on the display apparatus, the interface for food information processing can be shown on the display, and the updated food information can be shown. The relevant content can refer to the aforementioned embodiments.

S1509~S1510: a cloud service of the smart terminal receives the food change information, and the smart terminal updates the food information.

In some embodiments, after the cloud service of the smart terminal receives the food change information sent from the terminal-orientated subsystem, it can notify the mobile-side food information processing application, and the food information processing application can update the food information stored in the smart terminal based on the food change information. This food change information can be first stored in the smart terminal and then be used to update the food information stored in the smart terminal in the background. If the user selects the food information processing application on the smart terminal, the interface for food information processing can be shown on the display, and the updated food information can be shown. The relevant content can refer to subsequent embodiments at the smart terminal side.

In some embodiments, if the user manages the food information of the food storage apparatus based on the display apparatus, the food storage apparatus needs to update the food information stored in the food storage apparatus based on the food change information synchronized from the display apparatus. Therefore, the at least one processor is further configured to execute instructions to cause the food storage apparatus perform the following steps:

- receiving the food change information sent from the target display apparatus when updating the food information of the existing food in the food storage apparatus;
- based on the food change information generated by the target display apparatus, updating the food information stored in the food storage apparatus.

If the user adds food information in the food storage apparatus immediately after adding the food in the food storage apparatus, or if the user manages the existing food information on the display apparatus, the display apparatus can generate food change information accordingly. In this case, the display apparatus can send the food change information to the smart terminal and the food storage apparatus bound with it based on account. After the food storage apparatus receives the food change information sent from the display apparatus, it can update the food information stored in the food storage apparatus. After the smart terminal, the food storage apparatus, and the display apparatus update the food information, the updated food information stored in the smart terminal, the updated food information stored in the display apparatus, and the updated food information stored in the food storage apparatus are the same.

After receiving food change information sent from the display apparatus, the smart terminal can update the food information stored in the smart terminal. After the information is updated on all three ends, the updated food information stored in the smart terminal, the updated food information stored in the display apparatus, and the updated food information stored in the target food storage apparatus are same.

In some embodiments, the user can operate on the smart terminal to process the food information of the food in the food storage apparatus, and the food change information can be synchronized to the display apparatus and the food storage apparatus to allow the food information in the three devices to be same. When the food storage apparatus needs to synchronize the food change information to the smart terminal, the at least one processor is further configured to execute instructions to cause the food storage apparatus to perform: if there is a smart terminal logged into the same specified account as the food storage apparatus, sending the food change information to the smart terminal which is bound with the food storage apparatus via account, where the food change information is used for updating the food information in the smart terminal. The updated food information stored in the smart terminal, the updated food information stored in the display apparatus, and the updated food information stored in the target food storage apparatus are same.

If the device ID queried by the AIOT subsystem indicates that there is a smart terminal logged into the same specified account as the food storage apparatus, when the food storage apparatus generates food change information, the food storage apparatus needs to synchronize the food change information to the target display apparatus and the smart terminal.

After receiving the food change information sent from the food storage apparatus, the smart terminal can update the food information stored in the smart terminal. After the three devices all complete the information update, the updated food information stored in the smart terminal, the updated food information stored in the display apparatus, and the updated food information stored in the target food storage apparatus are same.

In some embodiments, while the user operates the smart terminal for food information processing to synchronize information with the food storage apparatus, the at least one processor is further configured to execute instructions to cause the food storage apparatus to perform:

- receiving food change information generated when the food information of the existing food in the food storage apparatus is updated based on input, from the smart terminal;
- updating the food information stored in the food storage apparatus based on the food change information generated by the smart terminal.

If the user adds corresponding food information in the interface for food information processing on the smart terminal's display immediately after adding food into the food storage apparatus, or if the user manages existing food information on the smart terminal, the smart terminal can generate corresponding food change information. In this case, the smart terminal will send the food change information to the display apparatus and food storage apparatus which is bound with the smart terminal via account.

After receiving the food change information sent from the smart terminal, the food storage apparatus can update the food information stored in the food storage apparatus. After the food information is updated on the smart terminal, food storage apparatus, and display apparatus, the updated food information stored in the smart terminal, the updated food information stored in the display apparatus, and the updated food information stored in the target food storage apparatus are the same.

The processes of the food storage apparatus receiving food change information sent from the display apparatus or smart terminal for self-information updating, the food storage apparatus generating food change information, and synchronizing with the display apparatus and smart terminal can refer to the previous embodiments at the display apparatus side and subsequent embodiments at the smart terminal side.

According to the food storage apparatus in the embodiments of the disclosure, after the user operates the food storage apparatus to generate food change information, the food change information can be synchronized to the display apparatus and smart terminal which is bound with the food storage apparatus via account to update the food information stored in the display apparatus and smart terminal. After each terminal updates the food information based on the food change information sent from the food storage apparatus, the updated food information stored in the smart terminal, the updated food information stored in the display apparatus, and the updated food information stored in the target food storage apparatus are same. Therefore, the user can manage and view food information of the food in the food storage apparatus via different terminals. Interaction and communication of food information between the respective terminals, and food information synchronization between the respective terminals are possible. Users can manage food information of the food in the food storage apparatus in real-time and on-site, making food information processing more efficient and greatly improving the quality of life.

Figure 20:
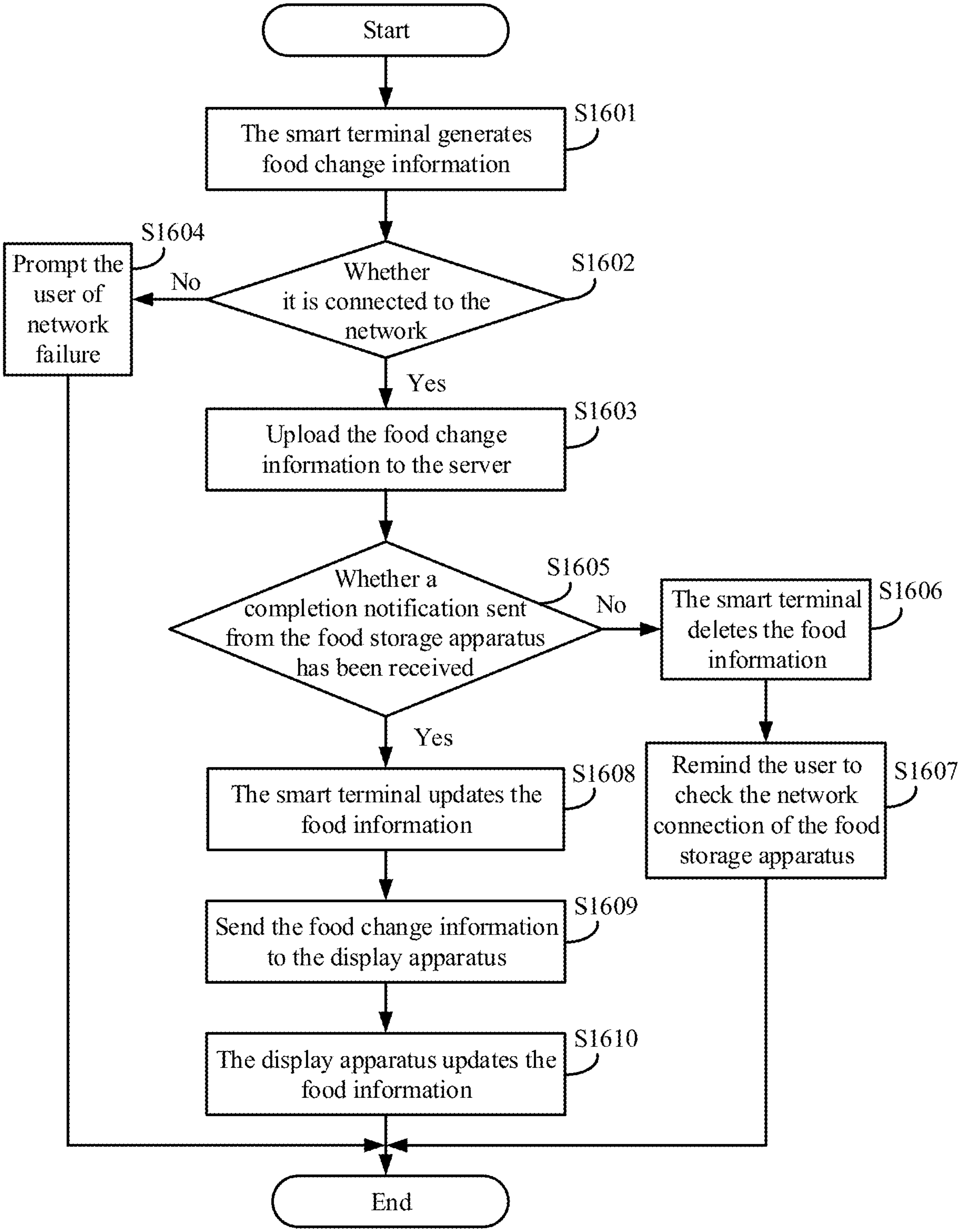
FIG. 20 shows a flow diagram of a multi-terminal based method for managing food information in a smart terminal according to some embodiments of the disclosure.

According to some embodiments, a multi-terminal based method for food information processing performed by a smart terminal is provided. FIG. 20 shows a data flow diagram of a multi-terminal based method for food information processing performed by the smart terminal according to some embodiments. The smart terminal provided in some embodiments can include a display for presenting an image and/or a user interface, and at least one processor connected with the display. When executing the multi-terminal based method for food information processing, the at least one processor is configured to execute instructions to cause the smart terminal to perform the following steps: receiving food change information input from the user based on the smart terminal to update the food information of existing food in a target food storage apparatus, and sending the food change information to the target food storage apparatus which is bound with the smart terminal via account; in response to receiving a completion notification sent from the target food storage apparatus after updating the food information based on the food change information, updating the food information stored in the smart terminal based on the food change information. The updated food information stored in the smart terminal is same to the updated food information stored in the target food storage apparatus.

When the user operates the smart terminal to manage food information stored in the food storage apparatus, food change information can be generated synchronously, and sent to the target food storage apparatus. After the target food storage apparatus updates the food information stored in the target food storage apparatus based on the food change information sent from the smart terminal, the smart terminal can update the food information stored in the smart terminal based on the food change information. After both are completed, the updated food information stored in the smart terminal is same with the updated food information stored in the target food storage apparatus.

The food storage apparatus that can be managed by the user through the smart terminal is the target food storage apparatus, and the target food storage apparatus and the target display apparatus are bound with the smart terminal based on the account. After binding with the same account, information synchronization can be performed between the smart terminal, the target food storage apparatus and target display apparatus. The method and implementation process of determining the target food storage apparatus can refer to the methods and processes described in the previous embodiments at the display apparatus side, which requests the server (for example, the AIOT subsystem and the terminal-oriented subsystem) to query the target food storage apparatus.

Figure 21:
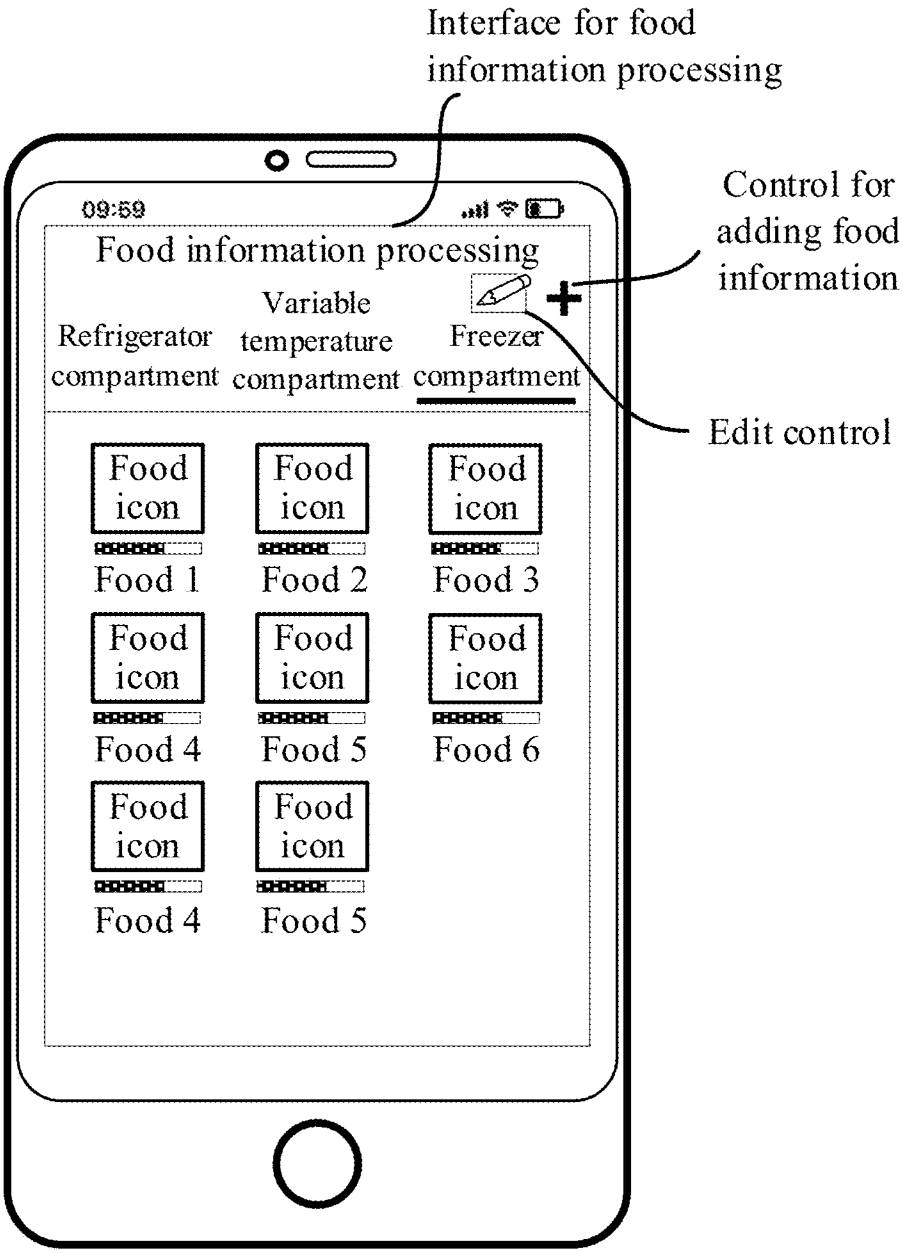
FIG. 21 shows a schematic diagram of an interface for food information processing shown on a smart terminal according to some embodiments of the disclosure.

FIG. 21 shows a schematic diagram of an interface for food information processing on the smart terminal according to some embodiments. Referring to FIG. 21, when the user operates the smart terminal to manually manage the food information in the food storage apparatus, processing can be done through the interface for food information processing displayed on the smart terminal's display. According to the compartment configuration of the food storage apparatus, the interface for food information processing can generate a corresponding display area for each compartment, such as including a display area for the refrigerator compartment and a display area for a freezer compartment. If the food storage apparatus is further equipped with a variable temperature compartment, the interface for food information processing can further include a display area for the variable temperature compartment.

The content shown in display areas for the respective compartments in the interface for food information processing on the smart terminal, the arrangement order of food information displayed in each display area, and the processes such as adding food information, editing food information, viewing details of a specific food, deleting food information, etc., based on the interface for food information processing shown on the smart terminal can refer to the methods described in the previous embodiments for display apparatus or food storage apparatus.

In some embodiments, referring to FIG. 20.

S1601: the smart terminal generates food change information.

Here, the smart terminal needs to be connected to the network when synchronizing information to other terminals.

S1602: based on that there is no input from the user within a preset time, the smart terminal determines whether it is connected to the network.

S1603: based on that the network is connected, the food change information can be sent to the target display apparatus and the target food storage apparatus which is bound with the smart terminal through account via the server.

S1604: based on that the network is not connected, the user is prompted with a network failure message, and the food change information is sent after the network connection is established.

In some embodiments, since the food storage apparatus may fail to receive food change information sent from the smart terminal due to network issues, resulting in the failure of food information update on the food storage apparatus. Therefore, to ensure the consistency between the food information stored in the food storage apparatus and the smart terminal, the smart terminal needs to execute the update process after the food storage apparatus is successfully updated.

S1605: determining whether the smart terminal has received a completion notification sent from the food storage apparatus.

S1606~S1607: based on that the smart terminal does not receive a completion notification sent from the food storage apparatus, deleting the food information and reminding the user to check the network connection of the food storage apparatus.

When the smart terminal does not receive the completion notification from the target food storage apparatus, if the smart terminal has not received a completion notification from the target food storage apparatus within a preset interval starting from when the food change information is sent to the target food storage apparatus via the terminal-oriented subsystem, it indicates that the target food storage apparatus is abnormal and unable to update food information. Therefore, to ensure the consistency between the food information stored in the smart terminal and the food storage apparatus, the smart terminal also does not perform food information update. In this case, the smart terminal can delete the food change information generated in the current instance.

In some embodiments, after the user manages food information on the smart terminal, in the network connection state, the food change information can be uploaded to the server through the cloud service of the smart terminal. The cloud service of the target food storage apparatus can receive the food change information from the server after the food information changes on the server, and update the food information stored in the target food storage apparatus.

S1608: based on that the smart terminal receives a completion notification sent from the food storage apparatus, the smart terminal updates the food information.

In some embodiments, when the user operates the food storage apparatus to manage food information and synchronize information to the smart terminal, after the user updates the food information of existing food in the target food storage apparatus based on the food storage apparatus, the food change information generated when updating the existing food in the target food storage apparatus can be received. Based on the food change information generated by the target food storage apparatus, the food information stored in the smart terminal can be updated.

S1609~S1610: food change information is sent to the display apparatus, and the display apparatus updates the food information.

Since the food storage apparatus may fail to receive food change information sent from the smart terminal due to network issues, resulting in the failure of food information update in the food storage apparatus, the processes of updating food information in the display apparatus and the smart terminal are both performed after the food information in the food storage apparatus is successfully updated. Therefore, after the smart terminal receives a completion notification sent from the target food storage apparatus, the smart terminal can update its own food information and synchronize the food change information to the display apparatus. The display apparatus can update the food information stored in the display apparatus after receiving the food change information sent from the smart terminal.

In some embodiments, when the user operates the display apparatus to manage food information and synchronize information to the smart terminal, after the user updates the food information of existing food in the target food storage apparatus based on the display apparatus, the food change information generated when updating the existing food in the target food storage apparatus can be received. Based on the food change information generated by the smart terminal, the food information stored in the smart terminal can be updated.

After the smart terminal receives the food change information sent from the display apparatus, the food information stored in the smart terminal can be updated. After the food information is updated in the smart terminal, the food storage apparatus, and the display apparatus, the updated food information stored in the smart terminal, the updated food information stored in the display apparatus, and the updated food information stored in the target food storage apparatus are the same.

The process of each device generating food change information and synchronizing it to the target food storage apparatus is the same, and the process of each device receiving food change information sent from the target food storage apparatus for information synchronization is the same. Therefore, the process of the food storage apparatus generating food change information and synchronizing it to the smart terminal, the process of the smart terminal generating food change information and sending the food change information to the target food storage apparatus or display apparatus, and receiving food change information from the target food storage apparatus or display apparatus for information synchronization, and the process of the display apparatus receiving food change information sent from the smart terminal for self-information updating, generating food change information, and synchronizing it to the smart terminal and food storage apparatus can refer to the previous embodiments at the display apparatus side.

The smart terminal according to the embodiments of the disclosure is capable for managing food information in the food storage apparatus. After the user operates the smart terminal to generate food change information, the food change information can be synchronized to the food storage apparatus and display apparatus which is bound with the smart terminal via account, to update the food information stored in the food storage apparatus and the display apparatus. After each terminal updates the food information based on the food change information sent from the smart terminal, the updated food information stored in the smart terminal, the updated food information stored in the display apparatus, and the updated food information stored in the target food storage apparatus are the same. Therefore, users can manage and view food information in the food storage apparatus through different terminals, and interaction and communication of food information between different terminals and food information synchronization between terminals is possible. Users can manage food information in the food storage apparatus in real-time and on-site, making food information processing more efficient and greatly improving the quality of life.

From the above embodiments, it can be seen that the embodiments of the disclosure provide a multiple-terminal based method for managing food information, a display apparatus, food storage apparatus, and smart terminal, which can manage food information in the food storage apparatus via multiple terminals. After the user operates the display apparatus or smart terminal to generate food change information, the food change information can be synchronized to the food storage apparatus and smart terminal/display apparatus that is bound with the display apparatus or smart terminal via account, to update the food information stored in the food storage apparatus and the food information stored in the smart terminal or display apparatus. After each device updates the food information based on the food change information sent from the display apparatus, the updated food information stored in the smart terminal, the updated food information stored in the display apparatus, and the updated food information stored in the target food storage apparatus are the same. Therefore, users can manage and view food information in the food storage apparatus on different terminals, and food information can be interconnected and communicated between different terminals, synchronizing food information across terminals. Users can manage the food information in the food storage apparatus in real time and on-site, making food information processing more efficient and greatly improving the quality of life.

In current smart food storage apparatus products, after the user manages food information on the food storage apparatus, the relevant food information can only be displayed on the food storage apparatus. If the user in the living room or other rooms wants to view the food information stored in the food storage apparatus, they need to go to the location of the food storage apparatus, which is very inconvenient for users.

The method of querying food stored in food storage apparatus through multiple terminals can enable the user to query and manage food information in food storage apparatus from any terminal, achieving food information processing across terminals and food information interconnection among multiple terminals via servers. Users can query and manage food information stored in food storage apparatus in real time and on-site, making food querying more efficient and greatly improving the quality of life.

In some embodiments, the user can view food information stored in food storage apparatus through display apparatus. The display apparatus can display different pages based on querying needs to show different query results. For example, if the user wants to view the food information of all existing foods in the food storage apparatus through the display apparatus, the homepage for food information processing can be presented on the display of the display apparatus; if users want to view the food information of a specified kind of food in the food storage apparatus through the display apparatus, a specific food page can be presented on the display; if users want to view the food information of specified freshness in the food storage apparatus through the display apparatus, a food tag page can be presented on the display. In addition, different pages can be presented based on other user needs, which are not described here.

The implementation process of different query pages presented on the display apparatus is different, allowing the display apparatus to present food information in the form of a "card", with rich and diverse information, providing users with visual impact and greatly improving the user experience.

According to some embodiments, the disclosure provides a method for querying food stored in food storage apparatus. A display apparatus provided in some embodiments can include: a display, configured to present an image and/or a user interface; and at least one processor connected with the display, configured to execute instructions to cause the device to perform a method for querying food stored in food storage apparatus to present a homepage for food information processing, the at least one processor is configured to execute instructions to cause the apparatus to perform the following steps:

in response to a food query command for checking existing foods in a target food storage apparatus from a user, obtaining food data corresponding to the target food storage apparatus from a server, where the target food storage apparatus indicates a food storage apparatus which is bound with the display apparatus via account, and the food data can include food information of existing food in the target food storage apparatus; and based on the food data returned from the server, switching to the homepage for food information processing and displaying the homepage for food information processing in the user interface, where the homepage for food information processing shows food information of the existing foods in the target food storage apparatus.

When the food information stored in the food storage apparatus is checked based on the display apparatus, the user operates the display apparatus to generate a food query command, where the food query command in this case is used to view the food information of all existing foods in the food storage apparatus via the display apparatus.

The target device for querying food via the display apparatus is a target food storage apparatus logged into the same specified account as the display apparatus, and to view the food information of all existing foods stored in the target food storage apparatus, the display apparatus needs to communicate with the target food storage apparatus through a server to obtain food data corresponding to the target food storage apparatus. To present the homepage for food information processing, the food data can include food information of all existing foods in the target food storage apparatus.

The user can view food information in the target food storage apparatus through the display apparatus by voice or manually. The user can directly state the viewing needs by voice, such as speaking "What's in the food storage apparatus?", "View foods in the food storage apparatus", etc. The user can select quick query entry manually presented in the user interface, including an AIOT homepage entry and a food widget list entry. Therefore, the user can select the AIOT homepage to view a detail page of the food storage apparatus to view food information stored in the food storage apparatus, or the user can select the food widget list presented in the user interface of the display apparatus to view the foods stored in the food storage apparatus.

In some embodiments, when querying the foods stored in the food storage apparatus to present the homepage for food information processing by voice, the at least one processor is configured to execute instructions to cause the apparatus to perform: in response to a voice command for checking existing foods in the target food storage apparatus, obtaining food data corresponding to the target food storage apparatus from the server, by:

in response to a first voice command for checking existing foods in the target food storage apparatus, obtaining a specified account under which the display apparatus is logged into, and sending a device query request carrying the specified account to the server, where the device query request is used to instruct the server to query a target device ID of a target food storage apparatus logged into the specified account;

receiving the target device ID returned from the server, and sending the food query command carrying the target device ID to the server, where the food query command is used to instruct the server to query food data of the target food storage apparatus corresponding to the target device ID;

receiving the food data of the target food storage apparatus returned from the server.

Figure 22:
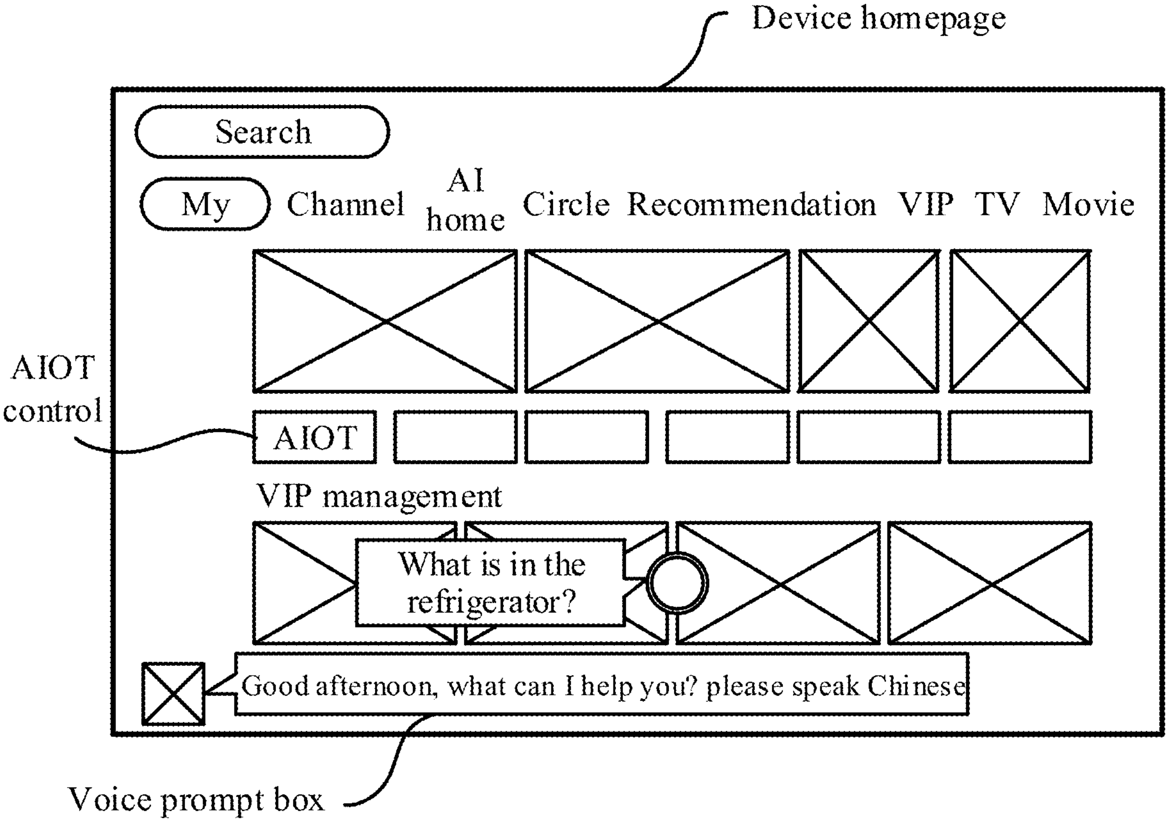
FIG. 22 shows a schematic diagram of a device homepage of a display apparatus according to some embodiments of the disclosure.

FIG. 22 shows a schematic diagram of a device homepage in a display apparatus according to some embodiments. Referring to FIG. 22, after the display apparatus is started, the device homepage of the display apparatus presents a voice prompt box, which is used to prompt the user to interact with the display apparatus in a voice mode.

When the user needs to use the display apparatus to view all food information stored in the food storage apparatus, the user can utter a voice command to view food information, such as "What's in the food storage apparatus?", "View foods in the food storage apparatus", "What do I have to eat?", etc., and the corresponding voice text can be displayed in real time on the device homepage. Then, based on this voice command, the display apparatus can obtain the food information stored in the food storage apparatus from the server.

Figure 23:
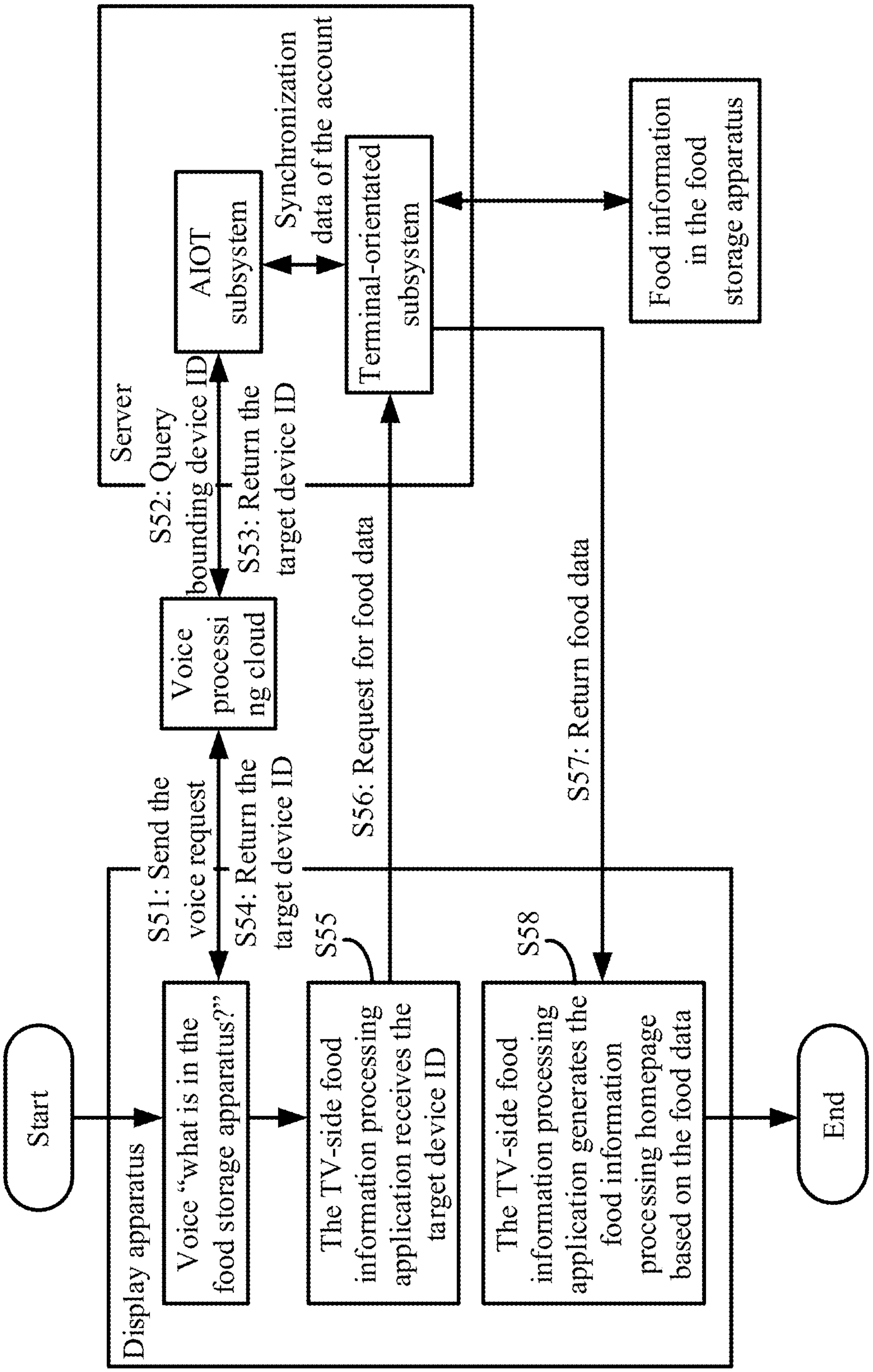
FIG. 23 shows a data flow diagram of viewing a homepage of food information processing based on voice according to some embodiments of the disclosure.

FIG. 23 shows a data flow diagram of viewing the homepage for food information processing based on voice according to some embodiments.

S51: upon receiving a first voice command input from a user, the voice application in the display apparatus recognizes the voice command and synchronously generates a voice request and sends the voice request to a voice processing cloud.

S52: the voice processing cloud parses the voice command carried in the voice request and extracts a voice text, and based on determining that the voice text indicates to view the food information of the food storage apparatus, a device query request is generated and sent to the server to query the food information of a certain food storage apparatus.

Since the food storage apparatus whose stored food information can be viewed through the display apparatus needs to be bound with the display apparatus via account, when the display apparatus generates a device query request, it can obtain the specified account under which the display apparatus is logged into and send a device query request carrying the specified account to the server.

S53~S54: the server responds to the device query request, searches for the corresponding device ID (such as device ID) based on the specified account, and sends a target device ID of the target food storage apparatus to the display apparatus via the voice cloud. Here, the target device ID indicates the target food storage apparatus.

S55~S56: after a TV-side food information processing application in the display apparatus receives the target device ID returned from the server via the voice cloud, the food query command is generated based on the target device ID and sent to the server, to query the food data stored in the target food storage apparatus corresponding to the target device ID.

S57: after the server found the food data of the target food storage apparatus, the server sends the food data to the display apparatus. The food data can include the food information of all existing foods in the target food storage apparatus.

In some embodiments, the server can include the AIOT subsystem and the terminal-orientated subsystem. The AIOT subsystem can receive the device query request sent from a terminal, and query a device ID (such as device ID) corresponding to the specified account based on the specified account. Based on that the target device ID queried indicates that an apparatus logged into the specified account is a food storage apparatus, the apparatus corresponding to the target device ID is the target food storage apparatus logged into the same specified account as the display apparatus.

Since there may be multiple apparatuses logged into the same specified account on the same network, such as two food storage apparatuses both logged into the specified account. In this case, to facilitate the display apparatus to show the food information of one of the food storage apparatuses that the user wants to view and manage, the user needs to determine the target food storage apparatus that needs to synchronize information.

When multiple device IDs logged into the same specified account as the display apparatus are found in the server (AIOT subsystem), it is necessary to ask the user which apparatus actually needs to update the food information. In this case, the server can generate multiple selection options based on the queried multiple device IDs, generate an inquiry instruction and return the inquiry instruction to the display apparatus.

In some embodiments, the display apparatus can display the inquiry instruction via voice. It can output in voice each selection option in the inquiry instruction. For example, the output content may be "There are multiple apparatuses, please choose the food storage apparatus A or food storage apparatus B for processing." After hearing the output content, the user can interact via voice, such as saying "Select food storage apparatus A", then the target selection option is determined as food storage apparatus A, and the server can then determine the target device ID as the device ID corresponding to food storage apparatus A.

In some embodiments, the display apparatus can display the inquiry instruction via a graphical user interface. In this case, the display apparatus can receive the inquiry instruction returned from the server and generate an interface for device selection based on the selection options carried in the inquiry instruction, which is shown on the display. For example, the interface for device selection shows options such as "Food storage apparatus A" and "Food storage apparatus B". When the user selects one of the selection options, the device ID corresponding to that selection option is determined as the target device ID.

The AIOT subsystem can return the queried target device ID to the voice application on the display apparatus via the voice processing cloud, and the terminal can send the target device ID to the TV-side food information processing application. In order to view the food information in the target food storage apparatus, the TV-side food information processing application can invoke the terminal-orientated subsystem in the server. The food data stored in the target food storage apparatus corresponding to the target device ID can be searched via the terminal-orientated subsystem, and returned to the TV-side food information processing application in the display apparatus, to allow the TV-side food information processing application to show the food data in the target food storage apparatus.

In some embodiments, to ensure that the terminal-orientated subsystem can search the food data of the target food storage apparatus based on the request from the display apparatus, the AIOT subsystem can synchronize the target device ID to the terminal-orientated subsystem after querying the target device ID based on the specified account in the device query request sent from the voice processing cloud. After the TV-side food information processing application on the display apparatus sends the target device ID to the terminal-orientated subsystem, the terminal-orientated subsystem can determine whether the target device ID sent from the AIOT subsystem matches the target device ID sent from the TV-side food information processing application.

If two target device IDs match, it indicates that the target food storage apparatus of which the display apparatus needs to query for food data, and the target food storage apparatus queried by the AIOT subsystem are the same. Therefore, the terminal-orientated subsystem can query the food data of the corresponding target food storage apparatus based on the target device ID.

If the two target device IDs do not match, it indicates that the target food storage apparatus of which the display apparatus needs to query for food data, and the target food storage apparatus queried by the AIOT subsystem are not the same. In this case, the display apparatus cannot view the food data of the target food storage apparatus and can prompt the user to check the status of the food storage apparatus before trying again.

- S58: after the display apparatus receives the food data corresponding to the target food storage apparatus returned from the server, the display apparatus can generate a homepage for food information processing based on the food data and display it in the display area of the display apparatus for the user to view.

In some embodiments, the food data corresponding to the target food storage apparatus can include the food information of all existing foods in the food storage apparatus, where the existing foods are foods currently stored in the food storage apparatus. The food information returned from the server can include food icon, food name, device ID, device type, device name, device location, room ID, room name, partner ID, partner name, device capability icon (1: online, 0: offline), network connection type, etc. Here, the device indicates the food storage apparatus.

In some embodiments, when the user manually operates the display apparatus to view the food information stored in the food storage apparatus, such as when the user selects the AIOT homepage to view a detail page for the food storage apparatus, to view the foods stored in the food storage apparatus, the at least one processor is configured to execute instructions to cause the display apparatus to perform:

- in response to a startup command on a quick query entry presented on the user interface input from the user, sending a device query request carrying the specified account under which the display apparatus is logged into to the server, where the device query request is used to instruct the server to query the target device ID of the target food storage apparatus logged into the specified account;
- receiving a target device ID returned from the server, and sending a food query command carrying the target device ID to the server; where the food query command is used to instruct the server to query the food data of the target food storage apparatus corresponding to the target device ID;
- receiving the food data of the target food storage apparatus returned from the server.

In some embodiments, when the quick query entry presented in the user interface is an AIOT homepage entry, the AIOT homepage entry can be an AIOT control presented in the user interface. When the user selects the AIOT control presented in the user interface, a startup command is generated, and the server is requested to obtain a device list associated with the specified account under which the display apparatus is logged into, an AIOT homepage showing items related to the target food storage apparatus is generated based on the device list and presented in the user interface.

Referring again to FIG. 22, the user interface of the display apparatus can present the device homepage, and the device homepage can present an AIOT control, such as "Xiaoju's home." The user can select the AIOT control via the remote control to generate a startup command and request the server to obtain all devices associated with the specified account under which the display apparatus is logged in, and an AIOT homepage can be displayed in the user interface based on the device list formed by all devices.

Figure 24:
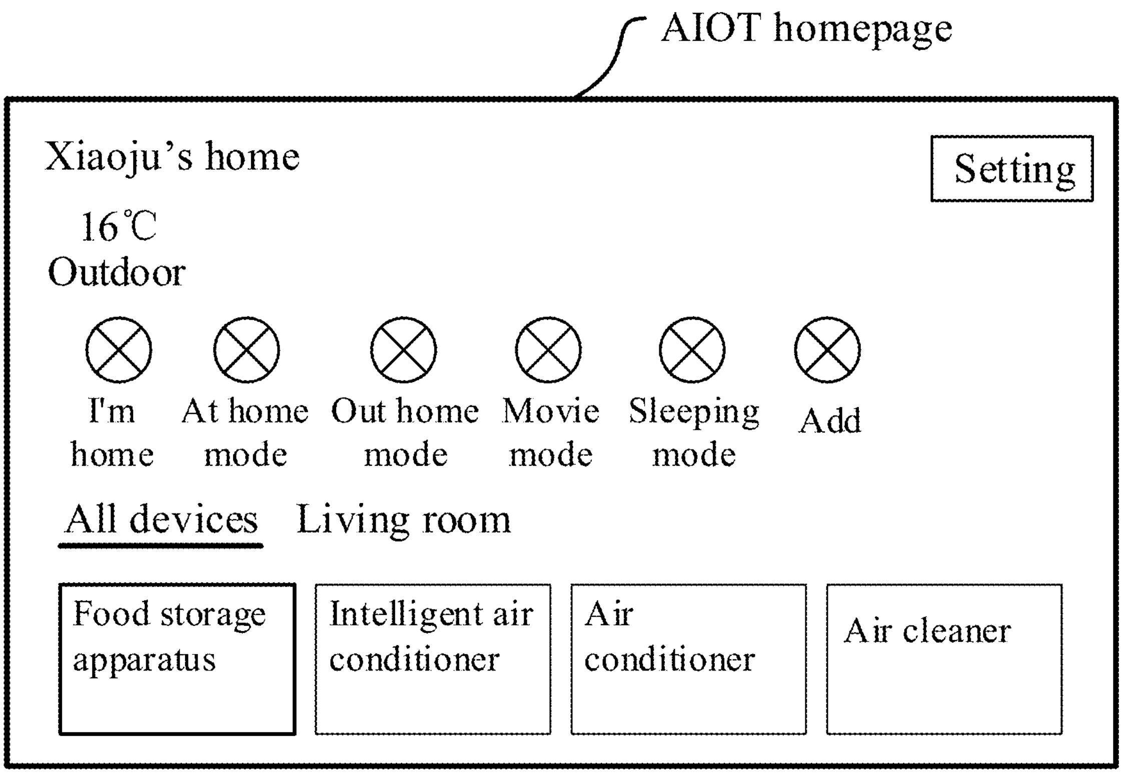
FIG. 24 shows a schematic diagram of an AIOT homepage shown on a display apparatus according to some embodiments of the disclosure.
Figure 25:
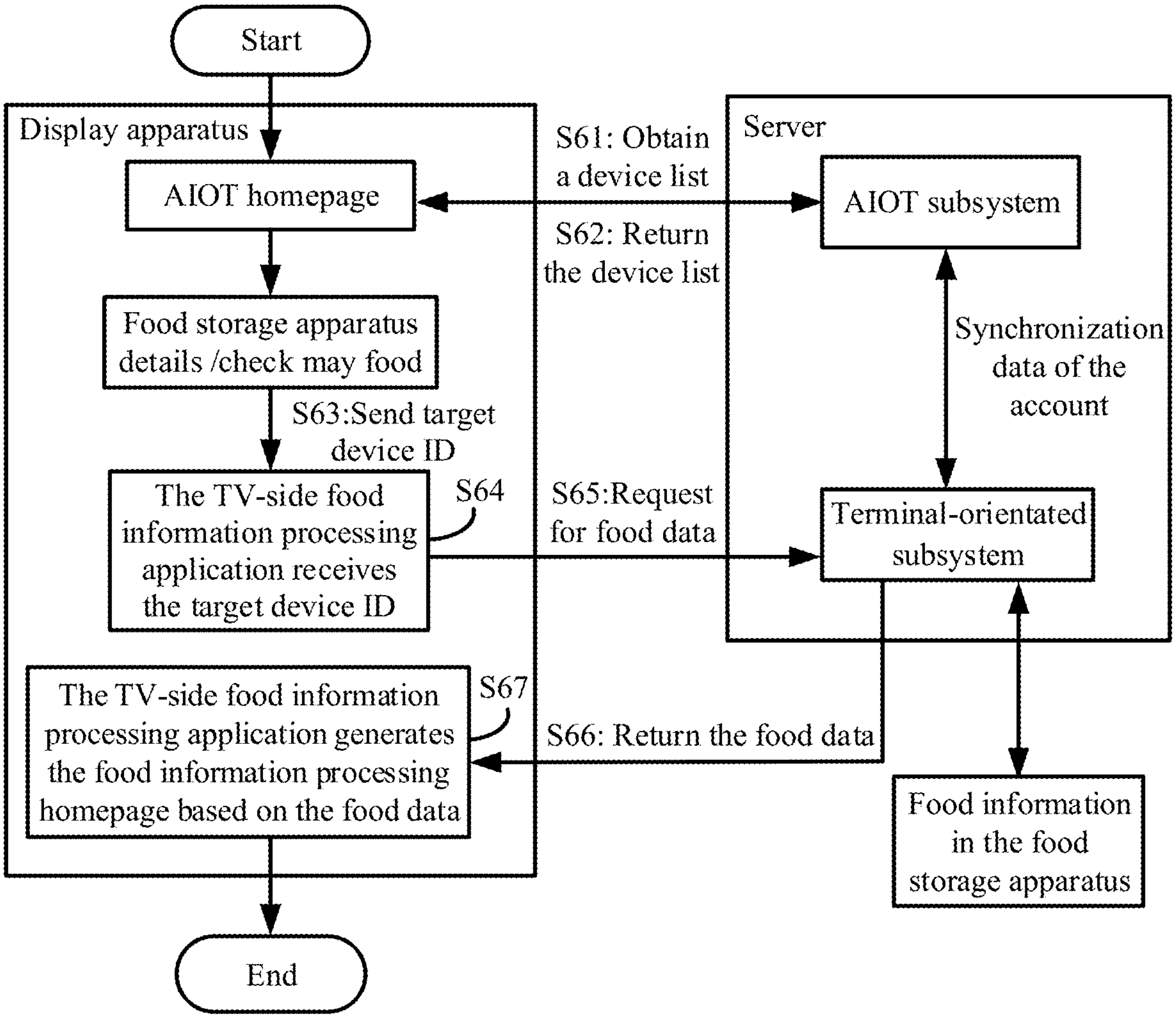
FIG. 25 shows a data flow diagram of viewing the homepage of food information processing through the AIOT homepage according to some embodiments of the disclosure.

FIG. 24 shows a schematic diagram of an AIOT homepage shown on the display apparatus according to some embodiments. FIG. 25 shows a data flow diagram of viewing the homepage for food information processing through the AIOT homepage according to some embodiments. When the user selects the AIOT control in FIG. 22, the user interface switches to display the AIOT homepage as shown in FIG. 24. Referring to FIGS. 24 and 25, the AIOT homepage is used to display information of all devices which are bound with the display apparatus via account, such as the food storage apparatus, smart air conditioners, air conditioners, air purifiers, etc., which are bound with the display apparatus via account.

If the user selects an item for the target food storage apparatus on the AIOT homepage, the information of the target food storage apparatus can be shown and meanwhile, the detail page of the target food storage apparatus is displayed in the user interface.

Figure 26:
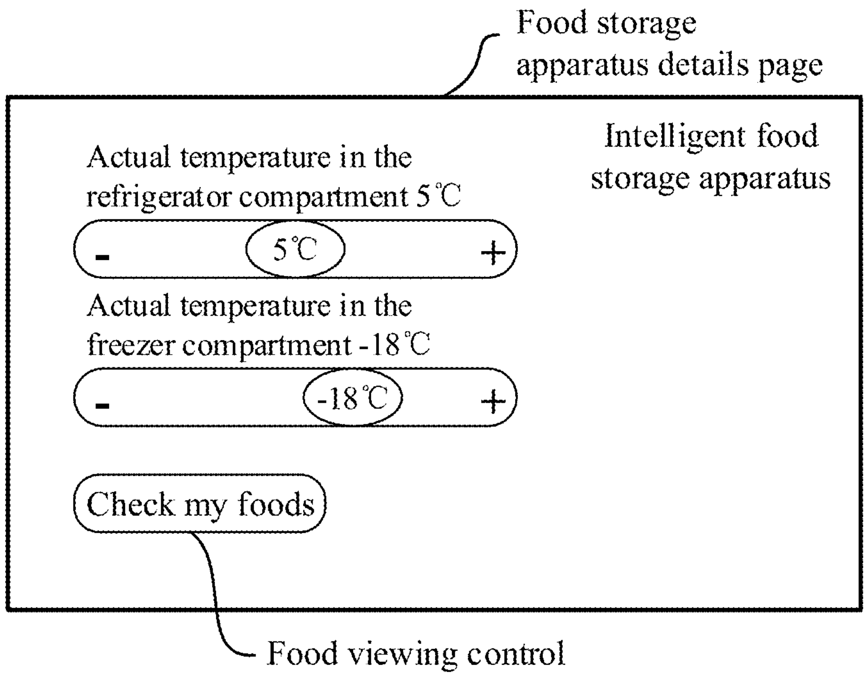
FIG. 26 shows a schematic diagram of a detail page of a target food storage apparatus shown on a display apparatus according to some embodiments of the disclosure.

FIG. 26 shows a schematic diagram of a detail page of the target food storage apparatus shown on the display apparatus according to some embodiments. The user selects the "food storage apparatus" item in FIG. 24, and the user interface can switch to display the detail page of the target food storage apparatus as shown in FIG. 26. The detail page of the target food storage apparatus can show a food viewing control, such as "view my foods."

- S61~S62: based on a user's selection of the food query control, and a food query command carrying the target device ID corresponding to the target food storage apparatus is sent to the server to allow the server to query the food data of the target food storage apparatus corresponding to the target device ID. When the user selects the item for the target food storage apparatus on the AIOT homepage, the target device ID corresponding to the target food storage apparatus can be obtained, and the target device ID is used to indicate the target food storage apparatus.

In some embodiments, the server can include an AIOT subsystem and a terminal-orientated subsystem. The functions and roles of the AIOT subsystem and the terminal-orientated subsystem can refer to the previous embodiments, and are not described here.

- S63~S64: the TV-side food information processing application receives the target device ID.
- S65: to view the food information in the target food storage apparatus, the TV-side food information processing application in the display apparatus invokes the terminal-orientated subsystem in the server to query the food data stored in the target food storage apparatus corresponding to the target device ID via the terminal-orientated subsystem.
- S66~S67: returning the food data of the target food storage apparatus to the TV-side food information processing application in the display apparatus for display, and the TV-side food information processing application displays the food data of the target food storage apparatus.

After the display apparatus receives the food data corresponding to the target food storage apparatus returned from the server, it can generate the homepage for food information processing based on the food data and display it in the display area of the display apparatus for the user to view.

In some embodiments, when the AIOT homepage entry is shown in the user interface as a widget, the quick query entry shown in the user interface can be the food widget list entry. In this case, AIOT homepage entry can be shown as a food information processing widget in the food widget list. The user can select the food widget list shown in the user interface of the display apparatus, the corresponding food data can be obtained via the food information processing widget in the food widget list, so that the food information in the food storage apparatus can be viewed on the display apparatus.

In some embodiments, since there are multiple applications configured in the display apparatus, in order to make it easier for the user to quickly launch a particular application, that application can be added in the widget list. Each application can have a corresponding widget and the widget can be displayed in the widget list sequentially. Therefore, the food information processing widget can be generated for the AIOT homepage entry and displayed in the food widget list.

The widget list may not always be displayed on the user interface, and may normally be hidden. If the user needs to quickly launch a particular application based on the widget list, the widget list can be invoked and displayed on the user interface using a preset operation. The preset operation can be a long press of a left button or other buttons on the remote control, or it can be defined according to a user's operation preferences.

Figure 27:
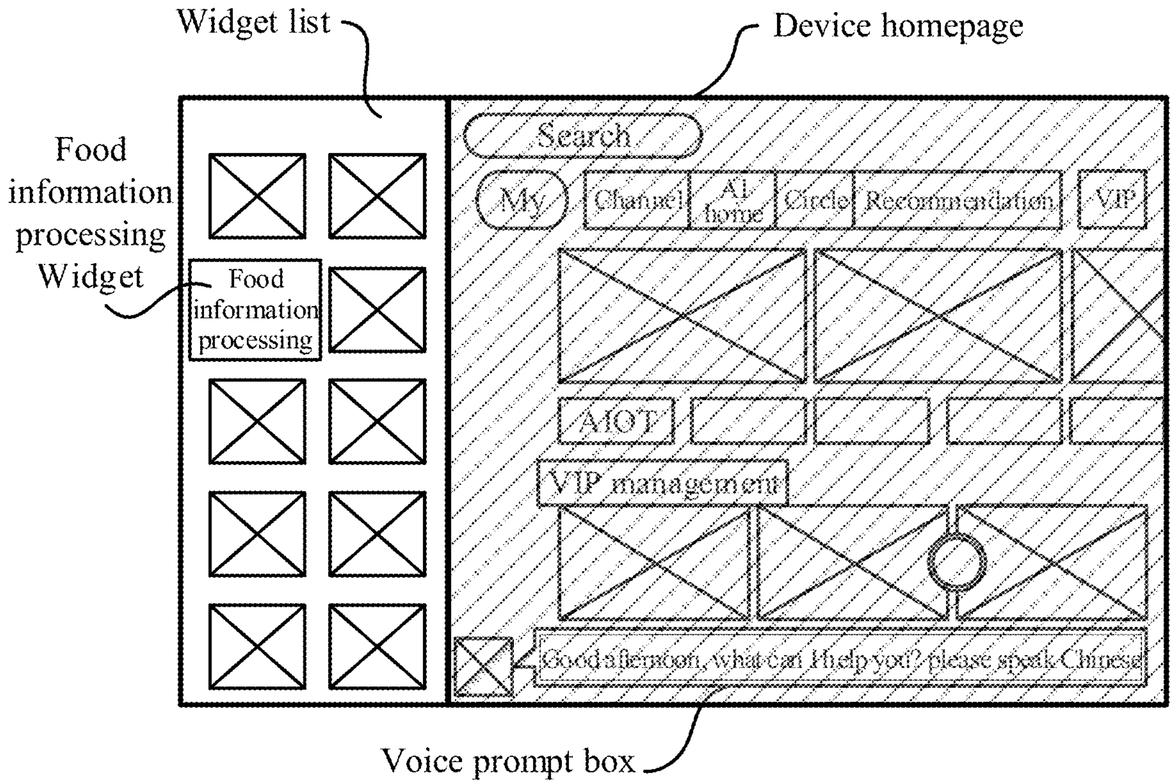
FIG. 27 shows a schematic diagram of a widget list shown on a display apparatus according to some embodiments of the disclosure.

FIG. 27 shows a schematic diagram of a widget list shown on a display apparatus according to some embodiments. As shown in FIG. 27, if the user needs to quickly launch a particular application based on the widget list, the user can long press the left button on the remote control to invoke the widget list to be displayed on the user interface. Since it is the homepage that displayed on the user interface, the widget list can pop-up from the left side of the display and push the homepage to the right. In this case, the widget list and the homepage can be displayed on the user interface simultaneously, and the content on the right side of the homepage can be hidden as the homepage moves to the right.

In some embodiments, the food information processing widget (the Widget of the AIOT homepage entry) can be displayed in the widget list. When the food information processing widget is selected, the AIOT homepage shown in FIG. 24 can be displayed in the user interface. The implementation process of obtaining the food data corresponding to the target food storage apparatus from the server based on the AIOT homepage may refer to the foregoing embodiments, and will not be described again here.

In some embodiments, in order to quickly query food information, the food information processing widget in the widget list can be selected to quickly launch the homepage for food information processing. The user can select the food information processing widget to start the homepage for food information processing. In order to present the homepage for food information processing, it is necessary to obtain the food data of the target food storage apparatus which is bound with the display apparatus via account from the server.

After the user selects the food information processing widget, the specified account under which the display apparatus is logged into can be obtained, and a device query request can be generated based on the specified account and be sent to the server. The device query request is used to instruct the server to query a target device ID of a target food storage apparatus logged into the specified account.

After querying the target device ID of the target food storage apparatus for view based on the display apparatus, the server can return the target device ID to the display apparatus. The TV-side food information processing application in the display apparatus can send a food query instruction carrying the target device ID to the server, so that the server queries the food data stored in the target food storage apparatus corresponding to the target device ID. After finding the food data of the target food storage apparatus, the server can return the food data to the display apparatus. The food data can include food information of all existing foods stored in the target food storage apparatus.

In some embodiments, the server can include an AIOT subsystem and a terminal-oriented subsystem. The functions and functions of the AIOT subsystem and the terminal-oriented subsystem can refer to the foregoing embodiments, and will not be described again here.

In order to view the food information in the target food storage apparatus, the TV-side food information processing application in the display apparatus can invoke the terminal-oriented subsystem in the server, and query the food data stored in the target food storage apparatus corresponding to the target device ID through the terminal-oriented subsystem, and then the food data of the target food storage apparatus can be returned to the TV-side food information processing application of the display apparatus, and the TV-side food information processing application can display the food data of the target food storage apparatus.

After receiving the food data corresponding to the target food storage apparatus returned from the server, the display apparatus can generate the homepage for food information processing based on the food data and display it in the display area of the display apparatus for the user to view.

In some embodiments, to display the food information of all existing foods in the food storage apparatus on the display apparatus, the display apparatus can request the food data of the target food storage apparatus from the server by voice or manually, and the specific implementation method can be based on the user's usage needs.

After the TV-side food information processing application in the display apparatus receives the food data of the target food storage apparatus returned from the server, it can generate the homepage for food information processing based on the food data in the user interface.

Since the food storage apparatus may have multiple compartments, such as refrigerator compartment, freezer compartment, and variable temperature compartment. Therefore, in order for users to clearly view the information of the foods stored in each compartment of the food storage apparatus on the display apparatus, the display apparatus can divide the food information of the existing foods into groups based on the compartment configuration of the food storage apparatus when generating the homepage for food information processing, and display the food information of each compartment separately.

Figure 28:
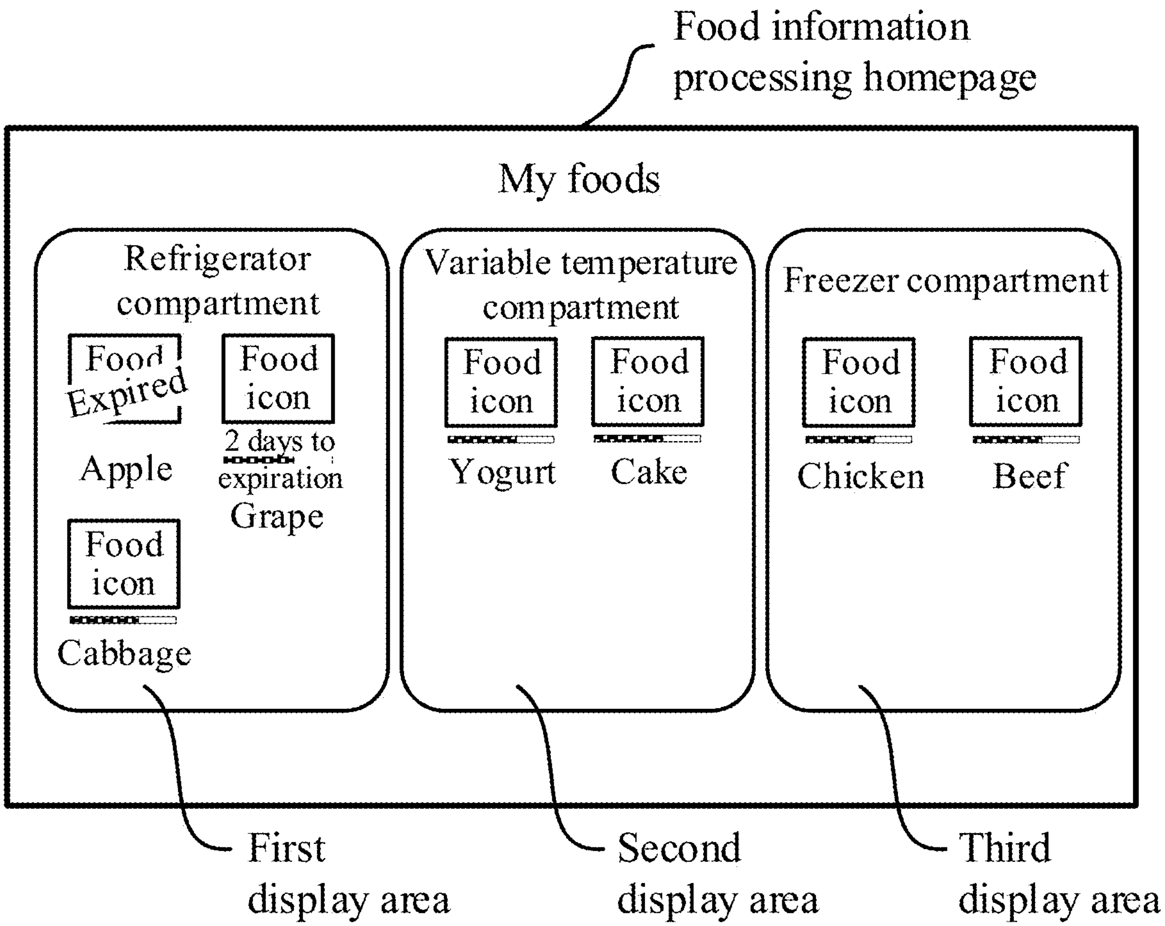
FIG. 28 shows a schematic diagram of a homepage for food information processing shown on a display apparatus according to some embodiments of the disclosure.

FIG. 28 shows a schematic diagram of a homepage for food information processing on the display apparatus according to some embodiments. In some embodiments, as shown in FIG. 28, the at least one processor is configured to execute instructions to cause the display apparatus to perform:

- retrieving food information of existing foods in the food data, including food name, storage compartment identifier, food icon, and food freshness;
- dividing existing foods with a same storage compartment identifier into a same group to obtain multiple food groups;
- based on each food group and the compartment name indicated by the corresponding storage compartment identifier, generating a homepage for food information processing including multiple display areas corresponding to compartment names, and each display area corresponding to a compartment name shows a food name, food icon, and food freshness of existing foods in the corresponding food group.

The food data corresponding to the target food storage apparatus returned from the server can include the food information of all existing foods in the target food storage apparatus, so the division is based on the information of all existing foods. The division of foods is based on the actual compartment position of the food in the food storage apparatus. When the food is added to the food storage apparatus, the user may select the storage compartment for the food, thereby obtaining the storage compartment identifier, and the storage compartment identifier is stored in the food information.

For example, if the "apple" is placed in the refrigerator compartment, then its storage compartment identifier is "refrigerator"; if "yogurt" is placed in the variable temperature compartment, then its storage compartment identifier is "variable temperature"; if "chicken" is placed in the freezer compartment, then its storage compartment identifier is "freezer".

According to the storage compartment identifier corresponding to the foods, all existing foods are grouped, that is, existing foods with the same storage compartment identifier are grouped into the same group, resulting in multiple food groups. For example, if the food storage apparatus is set with two compartments, two food groups corresponding to the refrigerator compartment and the freezer compartment can be obtained. If the food storage apparatus is set with three compartments, three food groups corresponding to the refrigerator compartment, the variable temperature compartment, and the freezer compartment can be obtained.

One storage compartment identifier corresponds to one compartment name. If three storage compartment identifiers are extracted from all food information in the food data, then there are three compartment names correspondingly; if two storage compartment identifiers are extracted from all food information in the food data, then there are two compartment names correspondingly.

Based on each food group and its corresponding compartment name, a corresponding display area is configured for each compartment name to generate the homepage for food information processing. Each compartment name corresponds to a display area, and the display area corresponding to each compartment name shows the food name, food icon, and food freshness of each existing food in the corresponding food group.

For example, the first compartment name corresponds to the first display area, the first display area is used to display the food information of the food group corresponding to the refrigerator compartment; the second compartment name corresponds to the second display area, the second display area is used to display the food information of the food group corresponding to the variable temperature compartment; the third compartment name corresponds to the third display area, and the third display area is used to display the food information of the food group corresponding to the freezer compartment.

The food information available for display can include the food name, food icon, and food freshness. For example, in the display area of the refrigerator compartment shown in FIG. 28, the display content can include a name "apple" of the food apple, an apple graphic element as the food icon, and the freshness "expired"; a name "grape" of the food grape, a grape graphic as the food icon, and the freshness "2 days left".

In some embodiments, to facilitate the user to timely know the freshness of the food without having to click into the interface for food detail information to view, the display apparatus can calculate the freshness of the food based on the adding date and shelf life, and display it in the form of a progress bar. Here, the progress bar can be displayed below the food icon.

Food freshness indicates the remaining days near the expiration date of the food. The calculation method of food freshness is: freshness time (freshTime)=shelf life (expTime)−adding time of the food (addTime); food freshness (%)=freshness time (freshTime)/shelf life (expTime).

When displaying the freshness time of the food in a progress bar, if the progress bar is fully filled with 1 (100%), then the food freshness (%)=freshTime/expTime falls within the interval of 66.7%-100%, and the corresponding progress bar is filled between [⅔, 1] for display, meaning that the food freshness indicates that the food is fresh. If the food freshness (%)=freshTime/expTime falls with the interval of 33.3%-66.7%, and the corresponding progress bar is filled with [⅓, ⅔] for display, meaning that the food freshness indicates that the food is relatively fresh. If the food freshness (%)=freshTime/expTime falls with the interval of 0%-33.3%, and the corresponding progress bar is filled with [0, ⅓] for display, meaning that the food freshness indicates that the food is nearly expired. If the food freshness time (freshTime)<0, then the progress bar is not filled for display, and the food freshness indicates that the food is expired.

In some embodiments, in the same display area, the display order of the food information is first sorted according to the shelf life. The information of the expired food is displayed at the beginning, and the information of the food nearly expired is displayed after the expired food; then the information of the newly added food is displayed after the nearly expired ones; the remaining food information is sorted according to the order of adding time, and the information of the relatively recently added food is displayed after the information of the newly added food, and the information of the earliest added food is displayed at the end. Here, the information of each food is displayed in the form of a food icon. Each display area displays food information in a "card" for easy viewing.

When the user view the food information of the existing foods in the food storage apparatus through the display apparatus, the display apparatus can obtain the corresponding food data from the server according to the compartment configuration, and display the food information of the foods one by one. The food information of the foods stored in the refrigerator compartment of the food storage apparatus is displayed in the display area for the refrigerator compartment, the food information of the foods stored in the freezer compartment of the food storage apparatus is shown in the display area for the freezer compartment, and the food information of the foods stored in the variable temperature compartment of the food storage apparatus is displayed in the display area for the variable temperature compartment.

If the user wants to view the specific food information of a certain kind of food, they can operate a direction button on the remote control to move the cursor to the target food icon, and press an OK button on the remote control to view the food detail information.

Figure 29:
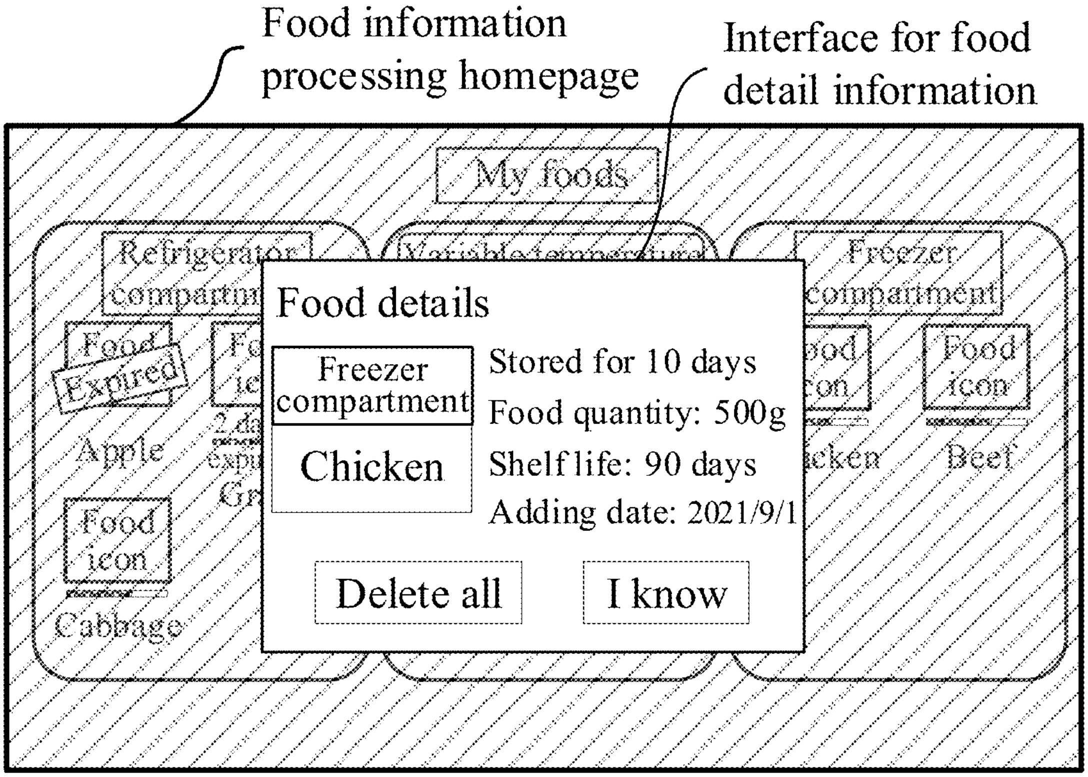
FIG. 29 shows a schematic diagram of an interface for food detail information presenting on a display apparatus according to some embodiments of the disclosure.

FIG. 29 shows a schematic diagram of an interface for food detail information shown on the display apparatus according to some embodiments. Referring to FIG. 29, when the user selects a certain food icon, the interface for food detail information can be presented in the homepage for food information processing in the form of a floating window. The interface for food detail information shows the food icon, food storage compartment, adding time, food quantity, shelf life, adding date, and food freshness. After viewing the food information, the user can click the "I know" control in the interface for food detail information, then the display apparatus can exit the interface for food detail information and return to the homepage for food information processing. The user can click the "Delete All" control, and the display apparatus can delete the food information of the food.

In some embodiments, if the display apparatus does not obtain the food data of the target food storage apparatus from the server when the user views the food information of the existing foods in the food storage apparatus through the display apparatus, it prompts the user. The display apparatus can display the homepage for food information processing based on preset prompt information to avoid making the user feel abnormal.

Specifically, when the display apparatus does not obtain the food data of the target food storage apparatus, the at least one processor is further configured to execute instructions to cause the display apparatus to perform: in response to a food query command for checking the existing foods in the target food storage apparatus from the user, based on that food data corresponding to the target food storage apparatus returned from the server is empty, generating a homepage for food information processing based on prompt information and displaying in the user interface. The prompt information is used to indicate that there is no food stored in the target food storage apparatus.

After the user operates the display apparatus to generate the food query command, if the food data received by the display apparatus from the server is empty, then the preset prompt information can be obtained to generate the homepage for food information processing. In this case, the displayed content in the homepage for food information processing can merely include the prompt information, such as "Your food storage apparatus is empty, go to add some food to it", to prompt the user that there is no food stored in the food storage apparatus.

The display apparatus according to embodiments of the disclosure, to view food information of all existing foods in the food storage apparatus, the user can input a food query command via the display apparatus to view the existing foods in the target food storage apparatus, and the food data corresponding to the target food storage apparatus can be obtained from the server. The homepage for food information processing can be shown in the user interface, presenting the food information of all existing foods in the target food storage apparatus. It can realize viewing the food information in the food storage apparatus through the display apparatus, users can query and manage the food information in the food storage apparatus in real-time and on-site, the food query is more efficient, which can greatly improve the quality of life of users.

In some embodiments, in addition to the user operating the display apparatus to view the food information of all existing foods in the food storage apparatus, the food information of a specified kind of food in the food storage apparatus can also be viewed. In this case, the display apparatus can present the viewing page as a specific food page. The specific food page is used to display food information of the expired/nearly expired/fresh food, food information in a specified compartment, information of a specified kind of food in a specified compartment, status of a specified kind of food, and other information of the specified kind of food.

According to some embodiments, a method for querying food information in a food storage apparatus is provided. A display apparatus according to embodiments can include: a display configured to present an image and/or a user interface, and at least one processor connected with the display. The at least one processor is configured to execute instructions to cause the display apparatus to perform:

in response to a food query command for checking a specified kind of food in the target food storage apparatus from a user, obtaining food data corresponding to the specified kind of food in the target food storage apparatus from the server; where the target food storage apparatus indicates the food storage apparatus which is bound with the display apparatus via account; and based on the food data of the specified kind of food returned from the server, switching to display a specific food page in the user interface, where the specific food page is configured to show the food information of the specified kind of food in the target food storage apparatus.

When the food information stored in the food storage apparatus is checked via the display apparatus, the user can operate the display apparatus to generate a food query command, and in this case, the food query command can be used to view the food information of the specified kind of food in the food storage apparatus through the display apparatus.

The target device for querying food information by the display apparatus can be the target food storage apparatus bound with the same specified account as the display apparatus, and to view the food information of the specified kind of food stored in the target food storage apparatus, the display apparatus needs to communicate with the target food storage apparatus through the server to obtain the food data corresponding to the specified kind of food stored in the target food storage apparatus. To present the specific food page, the food data can include the food information of the specified kind of food stored in the target food storage apparatus.

In some embodiments, the food information of the specified kind of food can include, but not limited to, the food information of a specified compartment, food information of a specified kind of food, food information of the specified food in the specified compartment, food information of a specified freshness type in a specified compartment, and a status of the specified kind of food. The food information of the specified freshness type indicates the food information being expired/nearly expired/fresh in a specified compartment, and the status of the specified kind of food is used to indicate its freshness degree.

The food query command for checking the food information of specified kind of food can be input via the display apparatus based on voice, which can conveniently access the information of the specified kind of food.

For example, if the user wants to view the food information of the expired food in the refrigerator compartment of the target food storage apparatus via the display apparatus, the user can say "check the expired food in the refrigerator compartment of the food storage apparatus"; if the user wants to check the food information in the freezer compartment of the target food storage apparatus via the display apparatus, the user can say "check the food in the freezer compartment of the food storage apparatus"; if the user wants to check the information of a specified kind of food in a specified compartment of the target food storage apparatus via the display apparatus, the user can say "Is there beef in the refrigerator compartment of the food storage apparatus"; if the user wants to check the status of a specified kind of food in the food storage apparatus, the user can say "Is yogurt expired? is yogurt fresh? or if yogurt nearly expired"; if the user wants to check the specified food information in the food storage apparatus, the user can say "Is there beef in the food storage apparatus, where did I put the beef? where is the beef" and so on.

The user can input food query commands through any of the above voice methods on the display apparatus, and food data corresponding to the specified kind of food in the target food storage apparatus can be obtained from the server. Specifically, the at least one processor is further configured to execute instructions to cause the display apparatus to perform:

- in response to a second voice command for checking the specified kind of food in the target food storage apparatus, extracting identification parameters of the specified kind of food carried in the second voice command, and querying a target device ID of the target food storage apparatus logged into the same specified account as the display apparatus from the server, where the identification parameters indicate the food name, storage compartment, and freshness of the specified kind of food;
- sending a food query instruction carrying the target device ID and the identification parameters of the specified kind of food to the server, where the food query command is used to instruct the server to query the food data of the specified kind of food in the target food storage apparatus corresponding to the device ID and the identification parameters;
- receiving the food data of the specified kind of food in the target food storage apparatus returned from the server.

When a user needs to view information of a specified kind of food in the food storage apparatus using the display apparatus, the user can input a voice command to inquire about the information of the specified kind of food, such as "fresh beef in the freezer compartment of the food storage apparatus." Based on this voice command, the food information stored in the food storage apparatus can be obtained from the server to view the information of the specified kind of food in the specified room with the specified freshness in the food storage apparatus.

Figure 30:
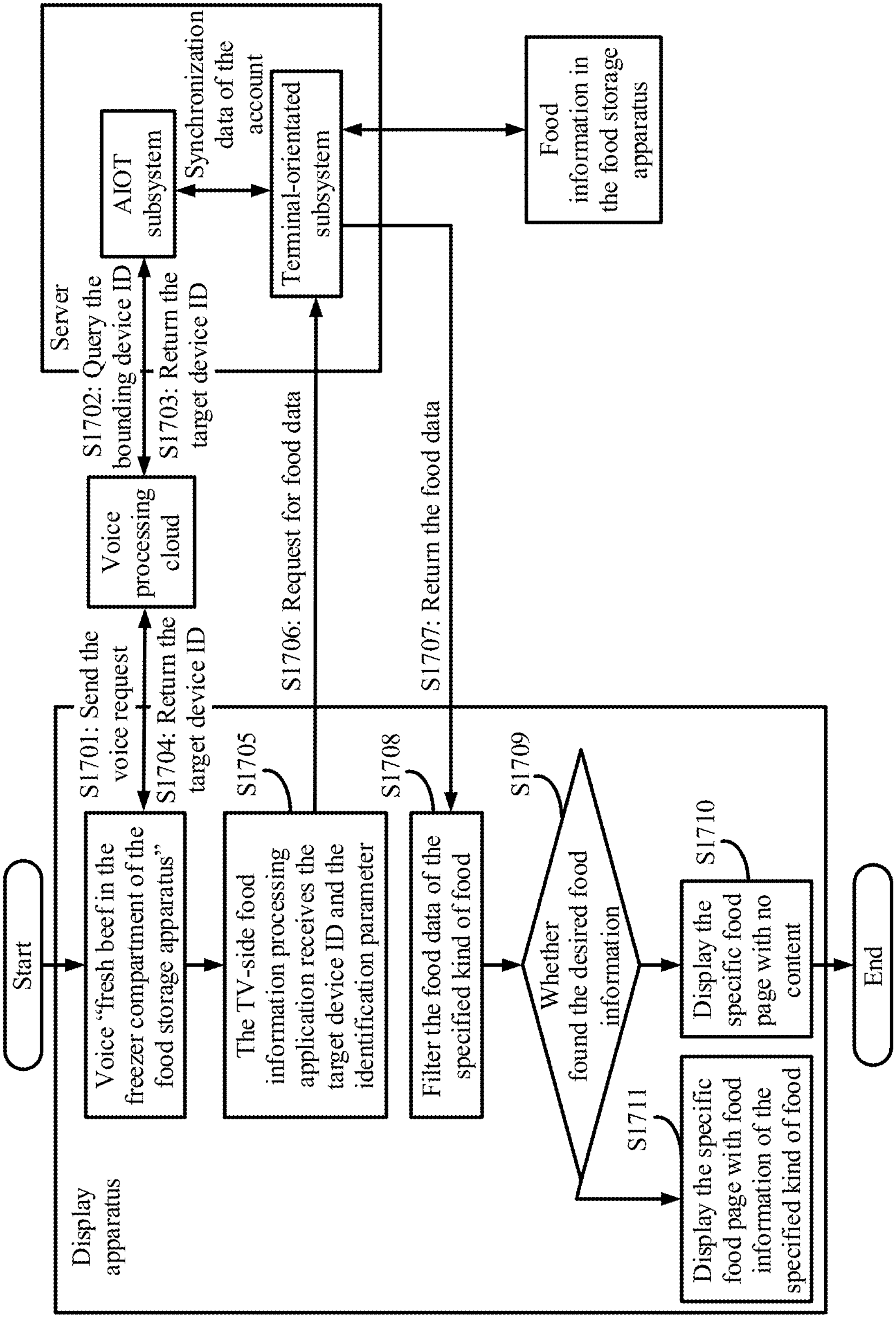
FIG. 30 shows a data flow diagram of viewing a specific food page according to some embodiments of the disclosure.

FIG. 30 shows a data flow diagram of viewing a specific food page according to some embodiments.

S1701: upon a user's input of the second voice command, the voice application in the display apparatus recognizes the second voice command and generates a voice request to the voice processing cloud.

The voice processing cloud can parse the voice command carried in the voice request and extract the voice text. The voice text can carry identification parameters. The identification parameters can indicate from which dimension of the food name, storage room, and food freshness in the food information of the specified kind of food that the user wants to view.

For example, if the voice command is "view expired food in the food storage apparatus refrigerator," the identification parameters can indicate data in two dimensions: storage compartment and food freshness. If the command is "view food in the freezer compartment of the food storage apparatus," the identification parameter indicates data in one dimension: storage compartment. If the voice command is "is there beef in the refrigerator compartment of the food storage apparatus," the identification parameters indicate data in two dimensions: storage compartment and food name.

In some embodiments, if the identification parameters only indicate data in one dimension, which is the food freshness, then a displayed page can be a food tag page. Therefore, if the display apparatus is required to show a specific food page, the voice command includes at least one of parameters indicating food name and storage compartment, in addition to the freshness parameter. In this case, the freshness parameter cannot be independently applied. However, for parameters that only indicate the food name or storage compartment in the voice command, a specific food page can be presented.

Based on determining that the voice text indicates to view a specified kind of food in a specified compartment with specified freshness in the food storage apparatus, a device query request can be generated and sent to the server to query the food information of the specified kind of food with specified freshness in the specified compartment in a certain food storage apparatus.

S1702: since the food storage apparatus, the food information of which can be viewed through the display apparatus, needs to be bound with the display apparatus via account, while the display apparatus generating a device query request, the display apparatus obtains a specified account under which the display apparatus is logged into and sends a device query request carrying the specified account to the server via the voice processing cloud.

S1703~S1704: the server responds to the device query request, searches for the corresponding target food storage apparatus based on the specified account, and returns the target device ID of the target food storage apparatus to the display apparatus via the voice processing cloud. The target device ID is used to identify the target food storage apparatus.

S1705~S1706: after determining the target food storage apparatus that the user wants to view, the TV-side food information processing application in the display apparatus generates the food query command based on the target device ID and the identification parameters of the specified kind of food, and sends the food query command to the server.

S1707: the server queries the food data of the specified kind of food corresponding to the identification parameters in the target food storage apparatus corresponding to the target device ID. After finding the food data of the target food storage apparatus, the server returns the food data to the display apparatus. The food data can include the food information of the specified kind of food stored in the target food storage apparatus.

In some embodiments, the server can include an AIOT subsystem and a terminal-oriented subsystem. The functions and roles of the AIOT subsystem and the terminal-oriented subsystem can refer to the previous embodiments and are not described here.

To view the food information of the specified kind of food in the target food storage apparatus, the TV-side food information processing application on the display apparatus can invoke the terminal-oriented subsystem in the server to query the food data of the specified kind of food stored in the target food storage apparatus corresponding to the target device ID, and then return the food data of the specified kind of food stored in the target food storage apparatus to the TV-side food information processing application on the display apparatus for display.

After receiving the food data corresponding to the specified kind of food in the target food storage apparatus returned from the server, the display apparatus can generate a specific food page based on the food data, which can be displayed on the display of the display apparatus for users to view. For example, when the user says "fresh beef in the freezer compartment of the food storage apparatus," the content displayed in the specific food page presented on the display apparatus is the information about the fresh beef stored in the freezer compartment of the food storage apparatus.

The TV-side food information processing application of the display apparatus can generate a specific food page based on the food data of the specified kind of food received from the server, which is displayed on the user interface.

S1708~S1709: filtering the food data of the specified kind of food to obtain the desired food information. Because there may be multiple foods corresponding to the voice command in the food storage apparatus, for example, if the user wants to view “beef in the freezer compartment of the food storage apparatus” and there are three beef stored in the freezer compartment of the food storage apparatus, to determine which beef the user wants to view, the food data corresponding to the specified kind of food returned by the server needs to be filtered.

When the TV-side food information processing application requests the food data of the specified kind of food from the server, it can use various permutations and combinations based on the parameters extracted from the voice command to obtain various food data. For example, when the voice command is “fresh beef in the refrigerator compartment of the food storage apparatus”, the parameters extracted by the voice processing cloud are food name (beef), storage compartment (refrigerator), and food freshness (fresh). Based on the combination of the above parameters, at least two parameters can be combined and be used to query the server for food data, which can include but not limited to: beef in the freezer compartment of the food storage apparatus, fresh beef in the freezer compartment of the food storage apparatus, beef in the food storage apparatus, where is the beef in the food storage apparatus, expired beef in the food storage apparatus, etc.

The food data returned from the server may not be all the data that the user wants. Therefore, finally, the TV-side food information processing application can filter the data based on the food name (beef), storage compartment (refrigerator), and food freshness (fresh) to obtain the final food data for display that the user wants to view.

S1710~S1711: the display apparatus displays the specific food page, including a specific food page displaying food information of the specified kind of food and a specific food page with no content.

In some embodiments, when a user views the food information of the specified kind of food in the food storage apparatus via the display apparatus, the user can get the information of the specific kind of food in a specific compartment with specific freshness by operating the display apparatus.

Therefore, the food information displayed in the specific food page may be more specific, that is, the content displayed may be more than the food information displayed on the homepage for food information processing as in the previous embodiments.

Figure 31:
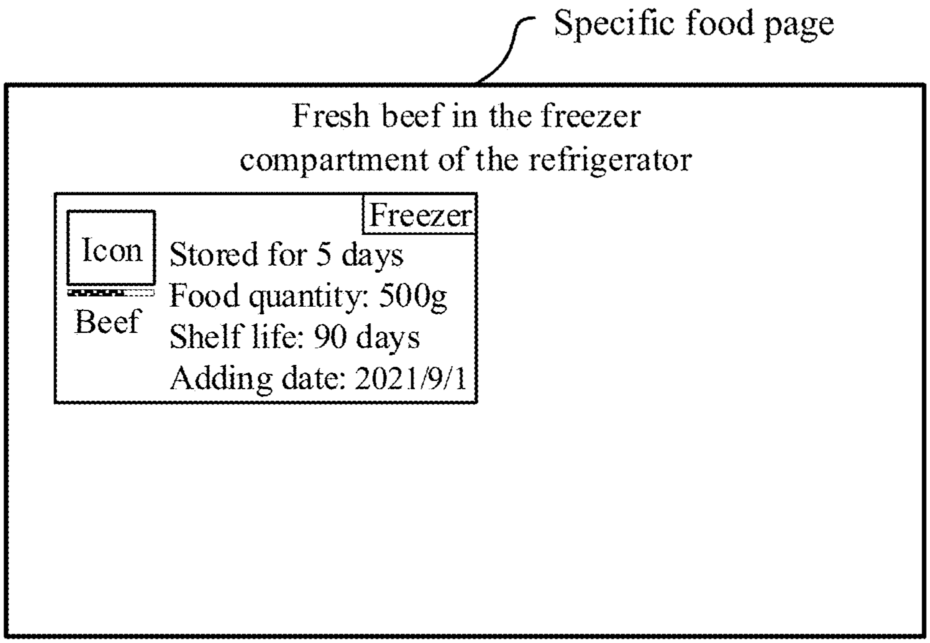
FIG. 31 shows a schematic diagram of a specific food page shown on a display apparatus according to some embodiments of the disclosure.

FIG. 31 shows a schematic diagram of a specific food page according to some embodiments. Referring to FIG. 31, when displaying a specific food page on the display apparatus, the food information of the specified kind of food in the food storage apparatus that the user wants to view may include food name (beef), food icon, food quantity (500 grams), storage compartment (freezer), adding date (2021 Sep. 1), shelf life (90 days), food freshness (stored for 5 days), etc. The various food information is displayed in a “card” for easy viewing.

In some embodiments, if the display apparatus obtains food data corresponding to several foods that meets the user’s viewing requirements from the server, then the several foods should be displayed in the specific food page in an order. In this case, the at least one processor is further configured to execute instructions to cause the display apparatus to perform:

based on that the food data includes a plurality of pieces of food information corresponding to the specified kind of food, obtaining a preset sorting rule, sorting the plurality of pieces of food information based on the preset sorting rule; and generating the specific food page based on the plurality of pieces of food information after sorting.

When there are a plurality of pieces of food information corresponding to the specified kind of food that the user wants to view, the display apparatus can sort the plurality of pieces of food information corresponding to the specified kind of food returned by the server according to the preset sorting rule, generate a display position based on each piece of food information, and then present it in the specific food page. Each display position displays one piece of food information of the specified kind of food.

The preset sorting rule may be to sort by shelf life, such as displaying information of expired food at the forefront, displaying the information of nearly expired food behind the expired ones, displaying the information of food most recently added behind the expired ones, and sorting the remaining food information the order of adding time of the food, with the information of food most recently added displayed behind the information of food most recently added relatively, and the information of food added earliest displayed last.

For example, when the user says “check beef in the freezer compartment of the food storage apparatus” and there are two beef in the freezer compartment of the food storage apparatus added at different times by two users, then the display apparatus can obtain two pieces of food information of beef after querying the food information from the server.

In this case, to check the freshness of each beef, if there is an expired situation, the information of the expired beef is displayed in the first display position; if both beef are within the shelf life, the beef A added into the food storage apparatus first will be displayed in the first display position on the specific food page, and the beef B added into the food storage apparatus last will be displayed in the second display position on the specific food page.

In some embodiments, if the display apparatus obtains empty food data of the specified kind of food in the target food storage apparatus from the server when the user checks the food information of the specified kind of food in the food storage apparatus through the display apparatus, it can prompt the user to display a specific food page with empty content according to preset prompt information to avoid making the user feel abnormal. The prompt information may be “There is no fresh beef in the freezer compartment of your food storage apparatus”.

According to the display apparatus provided in the embodiments of the disclosure, when the user wants to view the food information of the specified kind of food in the food storage apparatus, the user can input a food query command through the display apparatus to obtain the food data corresponding to the specified kind of food in the target food storage apparatus from the server, and the display apparatus can display the specific food page in the user interface, presenting the food information of the specified kind of food in the target food storage apparatus, which allows to check the food information in the food storage apparatus through the display apparatus. Users can query and manage the food information in the food storage apparatus in real time and on-site, making food inquiries more efficient and greatly improving the quality of life for users.

In some embodiments, in addition to allowing users to check the food information of all existing foods in the food storage apparatus and to check the food information of the specified kind of food, the display apparatus can also show the food information of food of a specified type stored in the food storage apparatus. In this case, the displayed page presented by the display apparatus is a food tag page. The specified type can be any type under the food freshness category, i.e., viewing the food information of fresh food, expired food, and nearly expired food stored in the food storage apparatus. The food tag page is not limited to a specific kind of food. If both the food name and freshness are specified, it will activate the specific food page.

In some embodiments, after the display apparatus presents the specific food page based on the operation of the user in the user interface, if food information of a specified type can be extracted from the voice command that activates the specific food page, the display may switch to the food tag page upon exiting the specific food page to display the food information of the specified type.

In view of this, when presenting the specific food page in the user interface, the at least one processor is further configured to execute instructions to cause the display apparatus to perform:

in response to an exit command for cancelling displaying the specific food page, extracting a specified type name for indicating existing food of a specified type from the food query command; and obtaining food data of the existing food corresponding to the specified type name in the target food storage apparatus from the server, generating the food tag page based on the food data, switching to display the food tag page in the user interface, and presenting the food information of the existing food of the specified type in the target food storage apparatus on the food tag page.

After the user queries the food information in the target food storage apparatus through voice and the display apparatus display it in the specific food page on the display apparatus's user interface, if the user inputs an exit command based on the specific food page, the display of the specific food page may be canceled. To provide users with more display pages, the food tag page can be displayed to the user after exiting the specific food page.

When the user inputs a voice command to query food information, if the specific food page is canceled from the display, based on the exit command, the specified type name can be extracted from the voice text corresponding to the food query command, so that the type of data the user wants to view can be determined.

After determining the target food storage apparatus of which the food information the user wants to view, the TV-side food information processing application on the display apparatus can generate a food query command based the target device ID and the specified type and send the food query command to the server, so that the server can search the food data of the existing food corresponding to the specified type name stored in the target food storage apparatus corresponding to the target device ID. The food data can include food information of all existing foods of the specified type stored in the target food storage apparatus.

After receiving the food data of the food corresponding to the specified type stored in the target food storage apparatus returned from the server, the TV-side food information processing application on the display apparatus can generate the food tag page based on the food data of the food corresponding to the specified type and display the food tag page in the user interface.

Since a voice command for activating the specific food page should include a name of the specified kind of food, if the voice command includes the specified type name in addition to the name of the specified kind of food, then the food data can be obtained based on the specified type name after the specific food page is exited, and the food tag page can be displayed. If the voice command merely includes the name of the specified kind of food, the user interface can switch to display the device homepage or the homepage for food information processing after exiting the specific food page.

For example, when the user says "check fresh beef in the refrigerator compartment in the food storage apparatus," the specific food page is displayed in the user interface, showing the food information of fresh beef in the refrigerator compartment as shown in FIG. 31. When exiting the specific food page, because there is a specified type name (fresh) in the voice command, the food data of all existing foods corresponding to the specified type in the target food storage apparatus can be obtained from the server based on the specified type name, that is, the food tag page can be generated based on the food information of all "fresh" foods and displayed in the user interface.

If the voice command is "fresh beef in the food storage apparatus," then the specified type name is "fresh"; if the voice command is "nearly expired beef in the food storage apparatus," then the specified type name is "nearly expired"; if the voice command is "expired beef in the food storage apparatus," then the specified type name is "expired".

In some embodiments, the specified type can be freshness types, such as being fresh, being expired, and being nearly expired. Therefore, the food tag page can include the type tags based on freshness types. For example, the food tag page shows food information corresponding to three type tags. When the user wants to check the food information corresponding to the specified type, the display can directly skip to the page corresponding type tag from the food tag page to display the food information of the specified type, making it easy for users to view the corresponding food data on the display apparatus's user interface when the user wants to view the food data of the specified type.

Therefore, the at least one processor is further configured to execute instructions to cause the display apparatus to perform:

retrieving food information of different existing foods and the specified type tag corresponding to the specified type from the food data; and based on the specified type tag corresponding to the specified type, generating a food tag page including an information display area, switching the user interface from the specific food page to the food tag page, and displaying food information of the different existing foods corresponding to the specified type in the information display area.

The food data returned from the server in the target food storage apparatus can include the food information of all existing foods corresponding to the specified type in the target food storage apparatus. Therefore, based on the specified type, the corresponding food information of the existing foods can be extracted for display.

By extracting the voice text from the user's voice and determining the specified type name, the specified type tag corresponding to the specified type name can be obtained. For example, if the user says "fresh beef in the food storage apparatus," then the specified type tag is "fresh food"; if the user says "nearly expired beef in the food storage apparatus," then the specified type tag is "nearly expired food"; if the user says "expired beef in the food storage apparatus," then the specified type tag is "expired food."

The food tag page can display various type tags, such as "fresh food" tag, "nearly expired food" tag, and "expired food" tag in order. Under each type tag, an information display area is shown, which is used to display the food data corresponding to the specified type tag. Finally, the food information of different existing foods corresponding to the specified type can be displayed in the information display area.

Figure 32:
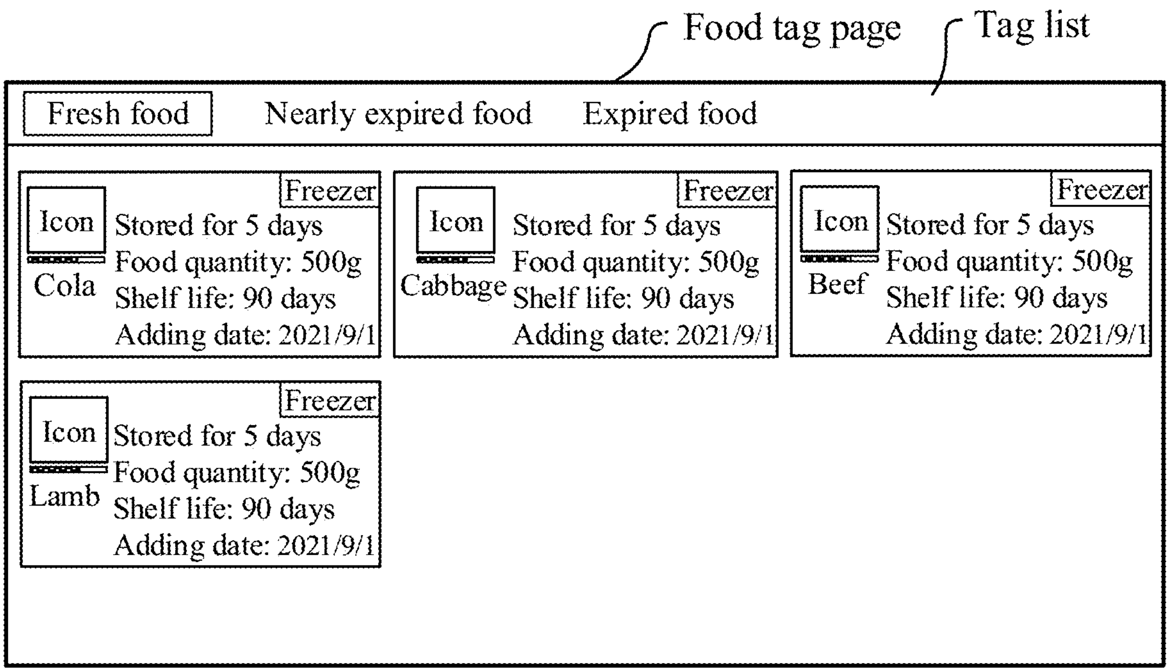
FIG. 32 shows a schematic diagram of information about fresh food presented in a food tag page according to some embodiments of the disclosure.

FIG. 32 shows a schematic diagram of the food tag page showing fresh food information according to some embodiments. Referring to FIG. 32, when the user says "check fresh beef in the food storage apparatus," the specific food page can be first displayed in the user interface, as shown in FIG. 31. While exiting the display of the specific food page, the specified type can be extracted from the voice as fresh food (fresh_food), to check the food information of all existing foods with a freshness status of fresh in the food storage apparatus. The specified type (fresh food type) can be used as a query parameter to obtain all food data corresponding to the fresh food type from the server.

If the food data of the fresh food type includes food information of cola, cabbage, beef, and lamb, then a new food tag page can be generated based on this data and displayed in the user interface of the display apparatus. During display, the focus in the tag list on the food tag page can automatically indicate the "fresh food" tag among the tags on the food tag page, and the information display area below this tag can show the information of cola, cabbage, beef, and lamb sequentially. Each piece of food information can be displayed in a "card" for easy viewing.

Under the "fresh food" tag, the display order of the food information of the foods in the corresponding information display area is sorted according to the order of adding time of the foods, with the information of the most recently added food displayed first, followed by the information of relatively recently added food, and the information of the earliest added food displayed last. The food information displayed for fresh food may include food name, food icon, adding time, shelf life, quantity, food freshness (stored for n days), storage compartment, etc.

In some embodiments, when the user says "view nearly expired beef in the food storage apparatus," the specific food page can be first displayed in the user interface, as shown in FIG. 31. While exiting the display of the specific food page, the specified type can be extracted from the voice as nearly expired food (nearly_out_date_food), to check the food information of all existing foods with a freshness status of nearly expired in the food storage apparatus. The specified type (nearly expired food type) can be used as a query parameter to obtain all food data corresponding to the nearly expired food type from the server.

If the food data of the nearly expired food type can include information of grape, egg, rib, watermelon, and dumpling, then a new food tag page can be generated based on this data and displayed in the user interface of the display apparatus. During display, the focus in the tag list on the food tag page can automatically indicate the "nearly expired food" tag, and the information display area below this tag can show the information of grape, egg, rib, watermelon, and dumpling sequentially. Each piece of food information can be shown in a "card" for easy viewing.

Under the "nearly expired food" tag, the display order of the food information of the foods in the corresponding information display area is sorted according to the remaining days until expiration, with the food with the fewest remaining days displayed first, and the food with the most remaining days displayed last. The remaining days until expiration can be calculated by taking away the number of days it has been stored from the shelf life of the food. The food information displayed for nearly expired foods may include food name, food icon, adding time, shelf life, quantity, remaining days until expiration, storage compartment, etc.

In some embodiments, when the user says "check expired beef in the food storage apparatus," the specific food page can be first displayed in the user interface, as shown in FIG. 31. While exiting the display of the specific food page, the specified type can be extracted from the voice as expired food (out_date_food), to view the food information of all existing foods with a freshness status of expired in the food storage apparatus. The specified type (expired food type) can be used as a query parameter to query all food data corresponding to the expired food type from the server.

If the food data of the expired food type can include information of apple, yogurt, shrimp, sausage, cake, and juice, then a new food tag page can be generated based on this data and displayed in the user interface of the display apparatus. During display, the focus in the tag list on the food tag page can automatically indicate the "expired food" tag, and the information display area below this tag can show the information of apple, yogurt, shrimp, sausage, cake, and juice sequentially. Each piece of food information can be shown in a "card" for easy viewing.

Under the "expired food" tag, the display order of the food information of the food in the corresponding information display area can be sorted according to the number of days since expiration, with the food that has been expired for the longest period displayed first, and the food that has been expired for the shortest period displayed last. The number of days since expiration indicates the number of storage days that have passed since the food exceeded its shelf life. The food information displayed for expired food may include food name, food icon, adding time, shelf life, quantity, number of days since expiration, storage compartment, etc.

In some embodiments, the food tag page can show the food information for each type. Based on the food query request by the user operating on the display apparatus, the focus in the tag list can automatically indicate the corresponding type tag, and the food data corresponding to the specified type tag can be synchronously displayed below the type tag, allowing users to simultaneously check information on expired foods, nearly expired foods, or fresh foods in the target food storage apparatus.

In some embodiments, when a user operates a display apparatus to check information about target food of a specified type in a storage apparatus, after presenting a food tag page on the display apparatus, the user can directly operate on the food tag page to view food information of another type. Therefore, the at least one processor is further configured to execute instructions to cause the display apparatus to perform:

based on that the food tag page displays a second type tag, while displaying food information corresponding to the specified type tag on the food tag page, in response to a command for skipping to the second type tag from the user, obtaining food data of the second type corresponding to the second type tag in the target food storage apparatus from the server; and replacing the displayed content in the information display area of the food tag page with the food data of the second type.

When presenting the food tag page on the display apparatus, in addition to displaying the specified type tag on the tag list of the food tag page, other tags at the same level as the specified type tag can also displayed. For example, if a user wants to view fresh food in the target food storage apparatus, after the focus indicates the "fresh food" tag, the tag list can further include "expired food" and "nearly expired food" tags at the same level as the "fresh food" tag.

In this case, both the "expired food" tag and the "nearly expired food" tag are second type tags. The second type tags and the specified type tag belong to the same category, such as food freshness, which can include three types: fresh, nearly expired, and expired types.

When food data corresponding to the specified type has already been displayed on the display apparatus, the user can further operate on the food tag page, such as, clicking on another type tag (any one of the second type tags) to display the food data corresponding to another type tag in the food tag page.

For example, if a user's previous operation on the display apparatus was to check food information about fresh food in the target food storage apparatus, the displayed content of the food tag page can be as shown in FIG. 32. If the user also wants to check food information about nearly expired food in the target food storage apparatus, the user can select the "nearly expired food" tag on the tag list of the food tag page, generating a skip instruction. Based on the nearly expired type corresponding to the "nearly expired food" tag, the display apparatus can query the server to obtain food data corresponding to the nearly expired type in the target food storage apparatus.

After obtaining the food data of the nearly expired type, each piece of food information included in the food data is sequentially displayed in the information display area according to a preset order. In this case, the content displayed in the information display area of the food tag page changes from the food information of fresh food to the food information of nearly expired food, and meanwhile, the focus on the tag list can automatically skip to the "nearly expired food" tag. The effect diagram of displaying the food information of the nearly expired type after the skip is not shown.

In some embodiments, every time the user switches type tag based on the food tag page presented on the display apparatus, the food data corresponding to the target type tag selected by the user can be promptly displayed in the information display area below the tag, realizing the purpose of switching and viewing food information.

In some embodiments, if the user's voice does not contain a specified food name, the food tag page can be directly displayed on the display apparatus, without first displaying a specific food page and then canceling the display before displaying the food tag page.

According to some embodiments, the disclosure provides a method for querying food information in a food storage apparatus. A display apparatus according to embodiments of the disclosure can include: a display, configured to present an image and/or a user interface; and at least one processor connected with the display. The at least one processor is configured to execute instructions to cause the display apparatus to perform:

in response to a food query command for checking existing foods of a specified type in the target food storage apparatus from the user, obtaining food data corresponding to the specified type in the target food storage apparatus from the server, where the target food storage apparatus is a food storage apparatus which is bound with the display apparatus via account, and the food data includes food information of different existing foods corresponding to the specified type in the target food storage apparatus; and based on the food data corresponding to the specified type returned from the server, switching to the food tag page for display in the user interface, and presenting the food information of existing foods of the specified type in the target food storage apparatus in the food tag page.

When checking food information stored in the food storage apparatus on the display apparatus, where the display apparatus directly displays the food tag page on the user interface of the display apparatus, the user can operate the display apparatus to generate a food query command, and the food query command in this case can be used to view food information of existing foods of a specified type in the food storage apparatus through the display apparatus. The method of inputting the food query command can be based on voice, which allows for conveniently accessing the specified food information.

If the food query command input via voice from the user merely contains the freshness parameter (i.e., the "cmd" parameter), and all other parameters are empty, it is considered as for activating the food tag page. For example, "fresh foods in the food storage apparatus", "nearly expired food in the food storage apparatus", "expired foods in the food storage apparatus".

If the food query command includes parameters other than freshness, such as the food name parameter, it may activate the specific food page based on the information. For example, "fresh beef in the food storage apparatus" contains not only the freshness (fresh) parameter but also the food name (beef) parameter, therefore, the display apparatus can display the specific food page.

When the food query command is generated based on any of the voice operations to the display apparatus from the user, the food data of the existing foods corresponding to the specified type in the target food storage apparatus can be obtained from the server. Specifically, the user inputs a third voice command for checking the food information corresponding to the specified type in the target food storage apparatus, the specified type name can be extracted from the third voice command, and the target device ID of the target food storage apparatus logged into the same account as the display apparatus can be queried to the server. A food query command carrying the target device ID and the specified type name can be sent to the server, where the food query command is used to instruct the server to query the food data of existing foods corresponding to the specified type name in the target food storage apparatus corresponding to the target device ID, and the food data of existing foods corresponding to the specified type name in the target food storage apparatus returned by the server can be received.

When the user needs to use the display apparatus to view food information of a specified type in the food storage apparatus, the user can say a voice command to indicate the need to view food information of a specified type, such as "fresh foods in the food storage apparatus", "nearly expired food in the food storage apparatus", or "expired foods in the food storage apparatus", then based on this voice command, the display apparatus can obtain the food information stored in the food storage apparatus from the server, to allow the food information of foods with different freshness degrees in the food storage apparatus to be viewed.

If the voice command is “fresh foods in the food storage apparatus”, the specified type name is “fresh” type; if the voice command is “nearly expired food in the food storage apparatus”, the specified type name is “nearly expired” type; if the voice command is “expired foods in the food storage apparatus”, the specified type name is “expired” type.

After the display apparatus receives the food data of existing foods corresponding to the specified type in the target food storage apparatus returned by the server, it can generate the food tag page based on the food data and display the food tag page on the display apparatus’s display, for the user to view. For example, when the user’s voice command is “fresh foods in the food storage apparatus”, the displayed content of the food tag page presented on the display apparatus can include the food information of all foods with a freshness status of “fresh” in the food storage apparatus.

The process of inputting the voice command, parsing the voice command, extracting the specified type name and target device ID based on the specified type name, querying the corresponding food data based on the specified type name and target device ID, generating the food tag page, and skipping to view the food information under each tag can refer to the aforementioned embodiments, which will not be repeated here.

In some embodiments, when the user operates the display apparatus to view expired foods in the target food storage apparatus, the display apparatus can request all expired foods in the target food storage apparatus from the server, generate expiration alert information based on the food names of the expired foods, and display the expiration alert information on the food tag page when presenting the food tag page on the user interface of the display apparatus.

Figure 33:
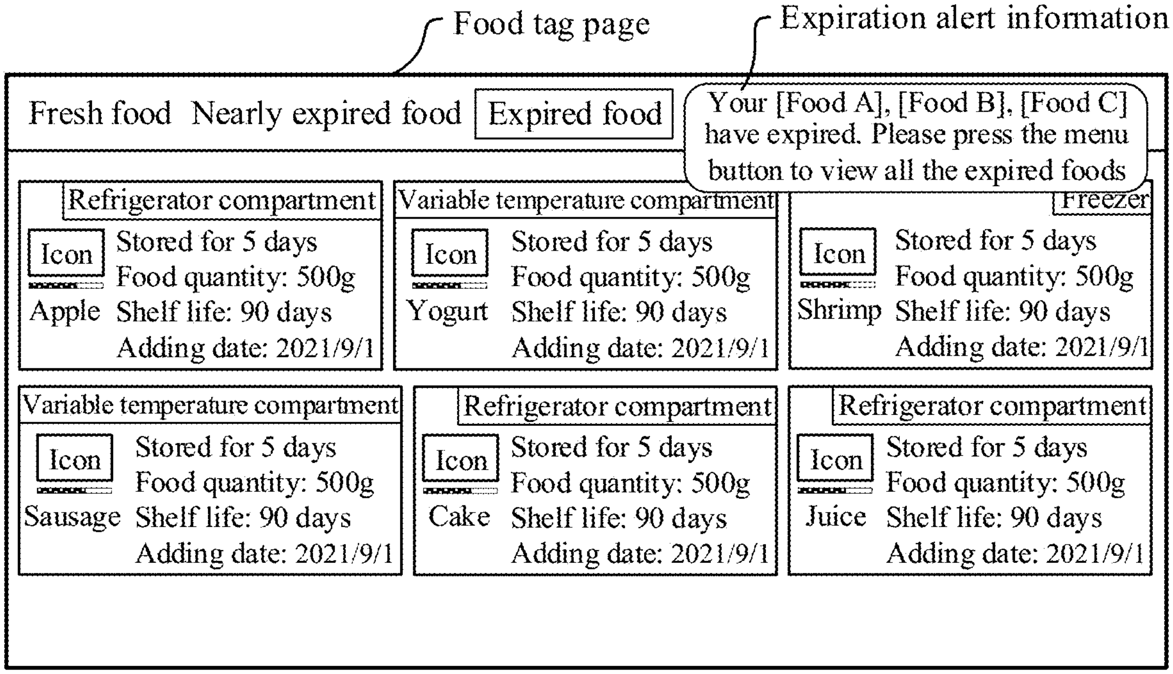
FIG. 33 shows a schematic diagram of a food tag page with an expiration alert according to some embodiments of the disclosure.

FIG. 33 shows a schematic diagram of the food tag page with the expiration alert information according to some embodiments. Referring to FIG. 33, the expiration alert information can be generated based on the food names of all expired foods, so that the user can quickly browse through all expired foods currently existing in the target food storage apparatus. If the user wants to know information such as the storage compartment and number of days expired for the respective expired foods, they can view it through the food information displayed in the information display area of the food tag page.

If there are many expired foods in the food storage apparatus, the expiration alert information displayed on the display apparatus may not be able to fully show all expired food names. Therefore, by selecting a menu key on the remote control, all expired food names can be viewed.

In some embodiments, when the user operates the display apparatus to view food information of a specified type in the food storage apparatus, if the display apparatus obtains the food data of the specified type from the server and finds it empty, it can prompt the user, and display the food tag page according to the preset prompt information to avoid making the user feel abnormal.

After the user operates the display apparatus to generate the food query command for checking expired foods in the food storage apparatus, if the display apparatus receives the food data of the specified type returned by the server as empty, it can obtain the preset prompt information to generate the food tag page, and meanwhile, the focus of the tag list can automatically skip to the “expired food” tag. In this case, the display content of the food tag page is empty, only showing the prompt information in the information display area, such as “No expired food”, to inform the user that there is no expired food in the target food storage apparatus.

In some embodiments, while the user operates the display apparatus to view the food information in the target food storage apparatus, if it is the food tag page that is desired to be viewed, the specified type in the user’s voice can include other types in addition to the food freshness, which are not limited here.

According to the display apparatus provided in the embodiments of the disclosure, when the user wants to view the food information of the specified type in the food storage apparatus, the user can input the food query command for checking the food information corresponding to the specified type in the target food storage apparatus via the display apparatus. The display apparatus can obtain the food data corresponding to the specified type in the target food storage apparatus from the server, and display the food tag page in the user interface. The food tag page can present the food information of the food corresponding to the specified type in the target food storage apparatus. This allows to view the food information in the food storage apparatus via the display apparatus, the user can query and manage the food information in the food storage apparatus in real time and on-site, making food inquiries more efficient and greatly improving the quality of life for users.

In some embodiments, when the user operates the display apparatus to view various types of food information in the target food storage apparatus, the methods of starting the homepage for food information processing, the specific food page, and the food tag page presented on the display apparatus can all be based on voice. In order for the display apparatus to accurately start the corresponding viewing page based on the user’s voice command, the display apparatus needs to analyze the user’s voice command, extract the query parameters, and determine which type of page the user wants to view based on the query parameters, so that the display apparatus can present the user with an accurate page for viewing food information, improving the user experience.

According to some embodiments, the disclosure provides a method for querying food information stored in a food storage apparatus. A display apparatus according to embodiments of the disclosure can include: a display configured to present an image and/or a user interface; and at least one processor connected with the display. The at least one processor is configured to execute the instructions to cause the display apparatus to perform:

- in response to a voice command for checking existing foods in the target food storage apparatus from a user, extracting a query parameter carried in the voice command; where the target food storage apparatus indicates a food storage apparatus which is bound with the display apparatus via account;
- based on that the query parameter indicates a food name, obtaining food data corresponding to a specified food name in the target food storage apparatus from the server, and based on the food data corresponding to the specified food name, generating a specific food page and display the specific food page in the user interface;
- based on that the query parameter indicates a food type, obtaining food data of the existing foods corresponding to a specified type in the target food storage apparatus from the server, and based on the food data of the existing foods corresponding to the specified type, generating a food tag page and display the food tag page in the user interface; and based on that the query parameter does not indicate the food name and food type, obtaining food data of all existing foods in the target food storage apparatus from the server, and based on the food data of all existing foods, generating a homepage for food information processing and display the homepage for food information processing in the user interface.

When the user operates the display apparatus using voice commands, the display apparatus can receive the user's voice command. The voice application in the display apparatus can recognize the voice command and generate a voice request to be sent to the voice processing cloud. The voice processing cloud can parse the voice command carried in the voice request and extract the voice text.

The voice text can include different keywords. If there is a keyword that matches a preset query parameter, the voice command can be determined as a food query command. The query parameter indicates the parameter required for the display apparatus to obtain food information from the server, used to indicate different types of food data. Here, preset query parameters may include food name (name), food type (cmd), storage compartment (room), etc., and the food type can be food freshness.

In some embodiments, if the query parameter extracted from the voice command is consistent with the food name (name), it indicates that the user wants to view the food information of the specified kind of food, that is, the display apparatus needs to present the specific food page. Therefore, to facilitate the presentation of the specific food page, the display apparatus can generate a device query command to obtain the target device ID from the server, then generate a food query command carrying the specified name and target device ID to obtain the food data corresponding to the specified food name from the server. Finally, based on the food data corresponding to the specified food name, the display apparatus can generate a specific food page and display it in the user interface. The generation process of the specific food page is based on various implementation steps as described in the aforementioned embodiments. Here, the query parameters can be equivalent to the identification parameters mentioned above.

If the query parameter extracted from the voice command is consistent with at least one of the food name (name), food type (cmd), and storage compartment (room), the display apparatus can present the specific food page. For example, if the query parameter indicates the storage compartment (room), the display apparatus can display the specific food page. If the query parameter indicates both the food name (name) and the food type (cmd), the display apparatus can display the specific food page. If the query parameter indicates both the food name (name) and the storage compartment (room), the display apparatus can display the specific food page. If the query parameter indicates both the food type (cmd) and the storage compartment (room), the display apparatus can display the specific food page. If the query parameter indicates the food name (name), food type (cmd), and storage compartment (room), the display apparatus can display the specific food page.

The individual, or combined, or triple combinations of the above parameters can all be used for the display apparatus to start the specific food page. However, if the query parameter only indicates the food type (cmd), the display apparatus will not start the specific food page, but will display the food tag page instead.

In some embodiments, if the query parameter extracted from the voice command is consistent or same with the food type (cmd), it means that the user wants to view the food information of a specified type, i.e., the display apparatus needs to present the food tag page. Therefore, to facilitate the presentation of the food tag page, the display apparatus can generate a device query command to obtain the target device ID from the server, then generate a food query command carrying the specified type name and target device ID to obtain the food data of the existing foods corresponding to the specified type from the target food storage apparatus. Finally, based on the food data corresponding to the specified type, the display apparatus can generate a food tag page and display it in the user interface. The generation process of the food tag page is based on various implementation steps as described in the aforementioned embodiments.

For example, if the query parameter included in the food query command input from the user via voice only includes the freshness parameter (i.e., the cmd parameter), and all other parameters are empty, such as, "fresh foods in the food storage apparatus," "nearly expired foods in the food storage apparatus," "expired foods in the food storage apparatus", it is considered to start the food tag page.

If the food query command input from the user via voice includes parameters other than the freshness parameter, such as food name or storage compartment parameters, in addition to the freshness parameter, then the specific food page will be launched based on the information. For example, "fresh beef in the food storage apparatus," "fresh chicken in the freezer compartment of the food storage apparatus." In this command, not only does it contain the freshness (fresh) parameter, but it also includes the food name (beef or chicken) parameter and the storage compartment (freezer compartment) parameter, thus, the display apparatus will show the specific food page.

In some embodiments, if the query parameter extracted from the voice command does not match any of the food name (name), food type (cmd), or storage room (room), it indicates that the user does not want to specifically view any type of food information, but wants to check the food information of all existing foods in the food storage apparatus. That is, the display apparatus needs to present the homepage for food information processing. Therefore, to facilitate the presentation of the homepage for food information processing, the display apparatus can generate a device query command to obtain the target device ID from the server, then generate a food query command carrying the target device ID to obtain the food data of all existing foods in the target food storage apparatus.

Finally, based on the food data of all existing foods, the display apparatus can generate a homepage for food information processing and display it in the user interface. The generation process of the homepage for food information processing is based on various implementations as described in the aforementioned embodiments.

Therefore, if the query parameter only indicates the data of the food freshness (food type cmd), the page displayed by the display apparatus will be the food tag page. Therefore, to have the display apparatus present the specific food page, the user's voice must include parameters such as food name and storage compartment, in addition to the freshness parameter, i.e., the freshness parameter cannot be applied independently. And for parameter that solely exists in the voice command, the display of the specific food page is feasible; or parameter that solely indicates the storage compartment can also allow to display the specific food page. If the voice does not include any of the three parameters, the page displayed by the display apparatus will be the homepage for food information processing.

According to the display apparatus provided in embodiments of the disclosure, to view the food information in the target food storage apparatus on the display apparatus via voice, the query parameter can be extracted from voice commands. If the query parameter indicates the food name, the specific food page can be displayed; if the query parameter indicates the food type, the food tag page can be displayed; if the query parameter neither indicates the food name nor the food type, the homepage for food information processing can be displayed. Users can operate the display apparatus to query the food information stored in the food storage apparatus through multiple entry points, or perform advanced queries through voice, and the display apparatus can present various queried food information in a "card". The query information is diverse, allowing users to query and manage the food information in the food storage apparatus in real time and on-site, making food queries more efficient and greatly improving the quality of life for users.

In some embodiments, the method for checking the food information in the food storage apparatus on the display apparatus as described above can also be applied to a smart terminal. The specific implementation process of users operating the smart terminal to check the food information in the food storage apparatus can refer to the content disclosed in any of the exemplary embodiments for the display apparatus, and will not be repeated here.

From the above embodiments, it can be seen that the method for querying the food information stored in the food storage apparatus, and the display apparatus provided in the embodiments of the disclosure allow users to input the food query command when operating the display apparatus, and when the food query command is used to query the food information of existing foods in the target food storage apparatus, the display apparatus can present the homepage for food information processing, displaying the food information of all existing foods in the food storage apparatus; when the food query command is used to query the food information of a specified kind of food in the target food storage apparatus, the display apparatus can present the specific food page, displaying the food information of the specified kind of food in the food storage apparatus; when the food query command is used to query the food information of existing foods corresponding to a specified type in the target food storage apparatus, the display apparatus can presents the food tag page, displaying the food information of existing foods corresponding to the specified type in the food storage apparatus. This method and display apparatus allow users to operate the display apparatus to query the food information stored in the food storage apparatus through multiple ports of entry. The display apparatus can present various queried food information in a "card" manner. The query information is diverse, allowing users to query and manage the food information in the food storage apparatus in real time and on-site, making food queries more efficient and greatly improving the quality of life for users.

In current intelligent food storage apparatus products, after adding the food into the food storage apparatus, food stored in the storage apparatus for a long time may be prone to expiration. Typically, the food storage apparatus provides food expiration alerts for such cases. However, this notification method usually pushes alerts at fixed times and only on the food storage apparatus end. If users do not pay attention to the alerts, they are easily overlooked, resulting in a poor user experience.

Implementing a food alert method based on the existing foods in the food storage apparatus across multiple terminals can enable users to customize the setting of food alert information based on the existing foods in the food storage apparatus on any terminal, achieving interconnection of multiple terminal food information processing, food information, and food alert information. Users can query and manage the food information in the food storage apparatus in real time and on-site, making food queries more efficient. In addition, users can receive food alert information on various terminals, reducing food waste and greatly improving the quality of life for users.

In some embodiments, users can set custom food alert times on display apparatus, so when the system time reaches the custom food alert time, the server can push food alert information to the display apparatus, smart terminal, food storage apparatus, second screen, etc., respectively. All terminals that are bound with the account can follow the custom food alert time set by the user on any terminal and receive the food alert information pushed from the server, enabling users to receive food alert information in real time and on-site through any terminal, reducing food expiration and waste.

In some embodiments, in addition to setting the push time for food alert information, users can also set the content of food alert information, i.e., custom notification rules. Different food alert push types can be determined based on user needs, to determine the types of food alert information.

The food alert push types can be determined based on different push parameters, including but not limited to food shelf life (EXP), food freshness (Fresh), food usage frequency (Rate), food quantity (Count), opening count (OpenCount) of the food storage apparatus, opening time (OpenTime) of the food storage apparatus, food removal time (RemoveTime), user reminder processing status (State), etc. At least one push parameter can be selected to form an alert notification rule, which then determines the corresponding food alert push type.

For example, based on food freshness, an alert notification rule can be formed, and the determined food alert push type is the food status type, such as food expiration alert, nearly expiration food alert, and food freshness alert types. Based on food freshness and food usage frequency, an alert notification rule can be formed, and the determined food alert push type is the recipe type.

Users can customize food alerts, including customizing food alert times and types of alert information, which align with their living habits, thereby improving their quality of life.

In some embodiments, users can set custom food alert times on the terminal side such as display apparatus, and the server can generate food alert information based on the food information of existing foods stored in the food storage apparatus and the food alert push types. When the current system time reaches the custom food alert time, the server can push the corresponding food alert information to each terminal respectively, avoiding users missing alert information, and allowing timely handling of existing foods in the food storage apparatus, such as removing expired foods or consuming nearly expired foods, etc.

Figure 34:
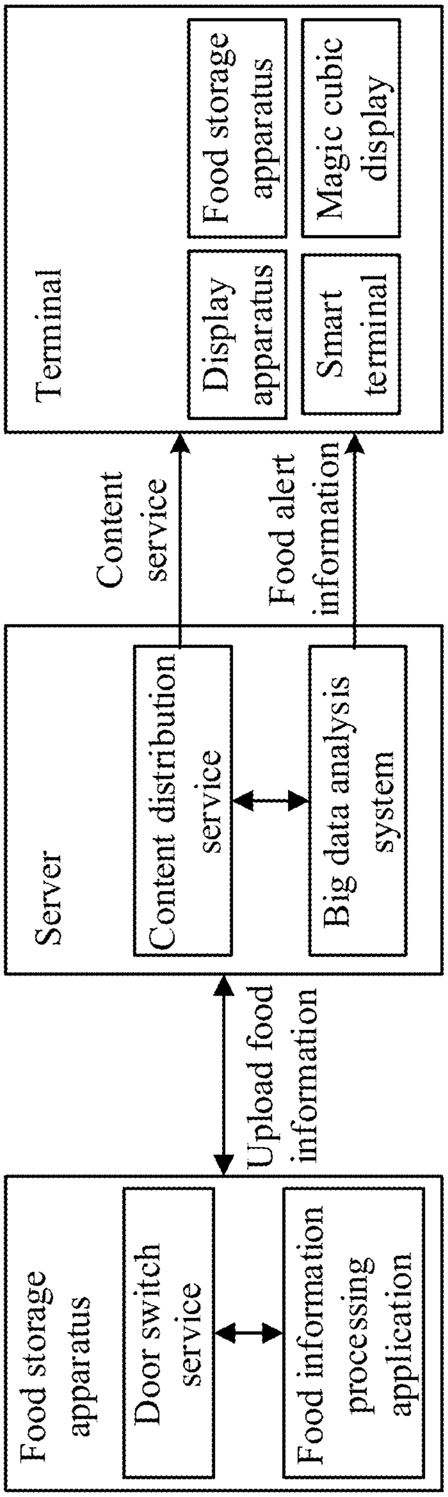
FIG. 34 shows an architecture diagram for food alert according to some embodiments of the disclosure.

FIG. 34 shows an overall architecture of food alerts according to some embodiments. Referring to FIG. 34, to achieve the generation and push of food alert information between multiple terminals and server, the overall architecture of food alerts provided by the disclosure can include food storage apparatuses, servers, and other terminals (display apparatuses, food storage apparatus, smart terminals, second screens, etc.). The food storage apparatus is configured with a door switch service and a food information processing application. The door switch service can be used to detect relevant data of the opening and closing of the food storage apparatus, such as obtaining the number of times the food storage apparatus is opened (OpenCount), the time when the food storage apparatus is opened (OpenTime), and the time when food is taken out of the food storage apparatus (RemoveTime), etc. The food information processing application for the food storage apparatus is used to report to the server the food information with push parameters of existing foods stored in the food storage apparatus.

The server can be configured with a content distribution service and a big data analysis system. The content distribution service can receive food information uploaded by the food storage apparatus with push parameters and send it to the big data analysis system. Meanwhile, the content distribution service can push content services to various terminals according to different terminal types and demands. The big data analysis system can be used to generate different food alert information based on different alert notification rules (food alert push types) and food information. Finally, the big data analysis system can push the determined food alert information to various terminals for display according to the user's custom food alert time.

The food alert method provided in the disclosure allows users to customize food alert times on various terminals and customize alert notification rules. After reaching the custom food alert time, users can receive food alert information on various terminals, allowing users to promptly know the situation of existing foods in the food storage apparatus, reducing food expiration cases and food waste, and providing a good user experience.

Figure 35:
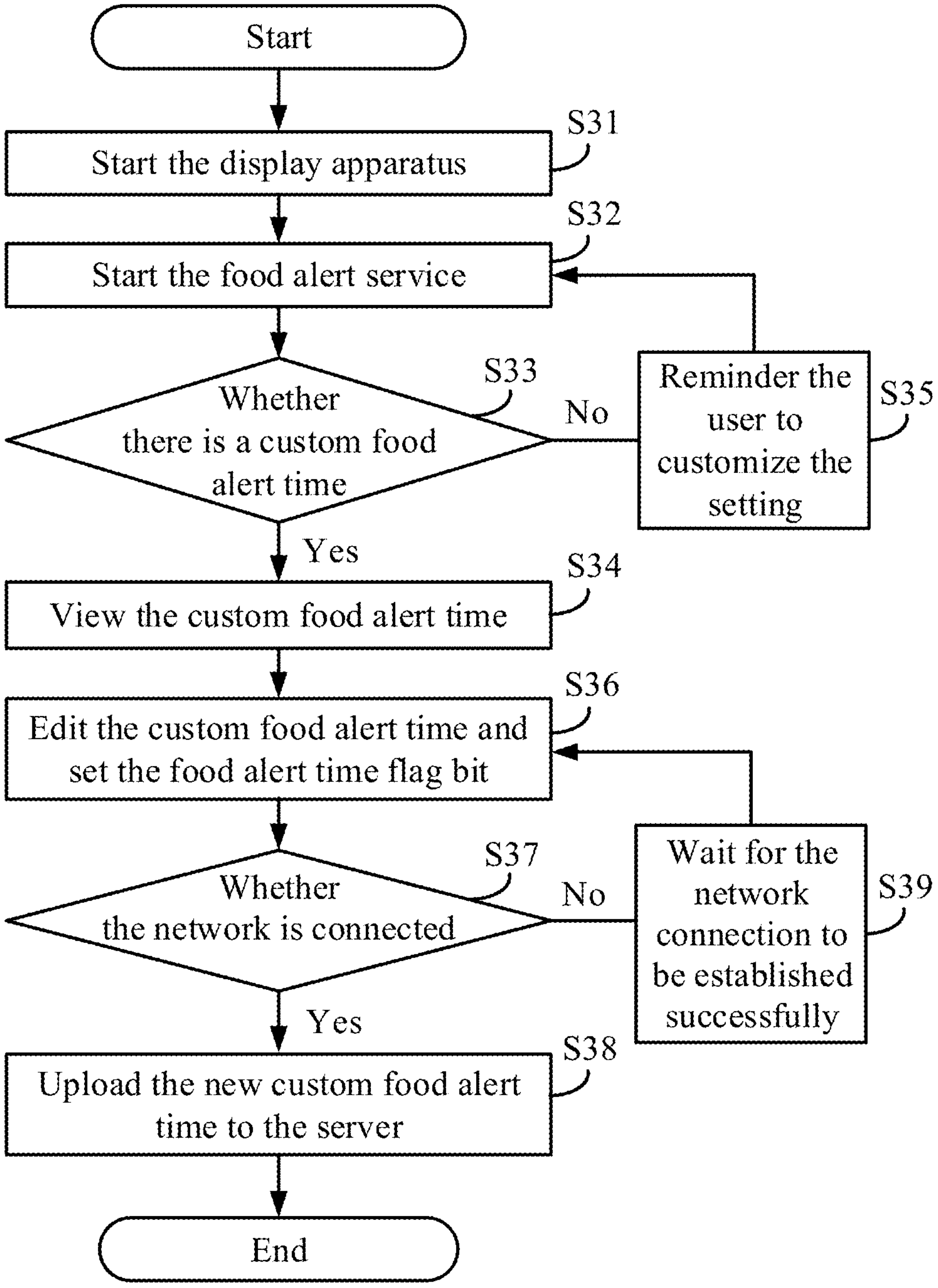
FIG. 35 shows a flow diagram of a method for food alert performed by a display apparatus according to some embodiments of the disclosure.

According to some embodiments, the disclosure provides a method for food alert processing in a display apparatus. FIG. 35 shows a data flow diagram of a method for food alert processing in a display apparatus according to some embodiments. A display apparatus provided in the embodiments of the disclosure can include: a display, configured to present a user interface with a timed alert control; and at least one processor connected with the display. the at least one processor is configured to execute instructions to cause the display apparatus to perform:

in response to a setting command based on a selection of a timed alert control from the user, presenting a timed alert interface in the user interface, where the timed alert interface presents an information adding control for adding a food alert time;

in response to an adding command based on a selection of the information adding control, presenting an interface for adding alert information in the user interface, where the interface for adding alert information presents an alert information input box for setting the food alert time; and getting a custom food alert time input by the user based on the alert information input box and sending it to the server; here, the custom food alert time is used for the server to push food alert information to the display apparatus when reaching the custom food alert time, and the food alert information indicates information generated by the server based on food information in the food storage apparatus.

When the user sets the food alert time for the existing foods in the food storage apparatus on a display apparatus, the timed alert interface is an interface for setting the food alert time. There are two ways to start the timed alert interface, including but not limited to: starting the timed alert interface via the timed alert control on the device homepage of the display apparatus, and starting the timed alert interface by selecting a timed alert control on a reminder interface including a timed alert control on the display apparatus when the display apparatus is started.

Figure 36:
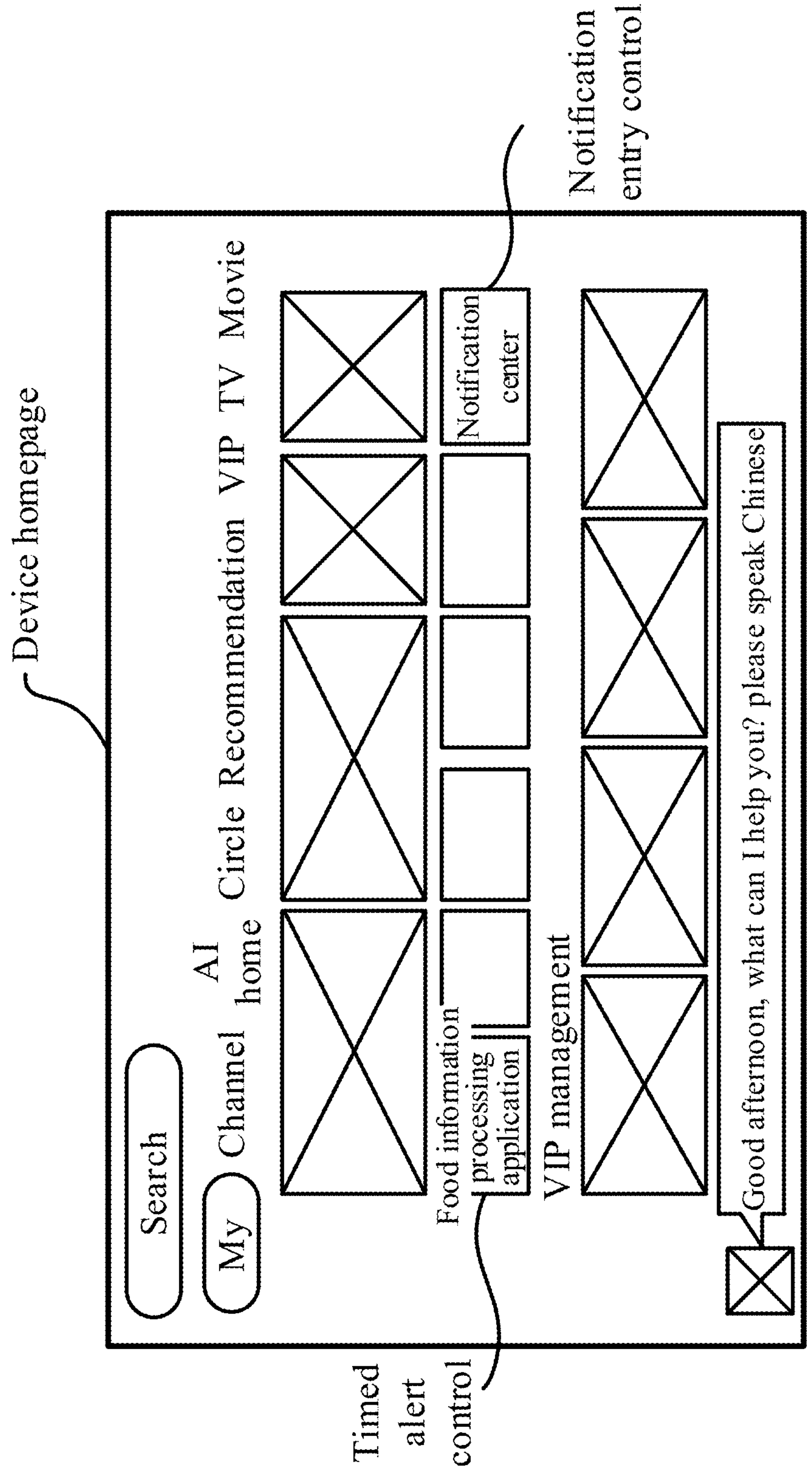
FIG. 36 shows a schematic diagram of a device homepage of an apparatus according to some embodiments of the disclosure.

FIG. 36 shows a schematic diagram of a device homepage according to some embodiments. In some embodiments, when the timed alert interface is started based on the timed alert control on the device homepage of the display apparatus, the device homepage can present the timed alert control, such as the TV-side food information processing application shown in FIG. 36. When the TV-side food information processing application is selected by the user, the timed alert interface can be started and presented on the display to customize the food alert time.

The method of starting the timed alert interface based on the timed alert control on the device homepage can be applied in any scenario where the display apparatus is running. When the display apparatus is running, such as playing video files, displaying live programs, etc., if the user wants to customize the food alert time for the existing foods in the food storage apparatus, the user can operate the display apparatus to return to the device homepage, select the timed alert control in the device homepage, and the timed alert interface can be displayed to realize real-time customization and viewing, editing, and other operations of the food alert time.

In some embodiments, FIG. 35 can be referenced.

S31: based on that the timed alert interface is started while the user starting the display apparatus stage, starting the display apparatus.

S32: starting a food alert service configured in the display apparatus.

S33: the food alert service determines whether there is a custom food alert time, based on different determination results, different reminder interfaces are presented on the display apparatus, facilitating corresponding operations for the user.

Specifically, before responding to the setting command based on the selection of the timed alert control from the user, the at least one processor is further configured to execute instructions to cause the display apparatus to perform:

in response to a startup instruction of the display apparatus, obtaining a food alert time flag bit; where the food alert time flag bit is used to indicate whether there is a custom food alert time set by the user;

based on that the food alert time flag bit is True, presenting a reminder interface including a view control in the user interface; where the view control is used to view the custom food alert time set by the user;

based on that the food alert time flag bit is False, presenting a reminder interface including a timed alert control in the user interface; where the timed alert control is used for adding a food alert time.

When the display apparatus is started, a startup instruction can be generated. After receiving the startup instruction, the TV-side food information processing application can start the food alert service. To facilitate the determination of whether there is a custom food alert time by the food alert service, the food alert time flag bit (mIsCustom) can be obtained. If there is a custom food alert time, the food alert time flag bit is True; if there is no custom food alert time, the food alert time flag bit is False.

S34: if there is a custom food alert time, viewing the custom food alert time.

In some embodiments, when the food alert service obtains the food alert time flag bit as True, it means that the user has set a custom food alert time before. In this case, the display apparatus can automatically enter the food alert process without the need for the user to set the alert time again. Upon reaching the custom food alert time, the display apparatus can receive the food alert information sent from the server for display, and the user can view the relevant information of the set custom food alert time.

To facilitate the user to view the set custom food alert time, a reminder interface including a view control can be presented in the user interface when the food alert time flag bit obtained by the food alert service is True. The view control is used to view the custom food alert time set by the user.

Figure 37:
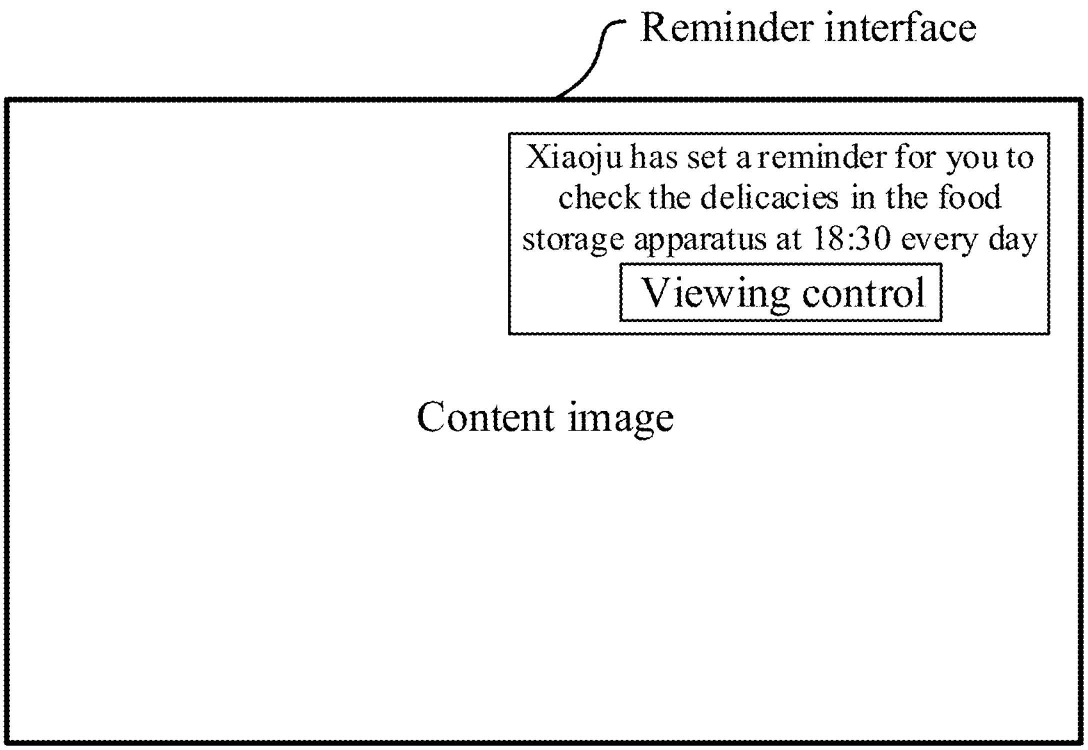
FIG. 37 shows a schematic diagram of a reminder interface with a viewing control according to some embodiments of the disclosure.

FIG. 37 shows a schematic diagram of a reminder interface including a view control according to some embodiments. Referring to FIG. 37, when the startup instruction of the display apparatus is detected, and the food alert time flag bit is True, a reminder interface can be presented on the display, including a view control and alert information. The alert information can be generated based on the custom food alert time set by the user, such as “Xiaoju has set a reminder for you to check the delicacies in the food storage apparatus at 18:30 every day”; the user can select the view control to generate the timed alert interface in the current user interface, and the timed alert interface can display at least one alert item. The alert item can be generated based on the custom food alert time set by the user, and the user can view each custom food alert time set by the user based on each alert item in the timed alert interface.

Each alert item is arranged from early to late according to the corresponding custom food alert time. A switch button is further set on one side of each alert item, which is used to determine whether to receive food alert information at the corresponding custom food alert time pushed from the server. If the switch of the first alert item is turned off, the display apparatus does not receive food alert information pushed from the server at 15:30, that is, the server does not need to push food alert information to the display apparatus and other terminals at 15:30. If the switch of the first alert item is turned on, the food alert information is pushed normally.

S35: if there is no custom food alert time, reminding the user to customize the settings.

In some embodiments, when the display apparatus is started, and the food alert time flag bit obtained by the food alert service is False, it means that the user has not set a custom food alert time before. In this case, it is necessary to remind the user to set the food alert time. Therefore, when the display apparatus is started, a reminder interface including the timed alert control and a prompt message is presented in the user interface. The prompt message is used to prompt the user whether to set the food alert time for the existing foods in the food storage apparatus, such as “You have not set the food alert time yet, do you want to set it now”. The timed alert control is used to add the food alert time, and the user can select the timed alert control through a remote control to generate the timed alert interface, and can customize the addition of the food alert time based on the timed alert interface.

When the user needs to add food alert information based on the existing foods in the food storage apparatus using the display apparatus, the timed alert interface can be displayed in the user interface of the display apparatus, and the timed alert interface can present an information adding control for adding the food alert time.

In some embodiments, when the display apparatus is started, whether the reminder interface displayed in the display apparatus can include a view control or a timed alert control, the reminder interface is only displayed for a preset duration, such as 1 minute. If the user does not perform corresponding operations based on a certain reminder interface within 1 minute, the reminder interface is canceled to avoid affecting the user’s normal use of the display apparatus and blocking the normal picture.

When the user operates the display apparatus to set the food alert time, the information adding control in the timed alert interface can be selected through the remote control, the interface for adding alert information can be generated and displayed on the display of the display apparatus. The interface for adding alert information can present an alert information input box, including an alert time input box and a notification frequency input box. The alert time input box is used to enter a time value, and the notification frequency input box is used to enter the number of alert repetitions, such as daily, weekly, any day within a week, or turn off repetition. Therefore, the custom food alert time can include the alert time and the notification frequency.

If the time input from the user in the alert time input box is 16:30 and the frequency input in the notification frequency input box is daily, it means that the server needs to push the determined food alert information to various terminals at 16:30 every day. To facilitate the user to start or stop the food alert function in real time, the food alert function switch can be displayed in the interface for adding alert information.

After completing the setting of time and frequency based on the interface for adding alert information, the user can click the save button in the interface for adding alert information, such as the “Save alert” button, to obtain the corresponding custom food alert time. In this case, the user interface displayed on the display apparatus switches back from the interface for adding alert information to the timed alert interface.

Each time the user inputs a custom food alert time on the display apparatus, an alert item can be generated based on the custom food alert time, which can be displayed in the timed alert interface of the display apparatus. The display order of each alert item in the timed alert interface is arranged from early to late according to the time of each custom food alert time. A switch button is set on one side of each alert item to quickly start or stop the reminder process corresponding to the custom food alert time.

After the user inputs the custom food alert time on the interface for adding alert information on the display apparatus, the food alert service on the display apparatus can send the custom food alert time to the server. Upon receiving the custom food alert time sent from the display apparatus, the server can, when the system time reaches the custom food alert time, send the food alert information calculated based on the food information of the existing food in the food storage apparatus to the display apparatus. If there are other terminals logged into the same account as both the display apparatus and the food storage apparatus, the food alert information will further be pushed to those other terminals for display. The process of generating food alert information on the server and pushing food alert information to other terminals based on the custom food alert time can refer to the content in the subsequent embodiments at the server side, which is not described here.

When the display apparatus uploads the custom food alert time to the server, in addition to sending the custom food alert time to the server, the at least one processor is further configured to execute instructions to cause the display apparatus to perform:

upon receiving the custom food alert time generated based on the alert information input box from the user, setting the food alert time flag bit to True, and check whether the local network is connected; where the food alert time flag bit is used to indicate whether a custom food alert time set by the user exists;

based on that the local network is connected, sending the custom food alert time to the server.

After the user operates the display apparatus to generate a custom food alert time, in order to determine whether there is a custom food alert time on the device itself, the food alert time flag bit on the display apparatus needs to be set to True, so that when the display apparatus is restarted later, the display content of the reminder interface that pops up in the user interface after the display apparatus is started can be determined based on the result of detecting the food alert time flag bit. The specific implementation process of displaying different content on the reminder interface can refer to the aforementioned embodiments.

After setting the food alert time flag bit, it is necessary to further determine whether the network connection of the local device is normal to ensure the transmission of information. Therefore, whether the local network is connected is checked. If the network is not connected, waiting for the network connection to be established successfully; if the network is connected, the custom food alert time can be uploaded to the server for the purpose of synchronizing the food alert information pushed by the server at the custom food alert time among various terminals, and for viewing the custom food alert time set on the display apparatus side on other terminals.

S36: editing the custom food alert time and setting the food alert time flag bit.

In some embodiments, users can actively add custom food alert times based on the display apparatus, edit and modify previously added custom food alert times, and the locally stored custom food alert times in the display apparatus can be updated based on the custom food alert times added by other terminals obtained from the server, in order to update the display content of various alert items in the timed alert interface on the display apparatus. The execution of the various custom reminder processes mentioned above is not in any particular order and can be executed based on actual scenarios.

In some embodiments, for a custom reminder process that users need to edit and modify the previously added custom food alert times stored locally on the display apparatus, this process can be applied in a case that the user starts the display apparatus, the display apparatus displays a reminder interface including a viewing control, and the user selects the viewing control to present a timed alert interface on the display apparatus, and can also be applied in a case that the TV-side food information processing application is started at any time, and a timed alert interface is displayed.

When the editing and modification process of the custom reminder is applied to a scenario where the display apparatus is started and the reminder interface including the viewing control is presented on the display apparatus, the at least one processor is further configured to execute instructions to cause the display apparatus to perform:

in response to a command for checking a view control, presenting a timed alert interface including at least one alert item in the user interface, where the alert item is generated based on the custom food alert time set by the user;

in response to a selection on a target alert item in the timed alert interface, presenting an interface for editing alert information in the user interface, where the interface for editing alert information presents an alert information editing box generated based on a target custom food alert time;

obtaining a new custom food alert time generated based on the alert information editing box, updating display information of the target alert item in the timed alert interface based on the new custom food alert time, and sending the new custom food alert time to the server.

When the display apparatus is started, if the food alert time flag bit is detected as True, a reminder interface including the viewing control can be presented on the display apparatus. The user can select the viewing control, and a timed alert interface can be generated in the current user interface.

When the user needs to edit and modify an existing custom food alert time, the user can select any alert item in the timed alert interface, and an interface for editing alert information can be generated, and an alert information editing box generated based on the target custom food alert time can be shown in the interface for editing alert information. The alert information editing box in the interface for editing alert information can include an alert time editing box and a notification frequency editing box. The alert time editing box can be used to edit and modify the time value, and the notification frequency editing box can be used to edit and modify the number of alert repetitions.

The user can modify the above values based on the alert time editing box and the notification frequency editing box, click the save modification button in the interface for editing alert information, and obtain the corresponding new custom food alert time. The user interface can switch back from the interface for editing alert information to the timed alert interface, and update the display information of the target alert item in the timed alert interface based on the new custom food alert time.

S37: checking whether the local network is connected.

S38: based on that the local network is connected, uploading the new custom food alert time to the server.

S39: based on that the local network is not connected, waiting for the network connection to be established successfully.

The modified new custom food alert time can be sent to the server so that other terminals can update their own stored custom food alerts, and the server can push food alert information to various terminals based on the new custom food alert time. The implementation process of the display apparatus uploading the new custom food alert time to the server can refer to the aforementioned embodiments.

In some embodiments, when the editing and modification process of the custom alert is applied to the scene of starting the TV-side food information processing application at any time and presenting the timed alert interface, the implementation process of the user operating the display apparatus to modify any custom food alert time can refer to the aforementioned embodiments.

In some embodiments, while executing the custom reminder process of updating the locally stored custom food alert time in the display apparatus based on the custom food alert time added by other terminals obtained from the server, and updating the display content of various alert items in the timed alert interface on the display apparatus, this process can be applied in the case that the user starts the display apparatus, the display apparatus presents a reminder interface including the viewing control, and the user selects the viewing control to present a timed alert interface on the display apparatus, and can also be applied in the case that the TV-side food information processing application is started at any time and presents a timed alert interface.

Figure 38:
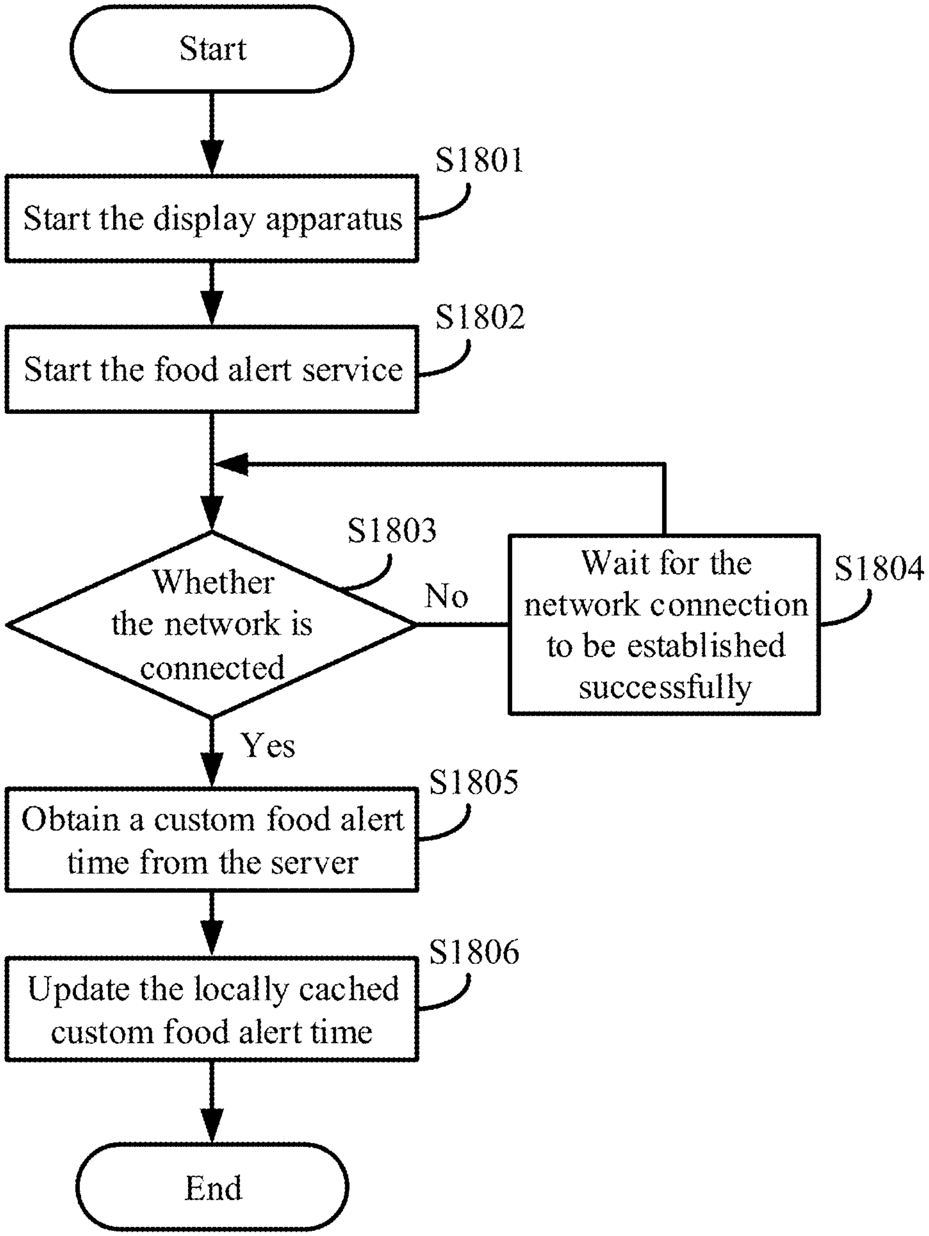
FIG. 38 shows another flow diagram of a method for food alert in a display apparatus according to some embodiments of the disclosure.

FIG. 38 shows another data flow diagram of a method for food alert processing in a display apparatus according to some embodiments, which will be discussed below.

S1801: updating the locally stored custom alert, starting the display apparatus.

S1802: starting a food alert service configured internally in the display apparatus. When the process of updating the locally cached custom reminder is applied to a scenario of starting the display apparatus and presenting a reminder interface including the viewing control, selecting the viewing control to display the timed alert interface, the at least one processor is further configured to execute instructions to cause the display apparatus to perform:

in response to a command for checking the view control, based on that the food alert time flag bit is True and the local network is connected, obtaining a locally stored custom food alert time and a server-side stored custom food alert time;

based on that a timestamp corresponding to the locally stored custom food alert time is earlier than a timestamp corresponding to the server-side stored custom food alert time, generating an alert item based on the server-side stored custom food alert time and displaying the alert item in the timed alert interface;

based on that the timestamp corresponding to the locally stored custom food alert time is later than the timestamp corresponding to the server-side stored custom food alert time, generating an alert item based on the locally stored custom food alert time and displaying the alert item in the timed alert interface.

The timing of updating the locally cached custom food alert time on the display apparatus can be determined by the moment when a new custom food alert time is generated on other terminals, and the timing of local updating can be updated in the background. In order to present the latest custom food alert time to the user, when the display apparatus is operated to present the timed alert interface, the corresponding alert items can be generated based on the latest custom food alert time and displayed sequentially.

Therefore, during the startup phase of the display apparatus, when a reminder interface including the viewing control is presented on the display apparatus, and the user can select the viewing control to present the timed alert interface, the food alert service can detect the food alert time flag bit based on the command for checking the view control. It can be determined that there is a custom food alert time locally when the food alert time flag bit is True.

In order to determine whether there is a custom food alert time on the other terminal side, the display apparatus needs to establish communication connection with the server.

S1803: checking whether the local network is connected to ensure normal communication.

S1804: based on that the network is not connected, waiting for the network connection to be established successfully.

S1805: based on that the network is connected, obtaining a custom food alert time uploaded by another terminal from the server.

When determining whether the locally stored custom food alert time on the display apparatus needs to be updated, it is necessary to determine which one is the latest stored time between the locally stored custom food alert time and the server-side stored custom food alert time. Therefore, the timestamp corresponding to the locally stored custom food alert time and the timestamp corresponding to the server-side stored custom food alert time can be obtained.

S1806: updating the locally cached custom food alert time.

If the timestamp corresponding to the locally stored custom food alert time is earlier than the timestamp corresponding to the server-side stored custom food alert time, indicating that the server-side stored custom food alert time is newer, the locally cached custom food alert time needs to be updated based on the server-side stored custom food alert time. In this case, when presenting the latest custom food alert time in the timed alert interface, an alert item can be generated based on the server-side stored custom food alert time and displayed in the timed alert interface.

If the timestamp corresponding to the locally stored custom food alert time is later than the timestamp corresponding to the server-side stored custom food alert time, indicating that the custom food alert time stored on the display apparatus side is newer, there is no need to update the locally cached custom food alert time based on the server-side stored custom food alert time, but just the corresponding interface needs to be presented based on the locally cached information. In this case, when presenting the latest custom food alert time in the timed alert interface, an alert item can be generated based on the locally stored custom food alert time and displayed in the timed alert interface.

In some embodiments, when updating the locally cached custom reminder process is applied to a scenario of starting the TV-side food information processing application at any time and presenting the timed alert interface, the implementation process of updating the local cache can refer to the relevant content mentioned above (excluding the process of selecting the viewing control).

The disclosure allows users to operate display apparatus to set custom food alert times based on existing foods stored on the food storage apparatus. Additionally, users can edit the added custom food alert times to modify alert times and frequencies, or delete reminders. While editing alerts, users can quickly enable and disable the timing food alert function. Once users set custom food alert times on the display apparatus, the server can synchronously push food alert information to the display apparatus and other terminals at the custom food alert times.

In some embodiments, in addition to pushing food alert information to display apparatus and other terminals based on user-set custom food alert times, the server can also allow users to set the type of food alert information so that the pushed food alert information can meet the user's application needs.

To facilitate users in adding a custom food alert time and synchronously adding a type of food alert information, the interface for adding alert information may simultaneously display an alert information input box and an alert push type selection box, making it convenient for users to add quickly.

When users operate display apparatus to set both the alert time and the alert information type, the at least one processor is further configured to execute instructions to cause the display apparatus to perform: while generating a custom food alert time based on an alert information input box in the interface for adding alert information, displaying an alert push type selection box in the interface for adding alert information, showing several options; obtaining a specified food alert push type input from the user based on the push type selection box, and sending the specified food alert push type along with the corresponding custom food alert time to the server, where the specified food alert push type can be used to indicate the type of food alert information displayed on the display apparatus.

Figure 39:
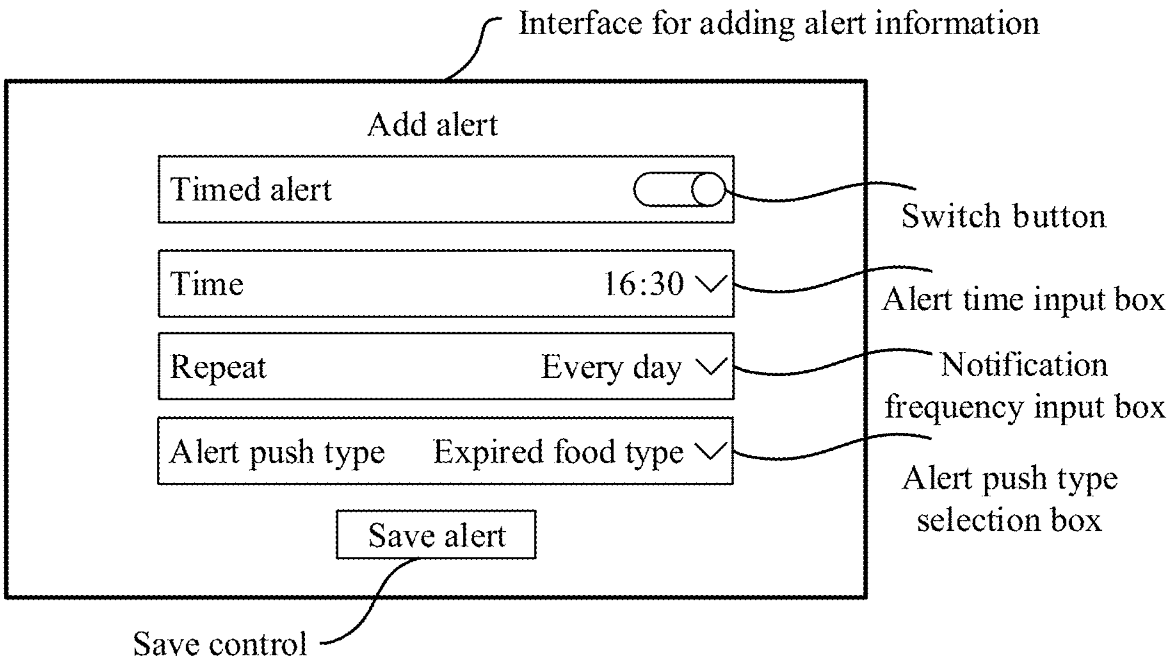
FIG. 39 shows a schematic diagram of an interface for adding alert information with an alert push selection box according to some embodiments of the disclosure.

FIG. 39 shows a schematic diagram of an interface for adding alert information with an alert push type selection box according to some embodiments. Referring to FIG. 39, while the interface for adding alert information is displayed on the user interface of the display apparatus based on an operation on the display apparatus from the user, in order to facilitate users to synchronously add the custom food alert time and the type of food alert information, the interface for adding alert information may simultaneously display the alert information input box and the alert push type selection box. The method for launching the interface for adding alert information and generating a custom food alert time based on the alert information input box can refer to any method disclosed in the previous embodiments, as well as the content of the implementation process for generating a custom food alert time based on the alert information input box.

When setting the type of food alert information based on the alert push type selection box, several food alert push types can be displayed in the alert push type selection box, with each food alert push type corresponding to a type of food alert information. food alert push types can include commonly used food status types (expired, nearly expired, fresh types) and recipe types, or they can be user-defined types.

After the user sets the specified food alert push type based on the alert push type selection box, the display apparatus can send the user-set specified food alert push type and the corresponding custom food alert time to the server, enabling the server to push food alert information corresponding to the specified food alert push type to the display apparatus and other terminals at the custom food alert time, allowing the display apparatus to display food alert information corresponding to the specified food alert push type.

The user performs the settings of the custom food alert time and food alert push type on the terminal side such as the display apparatus, while the server can generate food alert information based on the food information and the food alert push type stored on the food storage apparatus, and push the food alert information to various terminals when the current system time reaches the custom food alert time, not letting users missing alert information and enabling timely handling of existing foods in the food storage apparatus, such as removing expired foods or taking out the nearly expired foods for eat.

In some embodiments, when the display apparatus or other terminals generate custom food alert times and/or specified food alert push types added by users, the added information needs to be synchronized and uploaded to the server for the server to execute corresponding food alert information push. After the display apparatus receives the food alert information sent from the server, it can display the food alert information or food alert information corresponding to the specified food alert push type on the user interface of the display apparatus.

In view of this, while displaying food alert information on the display apparatus side, the at least one processor is further configured to execute instructions cause the display apparatus to perform:

- receiving food alert information of a specified food alert push type send from the server based on a custom food alert time;
- generating a reminder pop-up window with a reminder details viewing control based on the food alert information of the specified food alert push type, and displaying it on the user interface;
- in response to a command for checking the reminder details viewing control, and displaying a food alert details interface on the user interface, which displays detailed information of the food alert information corresponding to the specified food alert push type.

When the server receives the custom food alert time sent from the display apparatus or other terminals, and the system time reaches the custom food alert time, it can generate preset food alert information based on the food information of existing foods in the food storage apparatus through calculation and analysis, and send the food alert information to the display apparatus or other terminals. The preset food alert push types can be default push types.

After receiving the custom food alert time and specified food alert push types sent from the display apparatus or other terminals, when the system time reaches the custom food alert time, the server can generate food alert information of the specified food alert push type based on the food information of existing foods in the food storage apparatus through calculation and analysis, and send the food alert information of the specified food alert push type to the display apparatus or other terminals.

After the display apparatus receives the food alert information sent from the server, it can generate a reminder pop-up window based on the food alert information. Upon reaching the custom food alert time, regardless of the current display on the display apparatus, the reminder pop-up window will be displayed on the current screen. The reminder pop-up window can display the reminder content and the reminder details viewing control. The reminder content can be generated based on the food alert information corresponding to the specified food alert push type, and the reminder details viewing control can be used to view the complete food alert information. When the food alert information is of the food status type, specifically the food alert information of expired foods, only a portion of food names are listed in the reminder content, such as "Your [Food A], [Food B], [Food C] have expired".

To view all food alert information, the user can select the reminder details viewing control in the reminder pop-up window, so that the food alert details interface can be shown on the user interface, which displays detailed information of the food alert information corresponding to the specified food alert push type.

The food alert details interface can be displayed as a food tag page, which respectively displays the food information of existing foods in the food storage apparatus based on the expired food tag, nearly expired food tag, and fresh food tag.

In some embodiments, if users set multiple custom food alert times on the display apparatus, the display apparatus may sequentially receive several pieces of food alert information within the same day. Food alert information is typically displayed only in the form of a reminder pop-up window for a preset duration (such as 1 minute), and the pop-up window disappears after the preset duration. To enable the user to view food alert information pushed by the server at other times, the display apparatus can store all received food alert information in the notification center.

In view of this, when the user view various food alert information through the notification center, the at least one processor is further configured to execute instructions to cause the display apparatus to perform:

in response to a viewing command by a selection on a notification entry control in the user interface, obtaining food alert information sent from the server at each custom food alert time;

sorting the food alert information according to the corresponding custom food alert times, and generating a notification reminder interface displayed on the user interface.

The notification entry control can be displayed in the device homepage, such as the "Notification Center" shown in FIG. 38. Users can select the notification entry control to generate the viewing command, and food alert information sent from the server to the display apparatus at each custom food alert time can be obtained locally.

The food alert information is sorted from late to early based on the corresponding custom food alert times, with the most recently received food alert information displayed first and the earliest received food alert information displayed last. Based on the sorted food alert information, a notification reminder interface can be generated and displayed on the user interface.

The notification reminder interface can display various food alert information pushed by the server. Each piece of food alert information can be displayed in the form of a notification bar, showing the custom food alert time and notification content. The notification content can be generated based on the food alert push type and food information. The user can view all missed food alert information based on the various notification bars displayed in the notification reminder interface, ensuring that users do not miss any alert information and allowing users to handle food alert information at any time for a good user experience.

In some embodiments, for some special food alert information, if the user is not in front of the display apparatus when the food alert information is displayed, the user cannot view the food alert information, resulting in missed reminders. However, such food alert information requires the user to handle corresponding food promptly. Therefore, the user can set such food alert information to be pushed multiple times within the same day to remind the user to handle corresponding food stored in the food storage apparatus at any time.

If the user handles the corresponding food immediately after receiving a particular piece of food alert information pushed by the server, subsequent food alert information for the same food may not be repeatedly pushed to avoid wasting resources.

In view of this, to avoid repeatedly pushing the same food alert information, the at least one processor is further configured to execute instructions to cause the display apparatus to perform: upon viewing the target food alert information on the display apparatus, generating a notification indicating that the target food alert information has been viewed, and sending the notification indicating that the target food alert information has been viewed to the server. The notification indicating that the target food alert information has been viewed is used to indicate to the server to change the reminder processing status of the target food alert information to a viewed status, indicating that the server will not push the viewed target food alert information to the display apparatus within a preset duration. The implementation process of the server changing the reminder processing status after users view a notification can refer to the subsequent embodiments.

The display apparatus according to the embodiments of the disclosure enables the user to set the custom food alert time. The user can select a timed alert control to display a timed alert interface including an information addition control, and select the information addition control to display an interface for adding alert information including an alert information input box. The user can set the custom food alert time in the alert information input box and the custom food alert time can be sent to the server, allowing the server to push food alert information to the display apparatus when the custom food alert time is reached. The server-pushed food alert information can be displayed on the display apparatus, and food alert information can be received at any time, ensuring that users do not miss food alert information and allowing timely handling of foods in the food storage apparatus, thereby reducing food expiration and waste and providing a good user experience.

In some embodiments, when performing custom food alerts, the user can set food alert times and food alert rules on the display apparatus side, while the server can generate food alert information on the server side. The server can use its configured content distribution service and big data analysis system to generate food alert information based on food alert rules and the food information of existing foods in the food storage apparatus, and push the food alert information to the display apparatus and other terminals at the user-set food alert time, allowing the user to view food alert information based on existing foods in the food storage apparatus pushed by the server in real-time and on-site through different terminals, enabling the user to handle foods in the food storage apparatus in a timely manner, thereby avoiding other food expiration or waste.

According to some embodiments, a method for food alert processing in a server is provided. A server according to embodiments of the disclosure, can include: at least one processor, when executing the method for food alert processing, configured to execute instructions to cause the apparatus to perform:

receiving a custom food alert time sent from a display apparatus and food information with a push parameter sent from a food storage apparatus, where the custom food alert time indicates a time set by the user on the display apparatus for displaying food alert information, the food information indicates information of all existing foods in the food storage apparatus, and the push parameter is used to determine the content of the food alert information;

filtering a target push parameter according to a preset food alert push type, generating food alert information based on the target push parameter and food information; and when the custom food alert time is reached, sending the food alert information to the display apparatus according to the custom food alert time, to enable the display apparatus to display the food alert information.

When the server implements the alert push rules, it needs to depend on data from the display apparatus and the food storage apparatus, for example, determining the push time based on the custom food alert time set from the user on the display apparatus, and generating food alert information based on the food information of all existing foods in the food storage apparatus.

Therefore, each time a user sets a custom food alert time on the display apparatus, it is uploaded to the server. Once the server receives the custom food alert time sent from the display apparatus, it can determine the time for executing the push action. The process of generating the custom food alert time based on the display apparatus can refer to the above the display apparatus in the embodiments mentioned above.

To push the status of foods in the food storage apparatus to the display apparatus, the server can obtain food information of all existing foods stored in the food storage apparatus, and generate food alert information based on the food information. Existing foods indicate the foods currently stored in the food storage apparatus, excluding those that have been stored and removed.

To enhance the multi-dimensional features of the server's alert push rules, while generating food alert information based on the food information of existing foods in the food storage apparatus, different types of food alert information can be generated based on different dimensions. This enables the server to push diverse food alert information to users so that they can understand the status of different foods stored in the food storage apparatus.

Therefore, when the food storage apparatus uploads food information to the server, the food information can include the push parameter. The push parameter is used to determine various dimensions of the server's alert push rules and further to determine different food alert push types of food alert information, as well as the content corresponding to the different food alert push types. The push parameter can be selected from a data item in the food information. The food information can include multiple data items, and data items suitable for classification and analysis are selected as push parameters in the food information.

The food alert push types can be determined based on different push parameters. The push parameters can include but not limited to food expiration date (EXP), food freshness (Fresh), food usage frequency (Rate), food quantity (Count), opening count (OpenCount) of the food storage apparatus, opening time (OpenTime) of the food storage apparatus, food removal time (RemoveTime), user reminder processing status (State), etc. At least one push parameter can be selected to form an alert notification rule, thereby determining the corresponding food alert push type.

For example, based on food freshness, an alert notification rule can be formed, and the determined food alert push type is the food status type, such as food expiration alert, nearly expiration food alert, and food freshness reminder types. Based on food freshness and food usage frequency, an alert notification rule can be formed, and the determined food alert push type is the recipe type.

The food information uploaded from the food storage apparatus can include push parameter groups, and different combinations of push parameters can result in different types of food alert information. Therefore, to facilitate the generation of a certain type of food alert information, the target push parameter can be selected based on the preset food alert push type from multiple different push parameters. The target push parameter can be at least one parameter in the push parameter group.

The present food alert push type can be a default push type configured in the server, that is, when the user does not custom the push type, the server filters the target push parameter based on default push type to generate the food alert information based on the food information in the food storage apparatus.

In some embodiments, based on different food alert push requirements, the food information of the foods should be analyzed and calculated based on different push parameters to get food alert information meeting the food alert push requirements. Therefore, different weights can be configured for different push parameters, with the push parameter that meets the food alert push requirement having a higher weight and the push parameter that does not meet the food alert push requirement having a lower weight.

While the server selects the target push parameter based on the preset food alert push type, different weights can be configured for the various push parameters. The target push parameter can be configured with a higher weight, and other push parameters not selected can be configured with a lower weight. The food information can be calculated and analyzed based on the target push parameter with the higher weight to obtain the food alert information.

Therefore, the at least one processor is configured to execute instructions to cause the server to perform:

based on that the preset food alert push type indicates one filtering dimension, determining a push parameter corresponding to the filtering dimension as the target push parameter, and configuring the target push parameter with a weight of 1; and based on that the preset food alert push type indicates multiple filtering dimensions, determining a push parameter corresponding to each filtering dimension as the target push parameter, and configuring each target push parameter with a weight sequentially, where a sum of the weights for all the target push parameters is 1.

The preset food alert push type can indicate different food alert push rules, so the push dimensions can be different, and thus, the push parameters used can be different. If only one push parameter is used, there is one push dimension, such as expired food; if two push parameters are used, there are two push dimensions, such as foods that are nearly expired and have a usage frequency. Therefore, based on the preset food alert push types, the push dimension(s) can be determined, and the push dimension(s) can be used as the filtering dimension for push parameters, thereby determining the corresponding target push parameter.

In some embodiments, for the food alert push requirement indicated based on the preset food alert push type, only one push dimension is required. Thus, there is one user's filtering dimension for push parameters, so the push dimension corresponding to the selected push parameter for the user is considered as the target push parameter. For example, if the preset food alert push type is for expired food, the push dimension is expiration, and thus, the filtering dimension is expiration. The push parameter selected by the user for the expiration dimension is food freshness, so food freshness is considered as the target push parameter.

Similarly, if the preset food alert push type is for foods with high recent usage frequency, the push dimension is usage frequency, and thus, the filtering dimension is usage frequency. The push parameter selected by the user for the usage frequency dimension is food usage frequency, so food usage frequency is considered as the target push parameter.

After determining the target push parameter, for subsequent analysis and calculation based on the target push parameter of the food information of existing foods in the food storage apparatus, weights need to be assigned to the target push parameter. Since there is only one target push parameter, the weight of this target push parameter is 1. Subsequently, the server only needs to perform analysis and calculation on the existing foods of the food storage apparatus based on the target push parameter with the highest weight to generate food alert information.

In some embodiments, for food alert push requirements indicated based on preset food alert push types, multiple push dimensions are required, so there are multiple user's filtering dimensions for push parameters, and thus, all multiple push parameters corresponding to the multiple push dimensions are considered as target push parameters. For example, if the preset food alert push type is to push a part of expired foods, the push dimensions indicate "a part" and "near expiration", meaning the filtering dimensions are quantity dimension and near expiration dimension. The push parameter selected by the user for the quantity dimension is food quantity, and for the near expiration dimension is food freshness, thus, both food quantity and food freshness are considered as target push parameters.

After determining the target push parameters, weights need to be assigned to each target push parameter for subsequent analysis and calculation based on the target push parameters of the food information of existing foods in the food storage apparatus. Since there are two target push parameters, different weights are assigned to each target push parameter. When configuring the weights, priority is given based on the priority of different target push parameters. Since food freshness has the highest priority, it is assigned a higher weight, while food quantity has a lower priority, so it is assigned a lower weight. For example, food freshness is assigned a weight of 0.8 and food quantity is assigned a weight of 0.2.

The priority indicates an importance of corresponding target push parameter relative to preset food alert push type. Under the "a part of nearly expired food" type, it can be analyzed that the near expiration of foods is the most important filtering dimension for the existing foods in the food storage apparatus, followed by food quantity. Therefore, the weight of food freshness should be greater than the weight of food quantity.

Since the server only needs to perform analysis and calculation on the existing foods in the food storage apparatus based on the target push parameter with the highest weight to generate food alert information, the weights of the two target push parameters sum up to 1, and the weights of other unused push parameters are 0. Different weights for push parameters can correspond to different types of food push alert information, and the higher the weight, the higher the reminder priority, with a total weight of 1. Under different food alert push types, the weights configured for the same push parameter can be adjusted based on the current corresponding food alert push type.

In some embodiments, after filtering the target push parameters required for subsequent analysis and calculation, analysis and calculation of the food information of existing foods in the food storage apparatus can be performed based on the target push parameters to obtain food alert information to be pushed to the display apparatus. Therefore, the at least one processor is further configured to execute instructions to cause the server to perform:

obtaining a weight of each target push parameter;

based on a sorting result for each weight from largest to smallest, filtering a specified kind of food corresponding to the target push parameters;

generating food alert information based on the food information of the specified kind of food and a reminder type identifier corresponding to the target push parameters; where the reminder type identifier is used to indicate the food alert push type.

When performing analysis and calculation based on the target push parameters of the food information of existing foods in the food storage apparatus to obtain food alert information matching a certain food alert push type, the weight of the target push parameter(s) needs to be obtained first. If there are multiple target push parameters, the one with the highest priority can be determined based on different weights for analysis and calculation.

The weights of the respective target push parameters are sorted from largest to smallest, and based on the sorting result, the food information of all existing foods in the food storage apparatus is analyzed and calculated to filter the specified kind of food corresponding to the target push parameters. The specified kind of food is considered as the food matching the food alert push type.

The reminder type identifier corresponding to the target push parameters can be obtained, which is used to indicate the food alert push type. Finally, based on the food information of the filtered specified kind of food and the reminder type identifier, food alert information can be generated. The food alert information is used to show the status of a certain existing kind of food in the food storage apparatus on the display apparatus and other terminals, enabling users to understand the status of existing foods in the food storage apparatus through different terminals, providing a good user experience.

In some embodiments, when the filtering dimension indicates one type, the at least one processor is further configured to execute instructions to cause the server to perform:

based on that the filtering dimension indicated by the preset food alert push type is the food status dimension, determining the target push parameter to be food freshness with a weight of 1;

based on that the food freshness is within a first numerical range, the corresponding food is filtered as expired food, and based on the food information and the food expiration alert type identifier of the expired food, generating food alert information indicating that the food is expired;

based on that the food freshness is within a second numerical range, the corresponding food is filtered out as nearly expired food, and based on the food information and the food near expiration alert type identifier of the nearly expired food, generating food alert information indicating that the food is nearly expired;

based on that the food freshness is within a third numerical range, the corresponding food is filtered out as fresh food, and based on the food information and the food fresh reminder type identifier of the fresh food, generating food alert information indicating that the food is fresh.

When one filtering dimension is indicated by the food alert push type, and the filtering dimension is the food status dimension, the target push parameter can be determined as food freshness with a weight of 1, meaning that food freshness parameter is the only parameter for subsequent calculation of food alert information.

Food freshness refers to the remaining days of the food approaching the expiration date. The calculation of food freshness is as follows: Food freshness time (freshTime) =shelf life (expTime)−food adding time (addTime); food freshness (%)=Food freshness time (freshTime)/shelf life (expTime).

When the freshness time is converted into a progress bar for display, if the progress bar is fully filled with 1 (100%), then the food freshness (%)=freshTime/expTime falls within the interval of 66.7%-100%, and the corresponding progress bar is filled between [⅔, 1] for display, meaning that the food freshness indicates that the food is fresh. If the food freshness (%)=freshTime/expTime falls within the interval of 33.3%-66.7%, the corresponding progress bar is filled between [⅓, ⅔] for display, meaning that the food freshness indicates that the food is relatively fresh. If the food freshness (%)=freshTime/expTime falls within the interval of 0%-33.3%, the corresponding progress bar is filled with [0, ⅓] for display, meaning that the food freshness indicates that the food is nearly expired. If the food freshness time (freshTime)<0, then the progress bar is not filled for display, meaning that the food freshness indicates that the food is expired.

Different levels of food freshness can indicate different states of foods, thus indicate different types of food alert information. Therefore, in some embodiments, when the food freshness is within the first numerical range, for example, if the food freshness time (freshTime)<0, expired food can be filtered from all existing foods in the food storage apparatus based on this indicator parameter of food freshness. Based on the food information and the food expiration alert type identifier of the expired food, food alert information indicating that the food is expired can be generated.

When the food freshness is within the second numerical range (0%-33.3%), the indicator parameter of the food freshness within 0%-33.3% can be referenced, and the nearly expired food can be filtered from all existing foods in the food storage apparatus based on this indicator parameter. Based on the food information and the food near expiration alert type identifier of the nearly expired food, food alert information indicating that the food is nearly expired can be generated.

When the food freshness is within the third numerical range (>33.3%), that the indicator parameter of the food freshness is >33.3% can be referenced, fresh food can be filtered out from all existing foods in the food storage apparatus based on this indicator parameter. Based on the food information and the food fresh reminder type identifier of the fresh food, food alert information indicating that the food is fresh can be generated.

When the filtering dimension indicated by the preset food alert push type is the food status dimension, the server can analyze and calculate the food information of existing foods in the food storage apparatus based on the push parameter of food freshness to obtain food alert information indicating that the food is expired, nearly expired, and fresh respectively. Therefore, the server can push all three types of food alert information to the display apparatus or other terminals for users to understand the food situation in the food storage apparatus.

In some embodiments, if the filtering dimension indicated by the preset food alert push type is the expired food dimension, the server can directly push only the food alert information indicating the expired food to the display apparatus. If the filtering dimension indicated by the preset food alert push type is the nearly expired food dimension, the server can directly push only the food alert information indicating the nearly expired food to the display apparatus. If the filtering dimension indicated by the preset food alert push type is the fresh food dimension, the server can directly push only the food alert information indicating the fresh food to the display apparatus. Therefore, the push content of food alert information can be determined based on the food alert push type relied on by the server.

In some embodiments, when the filtering dimension indicates two types, the at least one processor is further configured to execute instructions to cause the server to perform:

based on that the filtering dimension indicated by the preset food alert push type is a recipe dimension, determining the target push parameter to be food freshness and food usage frequency, where a weight of the food freshness is greater than a weight of the food usage frequency, and a sum of the weights of the food freshness and the food usage frequency is 1;

based on that the food freshness is within the second numerical range, and the food usage frequency is lower than a usage threshold, the corresponding food is filtered as a specified kind of food, where the specified kind of food indicates the nearly expired food which has low usage frequency;

obtaining target recipes including the specified kind of food, and based on the target recipes and the recipe reminder type identifier, generating food alert information indicating recipe recommendations.

When the filtering dimension indicated by the food alert push type is the recipe dimension, what is usually recommended to the user is the recipe searched based on the existing foods in the food storage apparatus, and the foods used in the recommended recipes are those that are nearly expired and have low usage frequency. Recommending foods that are nearly expired and have low usage frequency to users can facilitate the consumption of foods that are nearly expired and those that have not been used for a long time in the food storage apparatus, to avoid these foods from expiring and causing food waste.

Therefore, although the recipe dimension indicates one dimension, it actually can include the expired food dimension and the usage frequency dimension. That is, this recipe dimension can filter two target push parameters, namely food freshness and food usage frequency, enabling the server to push recipes generated based on foods that are nearly expired and have low usage frequency to the display apparatus.

Since foods that are nearly expired are closer to expiration, and foods with low usage frequency may still have some time before expiration, it is obvious that food freshness is a parameter of high priority, while food usage frequency is a parameter of relatively low priority. Therefore, the weight of food freshness is greater than the weight of food usage frequency, and the sum of the weights of food freshness and food usage frequency is 1. For example, the weight of food freshness is 0.7, and the weight of food usage frequency is 0.3, meaning that food freshness parameter and food usage frequency are two indicator parameters for subsequent calculation of food alert information.

To obtain food alert information for recipes, nearly expired foods need to be used. Therefore, nearly expired foods whose food freshness falling within the second numerical range are selected from the existing foods in the food storage apparatus. In this case, the food with low usage frequency also need to be used, so the food with usage frequency lower than the usage threshold is selected from the filtered expired foods as specified kind of food, where the specified kind of food indicates food that is nearly expired and has low usage frequency.

The usage threshold can be set to 10%, and food with usage frequency lower than 10% among the nearly expired foods can be filtered out, thus the specified kind of food that is nearly expired and has low usage frequency can be obtained.

Since there can be multiple specified foods, recipes including at least one specified kind of food can be searched from the internet based on each specified kind of food. The recipe reminder type identifier corresponding to the recipe alert information of recipe class can be obtained, and based on the target recipe and the recipe reminder type identifier, food alert information indicating recipe recommendations can be generated.

After generating different types of food alert information based on any of the aforementioned methods, the server can then send the corresponding type of food alert information to the display apparatus and other terminals based on the corresponding custom food alert time, facilitating users to view the status of existing foods in the food storage apparatus through the terminals.

In some embodiments, when the server pushes recipe-class food alert information to the display apparatus, the server only searches based on food names, which may result in many similar recipes being searched. Since the number of foods used in the same recipe may differ, meaning that the food quantity stored in the food storage apparatus may be less than that required by the recommended recipe, when the existing food in the food storage apparatus is insufficient to make the recommended recipe, such recipes may not be recommended to the user, avoiding unnecessary effort and affecting user experience.

Therefore, when obtaining recipes including the specified kind of food, the at least one processor is further configured to execute instructions to cause the server to perform:

getting food names and food quantities of foods included in each recipe, as well as the food names and food quantities of the foods stored in the food storage apparatus;

based on that a food quantity corresponding to a food name required in a recipe is greater than a food quantity corresponding to the food name stored in the food storage apparatus, delete said recipe;

based on that the food quantity corresponding to a food name required in a recipe is less than or equal to a food quantity corresponding to the food name stored in the food storage apparatus, selecting said recipe as the target recipe.

The server can filter multiple recipes based on the name of each specified kind of food, and then determine whether the recipe can be made based on the food quantity of foods required by each recipe and the quantity of foods stored in the food storage apparatus. Therefore, the quantity of food is used as the parameter for the second filtering of recipes.

If the food quantity of a specified kind of food required by the recipe is greater than the food quantity of the specified kind of food stored in the food storage apparatus, it means that the existing food in the food storage apparatus is not enough to make the recipe, so this kind of recipe does not need to be recommended to the user, and such recipe can be deleted from the search results.

If the food quantity of the specified kind of food required by the recipe is less than or equal to the food quantity of the specified kind of food stored in the food storage apparatus, it means that the existing food in the food storage apparatus is enough for making the recipe, so the recipe can be recommended to the user. After deleting the recipes that cannot be made, the remaining recipes that can be made with the existing foods in the food storage apparatus are regarded as target recipes and recommended to the user. Finally, based on the target recipe, food alert information can be generated and sent to the display apparatus and other terminals, facilitating users to view.

In some embodiments, there can be multiple pieces of recipe-class information included in the food alert information, for example, there can be 20 pieces of recipe-class information included in the food alert information.

In some embodiments, due to different recipes suitable for different time periods, for example, it is not suitable to have greasy food for breakfast, and foods with sufficient calories is recommended for lunch, etc. Therefore, when determining the target recipe, the time when each specified kind of food is taken out by the user in historical periods and the consumption period of the recipe can be utilized to determine whether the recipe can be recommended to the user at the custom food alert time.

Specifically, when obtaining target recipes including the specified kind of food, the at least one processor is further configured to execute instructions to cause the display apparatus to perform:

getting an opening time and a removal time for each specified kind of food, as well as the consumption period of each recipe; based on the opening time, the removal time, and the consumption period, determining whether they are consistent with the custom food alert time;

based on that they are consistent, determining the corresponding recipe as the target recipe.

To determine whether the recommended recipe is suitable for consumption by the user at the custom food alert time, the server analyzes the existing foods on the food storage apparatus. Based on the selected specified kind of food, the opening time and the removal time in historical periods can be obtained. Therefore, the opening time and the removal time for each specified kind of food can be used as the parameters for the second or third filtering of recipes.

The opening time (OpenTime) indicates a time when the user has opened the door of the food storage apparatus within the recent period (such as within a week), and the removal time (RemoveTime) indicates a time when the user has taken out the specified kind of food within the recent period (such as within a week). The consumption period of the recipe is obtained based on the recipe information, used to indicate the most suitable period for consuming the recipe.

Compare the four times: opening time, removal time, consumption period, and custom food alert time. If the comparison result indicates that they are inconsistent, it indicates that at the custom food alert time, the user is not suitable for consuming the corresponding recipe, that is, the recipe cannot be pushed to the user, and such recipe can be deleted. If the comparison result indicates that they are consistent, it indicates that at the custom food alert time, it is suitable for the user to consume the corresponding recipe, so the recipe can be pushed to the user, and therefore, such recipe is the targeted recipe. Finally, based on the targeted recipe, food alert information can be generated and sent to the display apparatus and other terminals for the user to view.

When the server analyzes and calculates the food information of the existing foods in the food storage apparatus to obtain food alert information based on different push parameters, it can use different combinations of push parameters according to different user needs to obtain different types of food alert information.

In some embodiments, while generating food alert information, the server can generate corresponding food alert information based on a default preset food alert push type in the server and the filtered target push parameter(s). The preset food alert push type can be any of expired food type, nearly expired food type, fresh food type, recipe type, etc.

In some embodiments, when the user operates the display apparatus to set the custom food alert time, the food alert push type can also be set synchronously. Then, when the server generates food alert information based on the custom food alert time and specified food alert push type sent from the display apparatus, it can select the target push parameter(s) and generate corresponding food alert information to be pushed to the display apparatus or other terminals.

Therefore, when generating corresponding food alert information based on the specified food alert push type, specifically filtering out the target push parameter(s) based on the preset food alert push type, the at least one processor is further configured to execute instructions to cause the server to perform:

receiving the specified food alert push type sent from the display apparatus, here the specified food alert push type indicates a food alert push type set by the user operating the display apparatus to indicate the type of food alert information;

filtering the target push parameter(s) according to the specified food alert push type, generating food alert information corresponding to the specified food alert push type based on the target push parameter(s) and food information.

When the user operates the display apparatus to synchronize the generation of custom food alert time and specified food alert push type, the display apparatus also uploads the custom food alert time and specified food alert push type to the server. After receiving the custom food alert time and specified food alert push type sent from the display apparatus, the server can filter target push parameter(s) based on the specified food alert push type, and then analyze and calculate the food information in the food storage apparatus based on the target push parameter(s) corresponding to the specified food alert push type to obtain the food alert information corresponding to the specified food alert push type.

It should be noted that the process of the user operating the display apparatus to synchronize the generation of custom food alert time and specified food alert push type can refer to the display apparatus in the embodiments mentioned above; the implementation process of the server filtering target push parameter(s) based on the specified food alert push type can refer to the implementation process of "filtering target push parameter(s) based on the default preset food alert push type" proposed in the above embodiments; the implementation process of the server "generating food alert information based on the target push parameter(s) corresponding to the specified food alert push type and the food information in the food storage apparatus" can refer to the implementation process of "generating food alert information based on the target push parameter(s) corresponding to the default preset food alert push type and the food information in the food storage apparatus" proposed in the above embodiments, and these are not repeated here.

After the server generates corresponding types of food alert information based on any of the above food push rules, when the system time reaches the custom food alert time set by the user, the corresponding food alert information can be sent to the display apparatus according to the custom food alert time for display. The process of displaying food alert information by the display apparatus can refer to the display apparatus in the embodiments mentioned above.

In some embodiments, because a certain type of food alert information may be set by the user to be pushed repeatedly n times within a day to remind the user in real time to avoid missing information. When the food alert information is pushed for the i-th time, if the user views the food alert information, to avoid wasting resources, the subsequent several times of push of the food alert information will no longer performed.

Therefore, to avoid repeatedly pushing the same food alert information, the at least one processor is further configured to execute instructions to cause the server to perform: receiving a notification indicating that the user has viewed the target food alert information presented in the display apparatus, changing the reminder processing status of the target food alert information to a processed status. The processed status is used to indicate that the viewed target food alert information will no longer be pushed to the display apparatus within a preset duration.

When the user operates the display apparatus to set that a certain type of food alert information will be repeatedly pushed n times within a day, for example, once every 2 hours within a day, a total of 6 times. If the food alert information is viewed by the user when it is pushed for the i-th time, it indicates that the user has processed the corresponding food based on the food alert information. Therefore, after processing the i-th push of the food alert information, a notification indicating that the food alert information has been viewed can be generated and sent to the server.

The server receives the notification indicating that the food alert information has been viewed and changes the reminder processing status of the food alert information to the processed status, and the subsequent repeated push task can be canceled, that is, the process of pushing the food alert information to the display apparatus every two hours is no longer executed.

For example, if the user sets that the food alert information A needs to be pushed repeatedly every 2 hours for 6 times within a day, and when the user viewed the food alert information A displayed on the display apparatus at the second push time, the server will no longer execute the subsequent 4 times of repeated push of the food alert information.

In some embodiments, the display apparatus can receive the food alert information and present it in the form of a notification popup, displaying the first food icon, alert information, button instructions, etc. The alert information can be the reminder content of the food alert information, and the button instructions can indicate operations such as viewing detailed information.

The server according to the embodiments of the disclosure can obtain food information with push parameters from the food storage apparatus, filter out target push parameter(s) according to the default preset food alert push type, generate food alert information based on the target push parameter(s) and food information; obtain the custom food alert time set by the user from the display apparatus, and when the system time reaches the custom food alert time, send the food alert information to the display apparatus for display. The server can generate different food alert information based on different push parameters and display it on the display apparatus at the user's set custom food alert time, so that the user can receive food alert information through the display apparatus at any time, avoiding missing food alert information, and enabling timely processing of foods in the food storage apparatus to reduce food expiration and waste, providing a good user experience.

From the above embodiments, according to the method for food alert and display apparatus, and a server according to embodiments of the disclosure, the user can select the timed alert control presented in the display apparatus, and a timed alert interface including information addition control can be shown; the user can select the information addition control, and an interface for adding alert information including an alert information input box can be shown. The user can input the custom food alert time in the alert information input box and the custom food alert time can be sent to the server.

The server can receive the custom food alert time sent from the display apparatus and the food information with push parameters sent from the food storage apparatus, filter out target push parameter(s) according to the default preset food alert push type, and generate food alert information based on the target push parameter(s) and food information. When the custom food alert time is reached, the server can send the food alert information to the display apparatus for display. This disclosure provides the function of allowing users to set custom food alert time, and the server can generate different food alert information based on different push parameters, which can be displayed on the display apparatus at the user's set custom food alert time, so that the user can receive food alert information through the display apparatus at any time, avoiding missing food alert information, and enabling timely processing of foods in the food storage apparatus to reduce food expiration and waste, providing a good user experience.

For the convenience of explanation, the above description has been made in conjunction with specific embodiments. However, the above discussion in some embodiments is not intended to be exhaustive or to limit the embodiments to the specific forms disclosed above. Numerous modifications and variations may be obtained in light of the above teachings. The above embodiments are chosen and described in order to better explain the content of the disclosure, so as to enable those skilled in the art to better utilize the embodiments.

What is claimed is:

1. A display apparatus, comprising:
a display configured to present an image and/or a user interface; and
at least one processor in connection with the display, wherein the at least one processor is configured to execute instructions to cause the display apparatus to perform:
receiving food change information input based on the display apparatus from a user, wherein the food change information is used for updating food information of existing foods in a target food storage apparatus, and the target food storage apparatus is bound with the display apparatus via a specified account;
obtaining the specified account under which the display apparatus is logged into, and sending a device query request carrying the specified account to a server; wherein the device query request is used to instruct the server to query a target device ID associated with the specified account, and the target device ID is used to indicate a target food storage apparatus logged into the specified account as the display apparatus; and
receiving the target device ID corresponding to the specified account returned from the server based on the device query request, and sending the food change information via the server to the target food storage apparatus corresponding to the target device ID; and
in response to a completion notification sent from the target food storage apparatus after updating the food information based on the food change information, updating food information stored in the display apparatus,
wherein updated food information stored in the display apparatus is the same as updated food information stored in the target food storage apparatus.

2. The display apparatus according to claim 1, wherein the at least one processor is further configured to execute instructions to cause the display apparatus to perform:
based on that multiple device IDs associated with the specified account are queried by the server, receiving an inquiry instruction generated by the server based on the multiple device IDs, wherein the inquiry instruction comprises multiple selection options, and one selection option corresponds to one device ID; and
receiving a target selection option selected based on the inquiry instruction, and determining a device ID corresponding to the target selection option as the target device ID.

3. The display apparatus according to claim 1, wherein the at least one processor is further configured to execute instructions to cause the display apparatus to perform:
based on that no completion notification is received from the target food storage apparatus within a preset interval, deleting the food change information, and generating an update failure prompt, wherein the update failure prompt is used to prompt the user that the target food storage apparatus has not completed a process of updating food information.

4. The display apparatus according to claim 1, wherein the at least one processor is further configured to execute instructions to cause the display apparatus to perform:
while the food information of the existing foods in the target food storage apparatus being checked via the display apparatus, in response to a start command based on a selection of a food information processing application, generating an interface for food information processing based on the updated food information stored in the display apparatus, and displaying the interface for food information processing on the user interface, wherein the interface for food information processing presents food icons generated based on the food information of the existing foods in the target food storage apparatus.

5. The display apparatus according to claim 1, wherein the at least one processor is further configured to execute instructions to cause the display apparatus to perform:
receiving food change information sent from the target food storage apparatus during updating the food information of the existing foods based on a user's input; and
based on the food change information generated by the target food storage apparatus, updating the food information stored in the display apparatus.

6. The display apparatus according to claim 1, wherein the at least one processor is configured to execute instructions to cause the display apparatus to perform:
in response to a food query command for checking the food information of the existing foods in the target food storage apparatus from a user, obtaining food data corresponding to the target food storage apparatus from a server that is in communication with the target food storage apparatus, wherein the food data comprises food information of the existing foods in the target food storage apparatus; and
based on the food data returned from the server, switching to a food information processing homepage and display the food information processing homepage on the user interface, wherein the food information processing homepage is configured to present food information of the existing foods in the target food storage apparatus.

7. The display apparatus according to claim 6, wherein the at least one processor is further configured to execute instructions to cause the display apparatus to perform:
in response to a first voice command for checking the existing foods in the target food storage apparatus, obtaining a specified account under which the display apparatus is logged into, and sending a device query request carrying the specified account to the server, wherein the device query request is used to instruct the server to query a target device ID of the target food storage apparatus logged into the specified account;

receiving the target device ID returned from the server and sending a food query instruction carrying the target device ID to the server, wherein the food query instruction is used to instruct the server to query food data of the target food storage apparatus corresponding to the target device ID; and receiving the food data of the target food storage apparatus returned from the server.

8. The display apparatus according to claim 6, wherein the at least one processor is further configured to execute instructions to cause the display apparatus to perform:

in response to a start command based on a selection of a quick query entry presented in the user interface from the user, sending a device query request carrying a specified account under which the display apparatus is logged into to the server, wherein the device query request is used to instruct the server to query a target device ID of the target food storage apparatus logged into the specified account;

receiving the target device ID returned from the server and sending a food query instruction carrying the target device ID to the server, wherein the food query instruction is used to instruct the server to query food data of the target food storage apparatus corresponding to the target device ID; and receiving the food data of the target food storage apparatus returned from the server.

9. The display apparatus according to claim 6, wherein the at least one processor is further configured to execute instructions to cause the display apparatus to perform:

in response to the food query command for checking the existing foods in the target food storage apparatus, and based on that no food data corresponding to the target food storage apparatus returned from the server is received, switching to display the food information processing homepage based on prompt information in the user interface, wherein the prompt information indicates that there is no food in the target food storage apparatus.

10. The display apparatus according to claim 1, wherein the at least one processor is configured to execute instructions to cause the display apparatus to perform:

in response to a food query command for checking a specified kind of food in the target food storage apparatus, obtaining food data corresponding to the specified kind of food in the target food storage apparatus from the server that is in communication with the target food storage apparatus; and based on the food data of the specified kind of food returned from the server, switching to display a specific food page in the user interface, wherein the specific food page is configured to present food information of the specified kind of food in the target food storage apparatus.

11. The display apparatus according to claim 10, wherein the at least one processor is further configured to execute instructions to cause the display apparatus to perform:

in response to a second voice command for checking the specified kind of food in the target food storage apparatus, extracting an identification parameter of the specified kind of food carried in the second voice command, and querying a target device ID of the target food storage apparatus logged into a same specified account as the display apparatus from the server, wherein the identification parameter is used to indicate a food name, a storage compartment, and freshness of the specified kind of food;

sending a food query instruction carrying the target device ID and the identification parameter of the specified kind of food to the server, wherein the food query instruction is configured to instruct the server to query food data of the specified kind of food in the target food storage apparatus corresponding to the target device ID and the identification parameter; and receiving the food data of the specified kind of food in the target food storage apparatus returned from the server.

12. The display apparatus according to claim 11, wherein the at least one processor is further configured to execute instructions to cause the display apparatus to perform:

based on that the food data comprises multiple pieces of food information corresponding to the specified kind of food, obtaining a preset sorting rule, and sorting the multiple pieces of food information based on the preset sorting rule; and generating the specific food page based on the sorted food information.

13. The display apparatus according to claim 10, wherein the at least one processor is further configured to execute instructions to cause the display apparatus to perform:

in response to an exit command for cancelling a display of the specific food page, extracting a specified type name for indicating existing food corresponding to a specified type from the food query command; and obtaining food data corresponding to the specified type name in the target food storage apparatus from the server, generating a food tag page based on the food data corresponding to the specified type name, and switching to display the food tag page on the user interface, wherein the food tag page is configured to present food information of the existing food corresponding to the specified type in the target food storage apparatus.

14. A method for a display apparatus comprising:

receiving food change information input based on the display apparatus from a user, wherein the food change information is used for updating food information of existing foods in a target food storage apparatus, and the target food storage apparatus is bound with the display apparatus via a specified account;

obtaining the specified account under which the display apparatus is logged into, and sending a device query request carrying the specified account to a server; wherein the device query request is used to instruct the server to query a target device ID associated with the specified account, and the target device ID is used to indicate a target food storage apparatus logged into the specified account as the display apparatus; and receiving the target device ID corresponding to the specified account returned from the server based on the device query request, and sending the food change information via the server to the target food storage apparatus corresponding to the target device ID; and in response to a completion notification sent from the target food storage apparatus after updating the food information based on the food change information, updating food information stored in the display apparatus, wherein updated food information stored in the display apparatus is the same as updated food information stored in the target food storage apparatus.

15. The method according to claim 14, further comprising:

based on that multiple device IDs associated with the specified account are queried by the server, receiving an inquiry instruction generated by the server based on the multiple device IDs, wherein the inquiry instruction comprises multiple selection options, and one selection option corresponds to one device ID; and receiving a target selection option selected based on the inquiry instruction, and determining a device ID corresponding to the target selection option as the target device ID.

16. The method according to claim 14, further comprising:

based on that no completion notification is received from the target food storage apparatus within a preset interval, deleting the food change information, and generating an update failure prompt, wherein the update failure prompt is used to prompt the user that the target food storage apparatus has not completed a process of updating food information.

17. The method according to claim 14, further comprising:

while the food information of the existing foods in the target food storage apparatus being checked via the display apparatus, in response to a start command based on a selection of a food information processing application, generating an interface for food information processing based on the updated food information stored in the display apparatus, and displaying the interface for food information processing on a user interface of the display apparatus, wherein the interface for food information processing presents food icons generated based on the food information of the existing foods in the target food storage apparatus.

18. The method according to claim 14, further comprising:

receiving food change information sent from the target food storage apparatus during updating the food information of the existing foods based on a user's input; and based on the food change information generated by the target food storage apparatus, updating the food information stored in the display apparatus.

* * * * *